United States Patent
Shimizu et al.

(10) Patent No.: US 8,238,058 B2
(45) Date of Patent: Aug. 7, 2012

(54) MAGNETIC RECORDING HEAD, MAGNETIC HEAD ASSEMBLY, AND MAGNETIC RECORDING APPARATUS

(75) Inventors: Mariko Shimizu, Kanagawa-ken (JP); Hitoshi Iwasaki, Kanagawa-ken (JP); Kenichiro Yamada, Tokyo (JP); Katsuhiko Koui, Kanagawa-ken (JP); Masayuki Takagishi, Tokyo (JP); Tomomi Funayama, Tokyo (JP); Masahiro Takashita, Kanagawa-ken (JP); Soichi Oikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/737,691

(22) Filed: Feb. 7, 2011

(65) Prior Publication Data
US 2011/0205655 A1    Aug. 25, 2011

Related U.S. Application Data

(63) Continuation of application No. PCT/JP2009/056566, filed on Mar. 30, 2009.

(30) Foreign Application Priority Data
Aug. 6, 2008 (JP) .................... 2008-203645

(51) Int. Cl.
*G11B 5/127* (2006.01)
(52) U.S. Cl. ........................................... 360/125
(58) Field of Classification Search .......... None
See application file for complete search history.

(56) References Cited

U.S. PATENT DOCUMENTS

| 4,103,315 | A | 7/1978 | Hempstead et al. |
| 4,945,528 | A | 7/1990 | Crasemann |
| 5,695,864 | A | 12/1997 | Slonczewski |
| 5,748,399 | A | 5/1998 | Gill |
| 5,768,066 | A | 6/1998 | Akiyama et al. |

(Continued)

FOREIGN PATENT DOCUMENTS
JP    64-070947    3/1989
(Continued)

OTHER PUBLICATIONS

Zhu et al., "Bias-Field-Free Microwave Oscillator Driven by Perpendicularly Polarized Spin Current", IEEE Transactions on Magnetics vol. 42, No. 10, Oct. 2006, Data Storage Systems Center, Department of Electrical and Computer Engineering, Carnegie Mellon University, Pittsburgh, PA, pp. 2670-2672.

(Continued)

*Primary Examiner* — Mark Blouin
(74) *Attorney, Agent, or Firm* — Nixon & Vanderhye, P.C.

(57) ABSTRACT

According to one embodiment, a magnetic recording head includes a main magnetic pole, a shield, and a stacked structure body. The shield is provided to oppose the main magnetic pole. The stacked structure body is provided between the main magnetic pole and the shield. The stacked structure body includes a first magnetic layer, a second magnetic layer, and an intermediate layer. The first magnetic layer has coercivity lower than a magnetic field applied from the main magnetic pole. A size of a film surface of the second magnetic layer is larger than a size of a film surface of the first magnetic layer. The intermediate layer is provided between the first magnetic layer and the second magnetic layer and is made of a nonmagnetic material. A current is configured to pass between the first magnetic layer and the second magnetic layer.

20 Claims, 34 Drawing Sheets

U.S. PATENT DOCUMENTS

| | | | |
|---|---|---|---|
| 5,898,546 A | 4/1999 | Kanai et al. | |
| 5,920,447 A | 7/1999 | Sakata et al. | |
| 6,011,664 A | 1/2000 | Kryder et al. | |
| 6,094,328 A | 7/2000 | Saito | |
| 6,153,062 A | 11/2000 | Saito | |
| 6,278,576 B1 | 8/2001 | Ogata et al. | |
| 6,282,069 B1 | 8/2001 | Nakazawa et al. | |
| 6,519,119 B1 | 2/2003 | van der Heijden et al. | |
| 6,580,589 B1 | 6/2003 | Gill | |
| 6,583,969 B1 | 6/2003 | Pinarbasi | |
| 6,591,479 B2 | 7/2003 | Nakazawa et al. | |
| 6,608,739 B1 | 8/2003 | Tanaka et al. | |
| 6,621,664 B1 | 9/2003 | Trindade et al. | |
| 6,697,231 B1 | 2/2004 | Kikuiri | |
| 6,785,092 B2 * | 8/2004 | Covington et al. | 360/125.45 |
| 6,809,900 B2 | 10/2004 | Covington | |
| 6,927,952 B2 | 8/2005 | Shimizu et al. | |
| 6,937,446 B2 | 8/2005 | Kamiguchi et al. | |
| 6,977,108 B2 | 12/2005 | Hieda et al. | |
| 6,982,845 B2 | 1/2006 | Kai et al. | |
| 7,106,555 B2 | 9/2006 | Kikuiri et al. | |
| 7,119,990 B2 | 10/2006 | Bajorek et al. | |
| 7,120,988 B2 * | 10/2006 | Le et al. | 29/603.07 |
| 7,145,752 B2 | 12/2006 | Ueda et al. | |
| 7,154,707 B2 | 12/2006 | Watabe et al. | |
| 7,256,955 B2 | 8/2007 | Pokhil et al. | |
| 7,397,633 B2 | 7/2008 | Xue et al. | |
| 7,461,933 B2 | 12/2008 | Deily et al. | |
| 7,466,525 B2 | 12/2008 | Hasegawa et al. | |
| 7,471,491 B2 | 12/2008 | Sato et al. | |
| 7,473,478 B2 | 1/2009 | Sbiaa et al. | |
| 7,486,475 B2 | 2/2009 | Biskeborn | |
| 7,504,898 B2 | 3/2009 | Fukuzawa et al. | |
| 7,532,433 B2 | 5/2009 | Kawato et al. | |
| 7,532,434 B1 | 5/2009 | Schrek et al. | |
| 7,593,185 B2 | 9/2009 | Yazawa | |
| 7,616,412 B2 | 11/2009 | Zhu et al. | |
| 7,675,129 B2 | 3/2010 | Inomata et al. | |
| 7,724,469 B2 | 5/2010 | Gao et al. | |
| 7,732,881 B2 | 6/2010 | Wang | |
| 7,764,136 B2 | 7/2010 | Suzuki | |
| 7,791,829 B2 | 9/2010 | Takeo et al. | |
| 7,808,330 B2 | 10/2010 | Fukuzawa et al. | |
| 7,911,882 B2 | 3/2011 | Shimazawa et al. | |
| 7,957,098 B2 | 6/2011 | Yamada et al. | |
| 8,139,322 B2 | 3/2012 | Yamada et al. | |
| 8,154,825 B2 | 4/2012 | Takashita et al. | |
| 8,164,854 B2 | 4/2012 | Takagishi et al. | |
| 2001/0017752 A1 | 8/2001 | Hoshiya et al. | |
| 2002/0006013 A1 | 1/2002 | Sato et al. | |
| 2002/0051330 A1 | 5/2002 | Heijden et al. | |
| 2002/0075595 A1 | 6/2002 | Sato et al. | |
| 2002/0097536 A1 | 7/2002 | Komuro et al. | |
| 2002/0136927 A1 | 9/2002 | Hieda et al. | |
| 2003/0026040 A1 | 2/2003 | Covington et al. | |
| 2003/0090844 A1 | 5/2003 | Shimizu et al. | |
| 2004/0145828 A1 | 7/2004 | Im | |
| 2004/0150912 A1 | 8/2004 | Kawato et al. | |
| 2004/0190197 A1 | 9/2004 | Watabe et al. | |
| 2004/0228045 A1 | 11/2004 | Hasegawa et al. | |
| 2005/0023938 A1 | 2/2005 | Sato et al. | |
| 2005/0105213 A1 | 5/2005 | Takeo et al. | |
| 2005/0110004 A1 | 5/2005 | Parkin et al. | |
| 2005/0207050 A1 | 9/2005 | Pokhil | |
| 2005/0219771 A1 | 10/2005 | Sato et al. | |
| 2006/0171051 A1 | 8/2006 | Wachenschwanz et al. | |
| 2006/0198047 A1 | 9/2006 | Xue et al. | |
| 2006/0221507 A1 | 10/2006 | Sato et al. | |
| 2007/0063237 A1 | 3/2007 | Huai et al. | |
| 2007/0109147 A1 | 5/2007 | Fukuzawa et al. | |
| 2008/0019040 A1 * | 1/2008 | Zhu et al. | 360/110 |
| 2008/0112087 A1 | 5/2008 | Clinton et al. | |
| 2008/0117545 A1 | 5/2008 | Batra et al. | |
| 2008/0129401 A1 | 6/2008 | Fukuzawa et al. | |
| 2008/0137224 A1 * | 6/2008 | Gao et al. | 360/55 |
| 2008/0150643 A1 | 6/2008 | Suzuki et al. | |
| 2008/0218891 A1 | 9/2008 | Gubbins et al. | |
| 2008/0268291 A1 | 10/2008 | Akiyama et al. | |
| 2008/0304176 A1 | 12/2008 | Takagishi et al. | |
| 2009/0052095 A1 | 2/2009 | Yamada et al. | |
| 2009/0059417 A1 | 3/2009 | Takeo et al. | |
| 2009/0059418 A1 | 3/2009 | Takeo et al. | |
| 2009/0059423 A1 * | 3/2009 | Yamada et al. | 360/122 |
| 2009/0080105 A1 | 3/2009 | Takashita et al. | |
| 2009/0080106 A1 | 3/2009 | Shimizu et al. | |
| 2009/0080120 A1 | 3/2009 | Funayama et al. | |
| 2009/0088095 A1 | 4/2009 | Kayano et al. | |
| 2009/0097167 A1 | 4/2009 | Sato et al. | |
| 2009/0097169 A1 | 4/2009 | Sato et al. | |
| 2009/0115541 A1 | 5/2009 | Persson et al. | |
| 2009/0225465 A1 | 9/2009 | Iwasaki et al. | |
| 2009/0257151 A1 | 10/2009 | Zhang et al. | |
| 2009/0262457 A1 | 10/2009 | Rivkin et al. | |
| 2009/0316303 A1 | 12/2009 | Yamada et al. | |
| 2009/0316304 A1 | 12/2009 | Funayama et al. | |
| 2010/0007992 A1 | 1/2010 | Yamada et al. | |
| 2010/0007996 A1 | 1/2010 | Iwasaki et al. | |
| 2010/0110592 A1 | 5/2010 | Koui et al. | |
| 2010/0134922 A1 | 6/2010 | Yamada et al. | |
| 2010/0220415 A1 | 9/2010 | Yamada et al. | |
| 2011/0038080 A1 | 2/2011 | Alex et al. | |
| 2011/0205655 A1 | 8/2011 | Shimizu et al. | |
| 2011/0299192 A1 | 12/2011 | Yamada et al. | |
| 2011/0300409 A1 | 12/2011 | Yamada et al. | |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-109712 | 4/2002 |
| JP | 2002-208744 | 7/2002 |
| JP | 2002-279616 | 9/2002 |
| JP | 2004-192744 | 7/2004 |
| JP | 2004-207707 | 7/2004 |
| JP | 2004-234830 | 8/2004 |
| JP | 2004-295987 | 10/2004 |
| JP | 2005-108315 | 4/2005 |
| JP | 2005-525663 | 8/2005 |
| JP | 2005-285242 | 10/2005 |
| JP | 2005-310363 | 11/2005 |
| JP | 2006-134540 | 5/2006 |
| JP | 2006-147023 | 6/2006 |
| JP | 2006-209960 | 8/2006 |
| JP | 2006-209964 | 8/2006 |
| JP | 2006-244693 | 9/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-124340 | 5/2007 |
| JP | 2007-184923 | 7/2007 |
| JP | 2007-193906 | 8/2007 |
| JP | 2008-123669 | 5/2008 |
| JP | 2008-176908 | 7/2008 |
| KR | 1020030039289 | 5/2003 |
| WO | 2006-101040 | 9/2006 |

OTHER PUBLICATIONS

Zhu et al., "Microwave Assisted Magnetic Recording (MAMR)," Digest of the 18$^{th}$ Magnetic Recording conference, pp. 34-35, 2007.

Maat et al., "Magnetotransport properties and spin-torque effects in current perpendicular to the plane spin valves with Co-Fe-Al magnetic layers", Journal of Applied Physics 101, 093905 (2007); May 9, 2007.

Park et al., "Effect of Adjacent Layers on Crystallization and Magnetoresistance in CoFcB/MgO/CoFeB Magnetic Tunnel Junction", IEEE Transactions of Magnetics, vol. 42, No. 10, Oct. 2006.

Shen et al., "Effect of Film Roughness in MgO-based Magnetic Tunnel Junctions", Applied Physics Letters 88, 182508 (2006).

Akiyama et al., U.S. Appl. No. 12/109,760, filed Apr. 25, 2008.
Yamada et al., U.S. Appl. No. 12/153,490, filed May 20, 2008.
Yamada et al., U.S. Appl. No. 12/155,329, filed Jun. 2, 2008.
Takagishi et al., U.S. Appl. No. 12/155,473, filed Jun. 4, 2008.
Takeo et al., U.S. Appl. No. 12/196,628, filed Aug. 22, 2008.
Takeo et al., U.S. Appl. No. 12/196,841, filed Aug. 22, 2008.

Iwasaki et al., U.S. Appl. No. 12/232,014 filed Sep. 9, 2008.
Takashita et al., U.S. Appl. No. 12/232,391, filed Sep. 16, 2003.
Funayama et al., U.S. Appl. No. 12/232,392, filed Sep. 16, 2008.
Shimizu et al., U.S. Appl. No. 12/232,469, filed Sep. 17, 2008.
Yamada et al., U.S. Appl. No. 12/382,940, filed Mar. 26, 2009.
Iwasaki et al., U.S. Appl. No. 12/457,657, filed Jun. 17, 2009.

Takagishi et al., U.S. Appl. No. 12/461,027, filed Jul. 29, 2009.
Koui et al., U.S. Appl. No. 12/591,055, filed Nov. 5, 2009.
Yamada et al., U.S. Appl. No. 12/780,269, filed May 13, 2010.
Yamada et al., U.S. Appl. No. 13/214,012, filed Aug. 19, 2011.
Yamada et al., U.S. Appl. No. 13/214,033, filed Aug. 19, 2011.

* cited by examiner

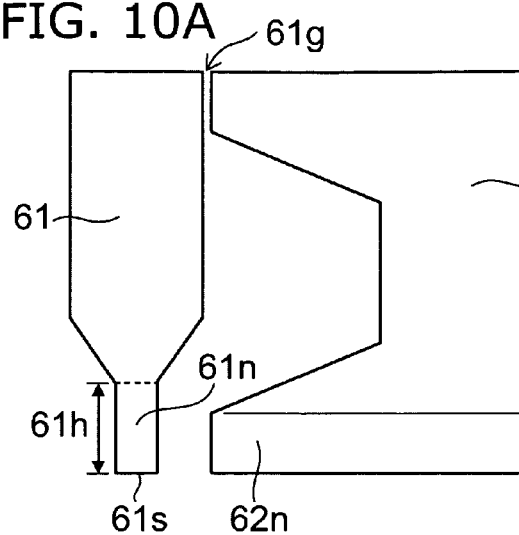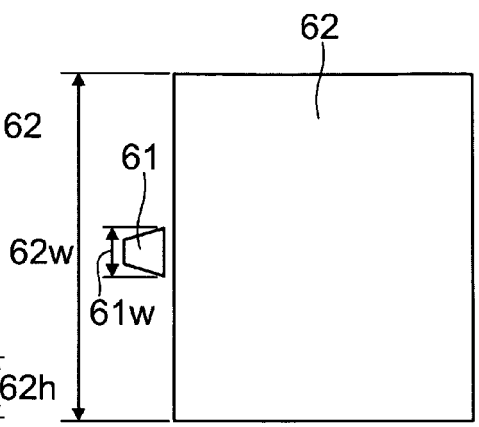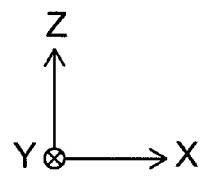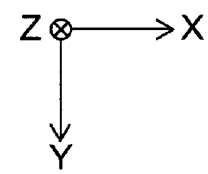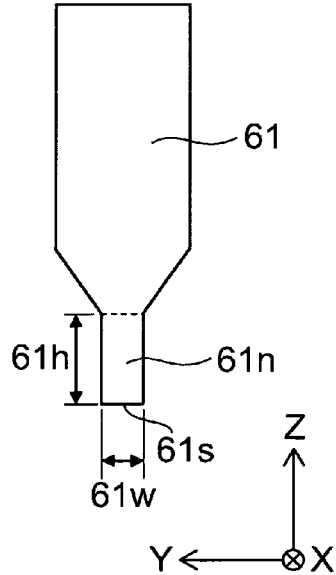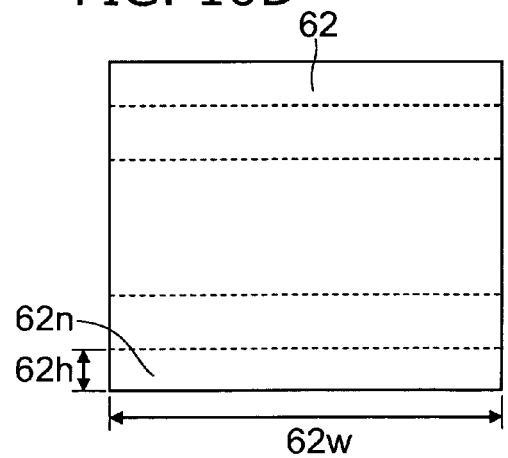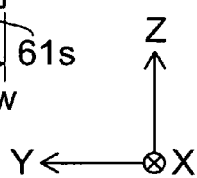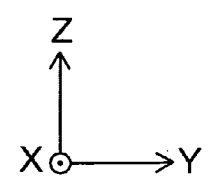

MAGNETIC RECORDING HEAD, MAGNETIC HEAD ASSEMBLY, AND MAGNETIC RECORDING APPARATUS

CROSS-REFERENCE TO RELATED APPLICATIONS

This is a continuation application of International Application PCT/JP2009/056566, filed on Mar. 30, 2009. This application also claims priority to Japanese Application No. 2008-203645, filed on Aug. 6, 2008. The entire contents of each are incorporated herein by reference.

FIELD

Embodiments described herein relate generally to a magnetic recording head, a magnetic head assembly, and a magnetic recording apparatus.

BACKGROUND

In the 1990s, the practical application of MR (magnetoresistive effect) heads and GMR (giant magnetoresistive effect) heads triggered a dramatic increase in the recording density and recording capacity of HDD (hard disk drive). However, in the early 2000s, the problem of thermal fluctuations in magnetic recording media became manifest, and hence the increase of recording density temporarily slowed down. Nevertheless, perpendicular magnetic recording, which is in principle more advantageous to high density recording than longitudinal magnetic recording, was put into practical use in 2005. It serves as an engine for the increase of HDD recording density, which exhibits an annual growth rate of approximately 40% these days.

Furthermore, the latest demonstration experiments have achieved a recording density exceeding 400 Gbits/inch$^2$. If the development continues steadily, the recording density is expected to realize 1 Tbits/inch$^2$ around 2012. However, it is considered that such a high recording density is not easy to realize even by using perpendicular magnetic recording because the problem of thermal fluctuations becomes manifest again.

As a recording technique possibly solving the above problem, "radio frequency magnetic field assisted recording" is proposed (e.g., U.S. Pat. No. 6,011,664). In radio frequency magnetic field assisted recording, a radio frequency magnetic field near the resonance frequency of the magnetic recording medium, which is sufficiently higher than the recording signal frequency, is locally applied to the medium. This produces resonance in the medium, which decreases the coercivity (Hc) of the portion of the medium subjected to the radio frequency magnetic field to less than half the original coercivity. Using this effect, by superposition of a radio frequency magnetic field on the recording magnetic field, it is made possible to achieve magnetic recording onto a medium having higher coercivity (Hc) and higher magnetic anisotropy energy (Ku). However, this technique disclosed in U.S. Pat. No. 6,011,664 uses a coil to generate a radio frequency magnetic field. Hence, it is difficult to efficiently apply a radio frequency magnetic field to the medium.

Thus, as a means for generating a radio frequency magnetic field, techniques based on a spin torque oscillator are proposed (e.g., United States Patent Application Publication No. 2005/0023938A1; United States Patent Application Publication No. 2005/0219771A1, and IEEE TRANSACTION ON MAGNETICS, VOL. 42, NO. 10, PP. 2670, "Bias-Field-Free Microwave Oscillator Driven by Perpendicularly Polarized Spin Current" by Xiaochun Zhu and Jian-Gang Zhu). In the techniques disclosed therein, the spin torque oscillator comprises a spin injection layer, an intermediate layer, a magnetic layer, and electrodes. When a DC current is passed in the spin torque oscillator via the electrodes, the spin torque generated by the spin injection layer produces ferromagnetic resonance in the magnetization of the magnetic layer. Consequently, a radio frequency magnetic field is generated from the spin torque oscillator.

Because the spin torque oscillator has a size of approximately several ten nanometers, the generated radio frequency magnetic field is localized within approximately several ten nanometers around the spin torque oscillator. Furthermore, the perpendicularly magnetized medium can be efficiently resonated by the longitudinal (in-plane) component of the radio frequency magnetic field, enabling a significant decrease in the coercivity of the medium. Consequently, high density magnetic recording is performed only in a portion where the recording magnetic field of the main magnetic pole overlaps the radio frequency magnetic field of the spin torque oscillator. This enables use of media having high coercivity (Hc) and high magnetic anisotropy energy (Ku). Thus, the problem of thermal fluctuations in high density recording can be avoided.

In radio frequency magnetic field assisted recording, it is important to bring the spin torque oscillator close to the main magnetic pole so that the in-plane radio frequency magnetic field and the recording magnetic field are efficiently superposed in the medium. Furthermore, it is also important to make the oscillation frequency of the spin torque oscillator nearly equal to the medium resonance frequency. However, if the spin torque oscillator is brought close to the main magnetic pole, then at a time of writing, a high magnetic field of several kOe to 20 kOe is applied from the main magnetic pole to the spin torque oscillator. Thus, the oscillation frequency and generated magnetic field intensity of the spin torque oscillator are varied with the direction of the writing magnetic field (recording magnetic field). Hence, it is required to provide a magnetic head including a spin torque oscillator capable of canceling the influence of the magnetic field generated from the main magnetic pole and a magnetic recording apparatus based on the magnetic head.

To solve this problem, it is expected to provide a technique using a spin torque oscillator in which the magnetic field applied from the main magnetic pole to the spin torque oscillator is always parallel to the magnetization of the spin injection layer when no current is passed. If a current is passed in this spin torque oscillator in the perpendicular-to-plane direction from the spin injection layer to the oscillation layer, then irrespective of the direction of the recording magnetic field, the magnetization of the oscillation layer receives a spin torque from polarized electrons reflected at the spin injection layer and undergoes precession. Irrespective of the direction of the recording magnetic field, the spin torque applied to the oscillation layer and the effective magnetic field of the oscillation layer are equal in magnitude and balanced with each other. Hence, even if the direction of the recording magnetic field is inverted, it can be expected that the oscillation frequency and generated magnetic field intensity of the spin torque oscillator are left unchanged.

On the other hand, medium inversion in each bit needs to occur while the writing magnetic field from the recording head is applied to the bit. When the writing magnetic field is inverted, the spin injection layer first starts inversion. Inversion of the spin injection layer allows the magnetization of the oscillation layer to effectively receive the spin torque of the spin injection layer, and oscillation return is started. In order to finish the oscillation return before the writing magnetic field moves to the next bit, it is necessary to shorten the sum of the inversion time of the writing magnetization, the inversion time of the magnetization of the spin injection layer, and the oscillation return time of the magnetization of the oscillation layer.

Furthermore, in the technique for passing a current in the spin torque oscillator in the perpendicular-to-plane direction from the spin injection layer to the oscillation layer, the magnetization of the spin injection layer receives a spin torque from polarized electrons passed through the oscillation layer. Hence, magnetization of the spin injection layer is made unstable. As a result, there is a problem of the decrease of spin injection efficiency of the oscillation layer.

BRIEF DESCRIPTION OF THE DRAWINGS

FIGS. 10A to 10D are schematic views illustrating the configuration of part of one other magnetic recording head according to the first embodiment;

DETAILED DESCRIPTION

Figure 1:
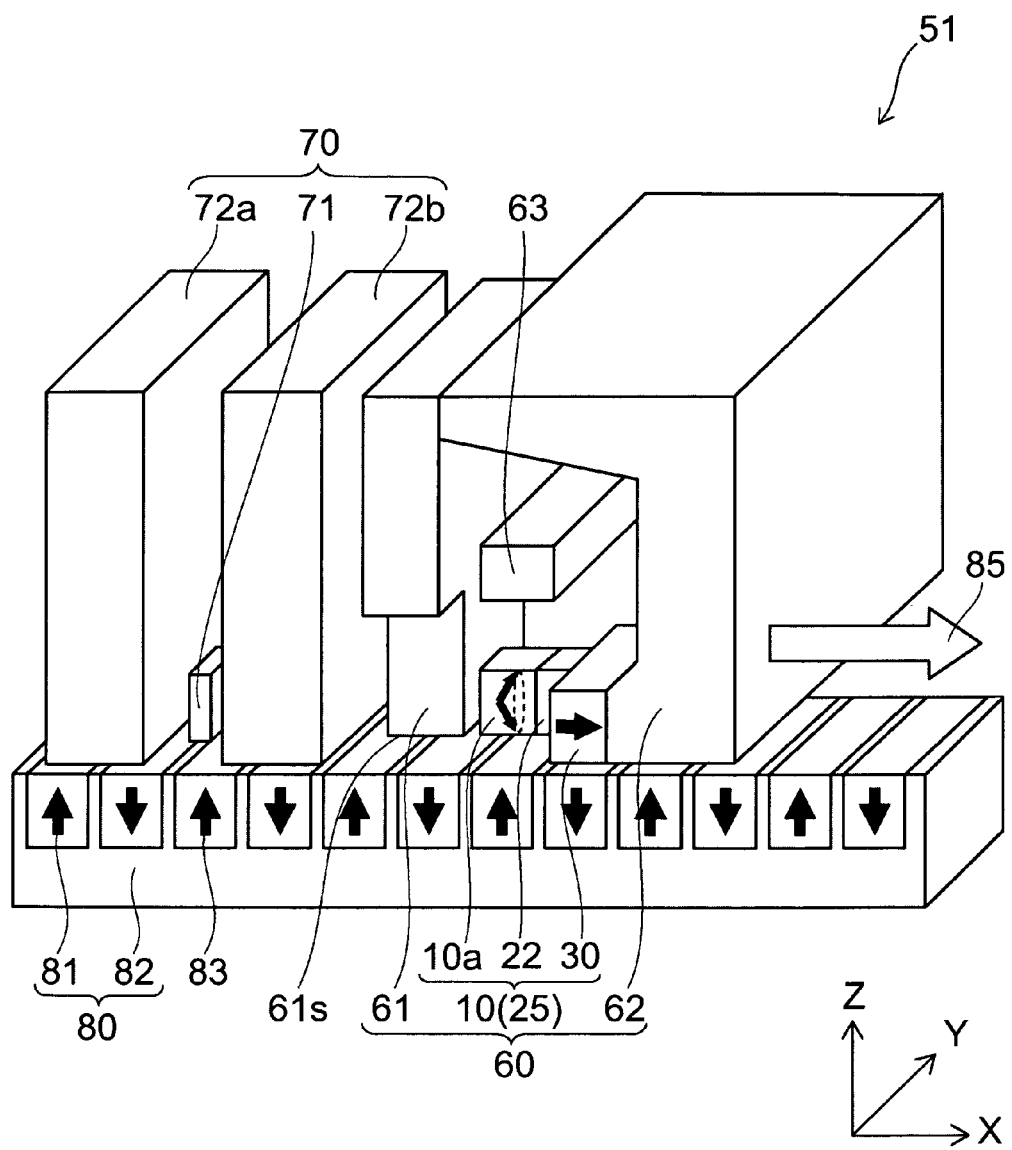
FIG. 1 is a schematic perspective view illustrating the configuration of a magnetic recording head according to a first embodiment.

In general, according to one embodiment, a magnetic recording head includes a main magnetic pole, a shield, and a stacked structure body. The shield is provided to oppose the main magnetic pole. The stacked structure body is provided between the main magnetic pole and the shield. The stacked structure body includes a first magnetic layer, a second magnetic layer, and an intermediate layer. The first magnetic layer has coercivity lower than a magnetic field applied from the main magnetic pole. A size of a film surface of the second magnetic layer is larger than a size of a film surface of the first magnetic layer. The intermediate layer is provided between the first magnetic layer and the second magnetic layer and is made of a nonmagnetic material. A current is configured to pass between the first magnetic layer and the second magnetic layer.

Embodiments will now be described with reference to the drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification of the application and the drawings, the same components as those described previously with reference to earlier figures are labeled with like reference numerals, and the detailed description thereof is omitted as appropriate.

First Embodiment

A magnetic recording head according to a first embodiment is described in the case of recording on a multiparticle medium for perpendicular magnetic recording.

FIG. 1 is a schematic perspective view illustrating the configuration of a magnetic recording head according to the first embodiment.

Figure 2:
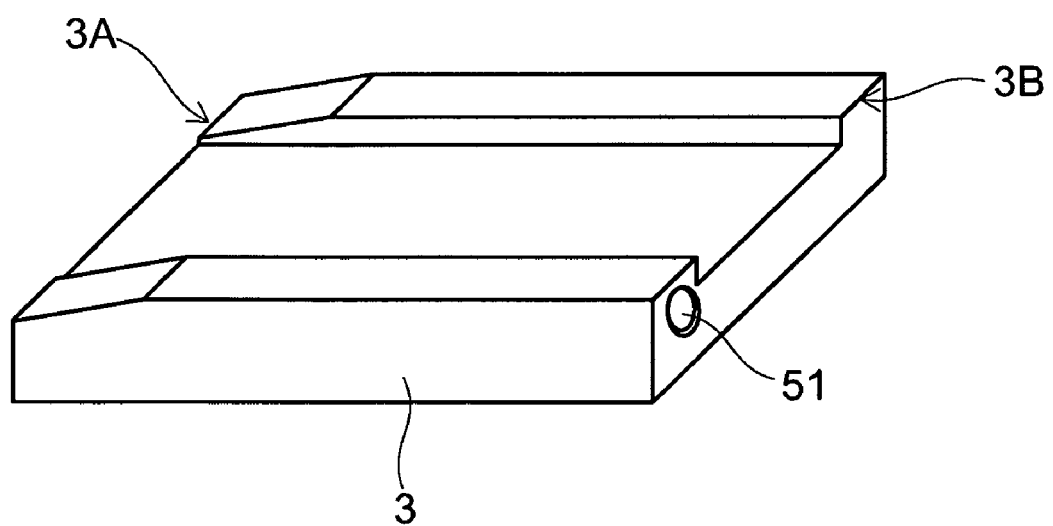
FIG. 2 is a schematic perspective view illustrating the configuration of a head slider on which the magnetic recording head according to the first embodiment is mounted.

FIG. 2 is a schematic perspective view illustrating the configuration of a head slider on which the magnetic recording head according to the first embodiment is installed.

Figure 3:
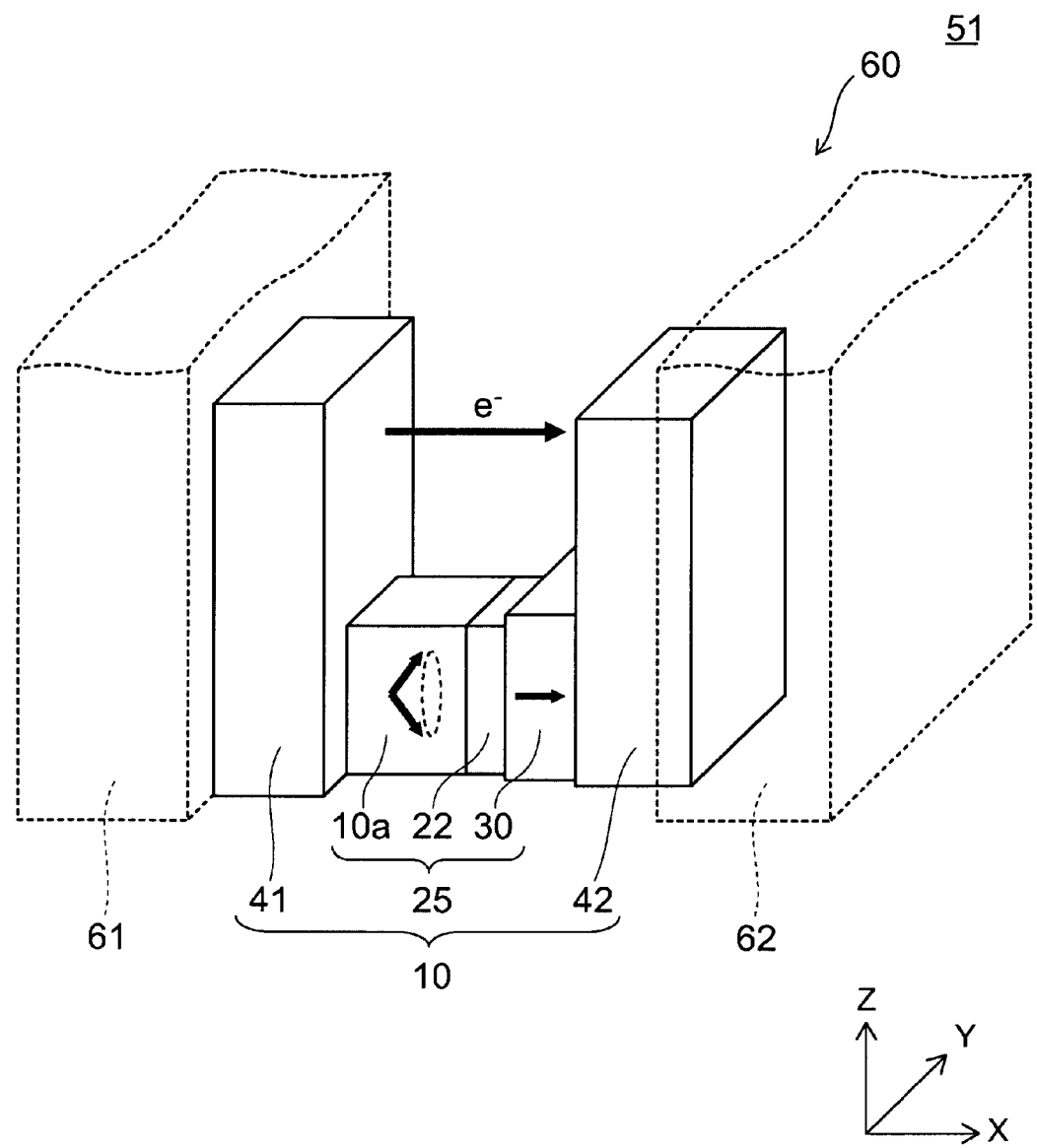
FIG. 3 is a schematic perspective view illustrating the configuration of a spin torque oscillator used in the magnetic recording head according to the first embodiment.

FIG. 3 is a schematic perspective view illustrating the configuration of a spin torque oscillator used in the magnetic recording head according to the first embodiment.

As shown in FIG. 1, the magnetic recording head 51 according to the first embodiment includes a writing head section 60.

The writing head section 60 includes a main magnetic pole 61, a shield (return path) 62, and a spin torque oscillator 10. In the spin torque oscillator 10, an oscillation layer (first magnetic layer) 10a, an intermediate layer 22, and a spin injection layer (second magnetic layer) 30 are stacked. The intermediate layer 22 can be formed from a nonmagnetic material such as Cu.

Furthermore, the writing head section 60 includes an excitation coil 63 for generating a recording magnetic field Hr from the main magnetic pole 61. In the example illustrated in FIG. 1, the excitation coil 63 is provided on the side surface of the main magnetic pole 61. However, the excitation coil 63 may be provided in the back gap portion between the main magnetic pole 61 and the shield 62.

As shown in FIG. 1, the magnetic recording head 51 according to this embodiment can further include a reproducing head section 70.

The reproducing head section 70 includes a first magnetic shield layer 72a, a second magnetic shield layer 72b, and a magnetic reproducing device 71 provided between the first magnetic shield layer 72a and the second magnetic shield layer 72b.

The magnetic reproducing device 71 can be based on a GMR device or a TMR (tunnel magnetoresistive effect) device. In order to enhance reproducing resolution, the magnetic reproducing device 71 is placed between the two magnetic shield layers, i.e., the first and second magnetic shield layers 72a and 72b.

As shown in FIG. 1, a magnetic recording medium 80 is placed opposite to the medium facing surface (air bearing surface) of the magnetic recording head 51. The main magnetic pole 61 applies a recording magnetic field Hr to the magnetic recording medium 80. Here, the medium facing surface of the magnetic recording head 51 can be a medium facing surface 61s which is the major surface of the main magnetic pole 61 opposing the magnetic recording medium 80 placed opposite to the magnetic recording head 51.

As shown in FIG. 2, the magnetic recording head 51 is installed on a head slider 3. The head slider 3 is made of e.g. $Al_2O_3$/TiC. The head slider 3 is designed and manufactured so as to be able to relatively move on the magnetic recording medium 80 such as a magnetic disk while floating thereabove or being in contact therewith.

The head slider 3 has an air inflow side 3A and an air outflow side 3B. The magnetic recording head 51 is located on e.g. the side surface of the air outflow side 3B. Thus, the magnetic recording head 51 installed on the head slider 3 relatively moves on the magnetic recording medium 80 while floating thereabove or being in contact therewith.

As shown in FIG. 1, the magnetic recording medium 80 includes a medium substrate 82 and a magnetic recording layer 81 provided thereon. The magnetization 83 of the magnetic recording layer 81 is controlled to a prescribed direction by the magnetic field applied from the writing head section 60, and thereby writing is performed. At this time, the magnetic recording medium 80 moves relative to the magnetic recording head 51 in the medium moving direction 85.

On the other hand, the reproducing head section 70 reads the direction of magnetization of the magnetic recording layer 81.

Here, as shown in FIG. 1, the stacking direction of the oscillation layer 10a, the intermediate layer 22, and the spin injection layer 30 is defined as an X-axis direction. A direction perpendicular to the plane at which the main magnetic pole 61 opposes the magnetic recording medium 80 is defined as a Z-axis direction. A direction perpendicular to the X-axis direction and the Z-axis direction is defined as a Y-axis direction.

That is, the X-axis direction is the track traveling direction. The Y-axis direction is the track width direction. The Z-axis direction is the direction perpendicular to the medium surface.

As described above, the spin torque oscillator 10 includes a stacked structure body 25 including an oscillation layer 10a, a spin injection layer 30, and an intermediate layer 22 provided between the oscillation layer 10a and the spin injection layer 30.

At this time, in the example shown in FIG. 1, the stacking order in the stacked structure body 25 is such that the oscillation layer 10a is located on the main magnetic pole 61 side and the spin injection layer 30 is located on the shield 62 side. That is, the main magnetic pole 61, the oscillation layer 10a, the intermediate layer 22, the spin injection layer 30, and the shield 62 are arranged in this order. However, as described below, the arrangement may be reversed. That is, the main magnetic pole 61, the spin injection layer 30, the intermediate layer 22, the oscillation layer 10a, and the shield 62 may be arranged in this order.

In the following description, as illustrated in FIG. 1, a case is described in which the magnetic recording head 51 includes the main magnetic pole 61, the oscillation layer 10a, the intermediate layer 22, the spin injection layer 30, and the shield 62 arranged in this order.

That is, in this example, the oscillation layer 10a and the main magnetic pole 61 are located close to each other in order to efficiently superpose the recording magnetic field Hr and the radio frequency magnetic field Hac.

The intermediate layer 22 can be made of e.g. Cu.

The spin injection layer 30 can be made of an alternately stacked artificial lattice such as Co/Ni, Co/Pt, and Co/Pd, or a CoFeB/CoPt stacked layer (CoFeB serving as a foundation) or FePt, which are known to be perpendicularly oriented on the foundation of the intermediate layer 22 made of Cu.

As shown in FIG. 3, on both sides of stacked layer surfaces of the stacked structure body 25, a pair of electrodes, i.e., a first electrode 41 on the oscillation layer 10a side and a second electrode 42 on the spin injection layer 30 side, can be provided. However, the role of each of the first and second electrodes 41 and 42 can be served by, e.g., one of the main magnetic pole 61 and the shield 62. In the example shown in FIG. 1, the main magnetic pole 61 doubles as the first electrode 41 and the shield 62 doubles as the second electrode 42.

Thus, the first electrode 41 (or the main magnetic pole 61) and the second electrode 42 (or the shield 62) allow a current to be passed in the stacked structure body 25.

That is, a current can be supplied to the stacked structure body 25 through at least one of the shield 62 and the main magnetic pole 61.

The coercivity of the oscillation layer 10a is lower than the magnetic field applied from the main magnetic pole 61.

On the other hand, the coercivity of the spin injection layer 30 can be set lower than the magnetic field applied from the main magnetic pole 61. The spin injection layer 30 and the shield 62 may be exchange-coupled. That is, the spin injection layer 30 and the shield 62 may be stacked directly, or via a nonmagnetic layer of e.g. Cu of 3 nm or less, and thus integrated together by exchange coupling.

In the spin torque oscillator 10, via the first and second electrodes 41 and 42 (or conductors doubling as the first and second electrodes 41 and 42), a driving electron flow Ie can be passed in the direction from the oscillation layer 10a to the spin injection layer 30 to generate a radio frequency magnetic field from the oscillation layer 10a. The driving current density is preferably set in the range from $5 \times 10^7$ A/cm$^2$ to $1 \times 10^9$ A/cm$^2$, and suitably adjusted so as to achieve a desired oscillation state.

Thus, in the magnetic recording head 51 according to this embodiment, a current can be passed from the spin injection layer (second magnetic layer) 30 to the oscillation layer 10a (first magnetic layer).

Next, the operation of the magnetic recording head 51 is described.

Figure 4:
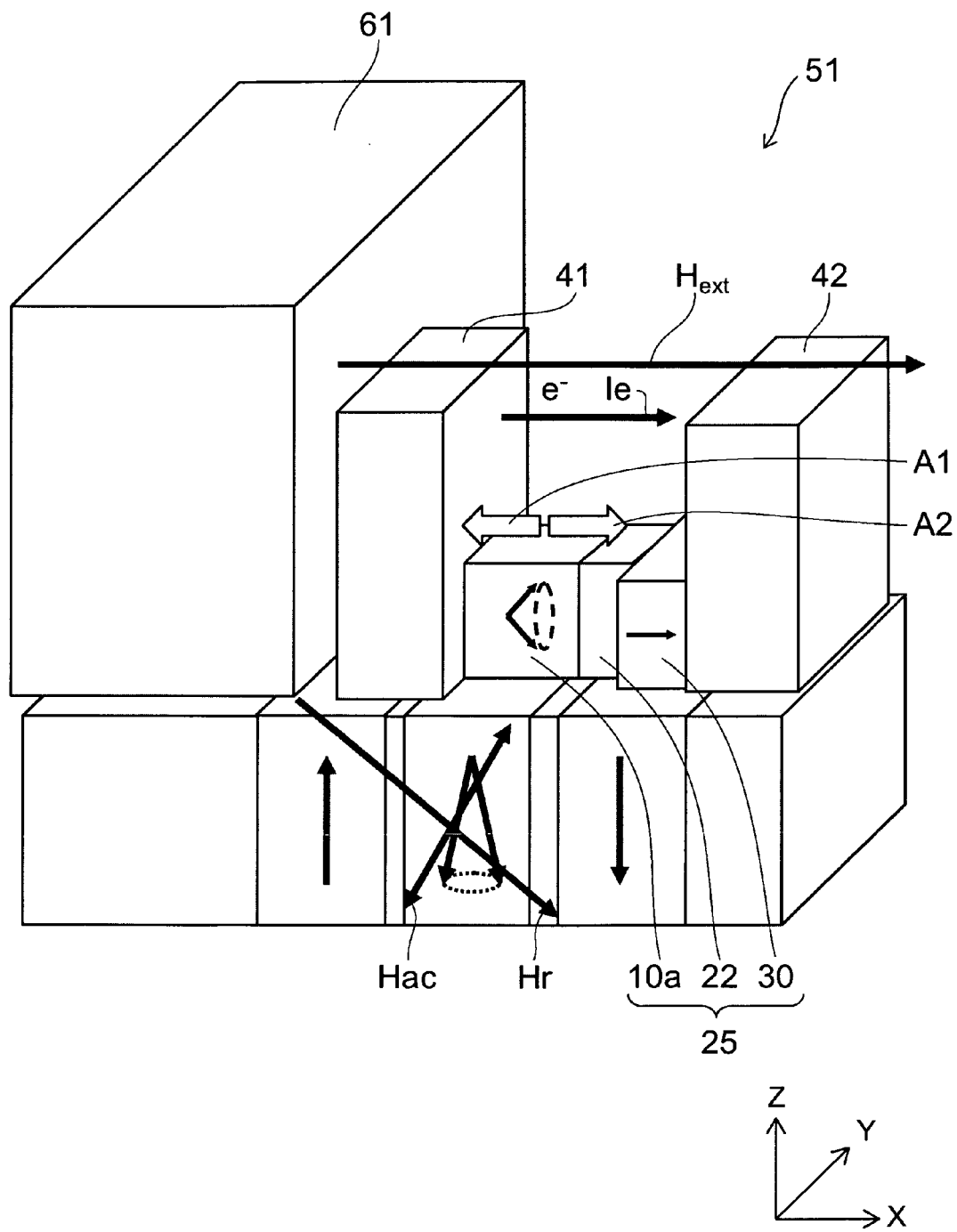
FIG. 4 is a schematic perspective view illustrating the operation of the magnetic recording head according to the first embodiment.

FIG. 4 is a schematic perspective view illustrating the operation of the magnetic recording head according to the first embodiment.

Figure 5:
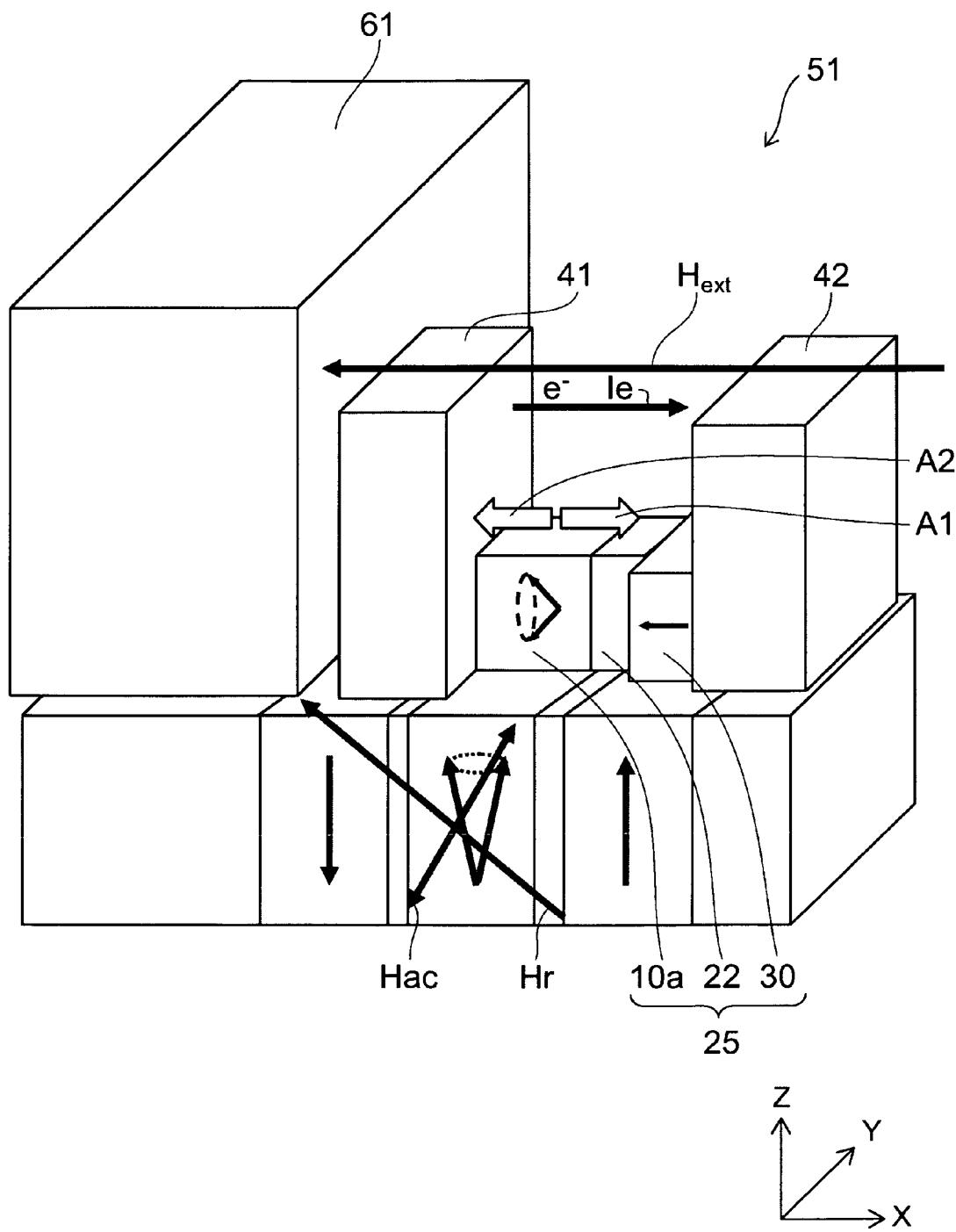
FIG. 5 is one other schematic perspective view illustrating the operation of the magnetic recording head according to the first embodiment.

FIG. 5 is one other schematic perspective view illustrating the operation of the magnetic recording head according to the first embodiment.

That is, FIG. 4 illustrates the case where a magnetic field is applied from the main magnetic pole 61 toward the shield 62. FIG. 5 illustrates the case where a magnetic field is applied from the shield 62 toward the main magnetic pole 61. In these figures, the shield 62 is not shown.

As shown in FIG. 4, in the case where the external magnetic field $H_{ext}$ generated in the main magnetic pole 61 is a magnetic field in the direction from the main magnetic pole 61 to the shield 62, the external magnetic field $H_{ext}$ from the main magnetic pole 61 is higher than the coercivity of the spin injection layer 30, or the shield 62 and the spin injection layer 30 are exchange-coupled. Hence, the spin injection layer 30 is magnetized in the positive direction (i.e., a positive direction of the X-axis). At this time, a driving electron flow Ie is passed from the oscillation layer 10a to the spin injection layer 30. Of the electrons passed through the oscillation layer 10a, the electron having a spin opposite to that of the spin injection layer 30 is reflected at the interface between the intermediate layer 22 and the spin injection layer 30. The spin angular momentum of this electron is transferred to the magnetization of the oscillation layer 10a. By the action of the spin torque due to this transfer, in the oscillation layer 10a, the effective magnetic field A2 is balanced with the spin torque A1. Thus, the oscillation layer 10a undergoes precession and oscillates. Consequently, a radio frequency magnetic field Hac is generated.

On the other hand, FIG. 5 shows the case where, in the state of no current passage, the external magnetic field $H_{ext}$ generated in the main magnetic pole 61 is a magnetic field in the direction from the shield 62 to the main magnetic pole 61. Also in this case, similar to FIG. 4, the external magnetic field $H_{ext}$ from the main magnetic pole 61 is higher than the coercivity of the spin injection layer 30. Hence, the spin injection layer 30 is magnetized in the negative direction (i.e., a negative direction of the X-axis). Consequently, in the oscillation layer 10a, the effective magnetic field A2 is balanced with the spin torque A1, and the oscillation layer 10a oscillates. Also in this case, similar to FIG. 4, by the action of the spin torque from the spin injection layer 30 on the oscillation layer 10a, the magnetization of the oscillation layer 10a oscillates. Consequently, a radio frequency magnetic field Hac is generated.

Thus, in the magnetic recording head 51, irrespective of the direction of the recording magnetic field Hr generated by the main magnetic pole 61, the direction of the magnetic field applied to the spin torque oscillator 10 by the main magnetic pole 61, the direction of the magnetization Mz of the oscillation layer 10a, and the direction of the magnetization Mz of the spin injection layer 30 are generally parallel. Both the oscillation frequency and the generated magnetic field in the oscillation layer 10a are left unchanged. This enables stable operation of radio frequency magnetic field assisted recording. Here, the aforementioned "generally parallel" encompasses inclination of several degrees.

In order to realize stable oscillation by precession about the magnetization direction, in the oscillation layer 10a, the dimension in the track width direction (the dimension in the Y-axis direction) is preferably made equal to the dimension in the direction perpendicular to the medium facing surface (the dimension in the Z-axis direction).

Furthermore, in the magnetic recording head 51 according to this embodiment, the area of the film surface of the spin injection layer 30 is larger than the area of the film surface of the oscillation layer 10a.

In the magnetic recording head 51 illustrated in FIG. 1 and FIG. 3, the spin injection layer 30 is provided close to the shield 62. Furthermore, in this example, the film surface of the spin injection layer 30 has a shape comparable to or smaller than the film surface of the shield 62. That is, the size of the film surface of the spin injection layer 30 opposing the shield 62 is comparable to or smaller than the size of the film surface of the shield 62 opposing the main magnetic pole 61. For example, the size of the film surface of the spin injection layer 30 opposing the shield 62 is not larger than the size of the film surface of the shield 62 opposing the main magnetic pole 61.

Here, the "film surface" refers to the deposition surface of atoms at the time of film formation. In the magnetic recording head 51 illustrated in FIG. 1, for instance, films constituting the stacked structure body are formed on a film constituting the main magnetic pole 61. Furthermore, a film constituting the shield 62 is formed on the films constituting the stacked structure body. Thus, the film surface has a feature reflecting the feature of the foundation film or substrate. If the foundation film or substrate has a flat surface, the film surface is a surface parallel to the flat surface. If the foundation film or substrate has a surface with an inclination or feature, the film surface is a surface along the inclination or feature.

The size of the film surface of the spin injection layer 30 only needs to be larger than that of the film surface of the oscillation layer 10a and may be comparable to or smaller than that of the surface of the shield 62 opposing the main magnetic pole 61.

In the example shown in FIG. 1 and FIG. 3, the length in the Y-axis direction (width) of the spin injection layer 30 is longer than that of the oscillation layer 10a. Furthermore, in this example, the length in the Z-axis direction (width) is comparable to that of the oscillation layer 10a. Thus, the film surface of the spin injection layer 30 is set larger than the oscillation layer 10a.

In conventional technologies, the stacked structure body 25 made of the oscillation layer 10a, the intermediate layer 22, and the spin injection layer 30 is formed by collective film formation followed by patterning. Thus, the cross-sectional shape (the shape of the plane parallel to the film surface) of the spin injection layer 30 is comparable to that of the oscillation layer 10a. Hence, the area of the film surface of the spin injection layer 30 is comparable to the area of the film surface of the oscillation layer 10a.

In contrast, in the magnetic recording head 51 according to this embodiment, the film surface of the spin injection layer 30 is set larger than the oscillation layer 10a. Thus, as described below, when the direction of the magnetic field applied from the main magnetic pole 61 to the spin torque oscillator 10 is inverted, the inversion time of the magnetization of the spin injection layer 30 can be reduced.

For speed-up of magnetization inversion of the spin injection layer 30, it is important for the spin injection layer 30 to exhibit large in-plane magnetic anisotropy or small perpendicular magnetic anisotropy. In general, with crystal magnetic anisotropy and shape magnetic anisotropy taken into consideration, the effective anisotropic magnetic field $H_{keff}$ in the perpendicular direction can be expressed as the following equation. The magnetization inversion time decreases with the decrease of the value of this anisotropic magnetic field $H_{keff}$.

$$H_{keff} = H_k - Nd \cdot Bs$$

where $H_k$ is the perpendicular crystal anisotropic magnetic field of the spin injection layer 30, Bs is the saturation magnetic flux density of the spin injection layer 30 (i.e., 4 nMs, where Ms is the saturation magnetization), and Nd is the demagnetizing factor of the spin injection layer 30.

In the magnetic recording head 51 according to this embodiment, the area of the film surface of the spin injection layer 30 is larger than conventional, and the demagnetizing factor Nd is larger. Consequently, when the direction of the magnetic field applied from the main magnetic pole 61 to the spin torque oscillator 10 is inverted, the inversion time of the magnetization of the spin injection layer 30 can be reduced.

For instance, in the case of CoPt, the saturation magnetic flux density Bs is 14.6 kOe (the saturation magnetization is 1150 emu/cc), and the perpendicular anisotropic magnetic field $H_k$ is 14 kOe. At this time, if the demagnetizing factor Nd increases by approximately 10% from 0.5, the effective perpendicular anisotropic magnetic field $H_{keff}$ decreases by approximately 10%.

In the magnetic recording head 51 according to this embodiment, the area of the film surface of the spin injection layer 30 is large, and the demagnetizing factor Nd is large. Hence, the time required for the spin injection layer 30 to change its magnetization direction to the direction of the bias magnetic field (external magnetic field $H_{ext}$), i.e., inversion time T, can be reduced.

Furthermore, in addition to the above effect of reducing the inversion time, increasing the area of the film surface of the spin injection layer 30 has the following effect. When the spin injection layer 30 is magnetized by the external magnetic field $H_{ext}$ from the main magnetic pole 61, even if the magnetization of the spin injection layer 30 receives a spin torque from polarized electrons passed through the oscillation layer 10a, the spin injection layer 30 is stably magnetized. This effect is achieved because in the spin injection layer 30, the magnetization of the current-passing region is stabilized under the influence of the exchange coupling force from the magnetization of the non-current-passing region.

Thus, in the magnetic recording head 51 according to this embodiment, the magnetization of the spin injection layer 30 is efficiently inverted by the external magnetic field $H_{ext}$ applied from the main magnetic pole 61 to the spin torque oscillator 10, and the spin injection layer 30 is stably magnetized after inversion. That is, the inversion time τ is reduced.

That is, in the magnetic recording head 51 according to this embodiment, the inversion time of the spin injection layer is reduced. Thus, a magnetic recording head with stable operation and high efficiency can be provided.

Furthermore, as illustrated in FIG. 1, if the main magnetic pole 61 or the shield 62 doubles as the electrode, or if the electrode is significantly thinned, then the gap between the main magnetic pole 61 or the shield 62 and the spin injection layer 30 can be narrowed so as to allow interaction by the exchange coupling force. This exchange coupling enables the magnetization of the spin injection layer 30 to swing integrally with the magnetization of the shield 62 or the main magnetic pole 61. Thus, the spin injection layer 30 can be inverted at the same rate as the inversion of the recording magnetic field Hr. Furthermore, use of the spin injection layer 30 having magnetic anisotropy in the perpendicular-to-plane direction can suppress the fluctuation of the surface magnetization of the shield 62 or the main magnetic pole 61 on the oscillation layer 10a side due to the spin torque from the oscillation layer 10a. Thus, stable oscillating operation can be realized.

That is, as shown in FIG. 1, if at least one of the main magnetic pole 61 and the shield 62 doubles as the electrode (first electrode 41 and second electrode 42), an effect further surpassing the inversion time reduction effect is achieved. The shield 62 (or the main magnetic pole 61) is stacked directly, or via an ultrathin layer (less than several nm thick to enable exchange coupling), on the spin injection layer 30 having perpendicular magnetic anisotropy. By this structure, the gap between the main magnetic pole 61 or the shield 62 and the spin injection layer 30 can be narrowed so as to allow interaction by the exchange coupling force. This exchange coupling enables the magnetization of the spin injection layer 30 to swing integrally with the magnetization of the shield 62 or the main magnetic pole 61. Thus, the spin injection layer 30 can be inverted at the same rate as the inversion of the recording magnetic field Hr.

In the magnetic recording head 51 according to this embodiment, the spin injection layer 30 is provided independently of the shield 62. Hence, as compared with the case where the spin injection layer 30 doubles as the shield 62, the problem of the magnetization fluctuation caused by the spin torque applied from the oscillation layer 10a to the spin injection layer 30 is suppressed, and the oscillating operation is stabilized.

In the magnetic recording head 51 according to this embodiment, the size of the film surface of the intermediate layer 22 is arbitrary. That is, the shape of the film surface of the intermediate layer 22 can be configured arbitrarily and independently of the oscillation layer 10a and the spin injection layer 30. In the following, for simplicity of description, a case is described in which the film surface of the intermediate layer is comparable in size to the oscillation layer 10a. Alternatively, a case is described in which the shape of the film surface of the oscillation layer 10a and the intermediate layer 22 is continuously varied.

In the following, an example of a method for manufacturing the magnetic recording head 51 according to this embodiment is described.

FIGS. 6A to 6F are schematic cross-sectional views of processes illustrating the method for manufacturing a magnetic recording head according to the first embodiment.

In this example, the main magnetic pole 61 doubles as the first electrode 41, and the shield 62 doubles as the second electrode 42.

Figure 6A:
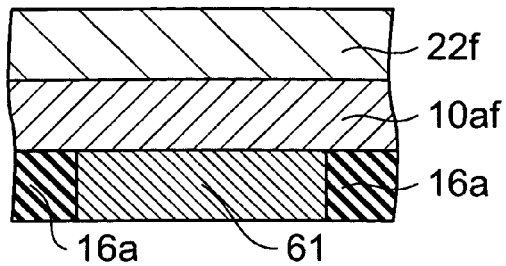
FIGS. 6A to 6F are schematic cross-sectional views of processes illustrating a method for manufacturing the magnetic recording head according to the first embodiment.

First, as shown in FIG. 6A, for instance, a main magnetic pole 61 and an insulating layer 16a therearound are formed. Then, on the main magnetic pole 61 and the insulating layer 16a, an oscillation layer film 10af constituting an oscillation layer 10a and an intermediate layer film 22f constituting an intermediate layer 22 are formed.

Figure 6D:
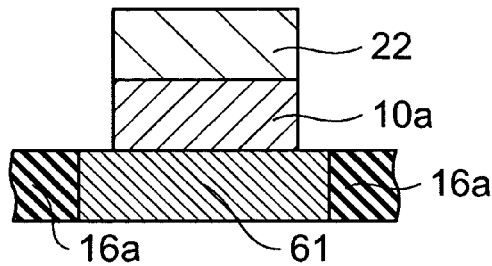
Figure 6B:
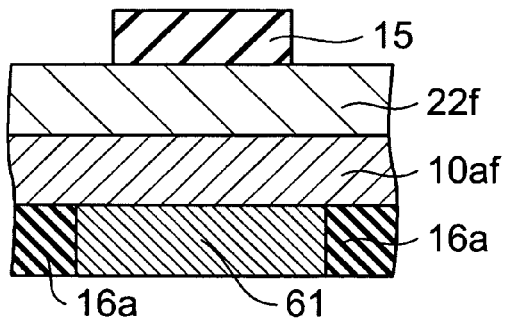

Next, as shown in FIG. 6B, a resist 15 having a prescribed shape is formed by photolithography.

Figure 6E:
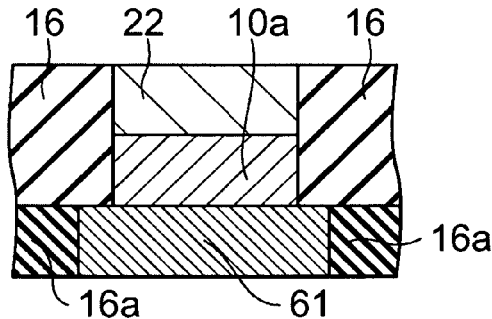
Figure 6C:
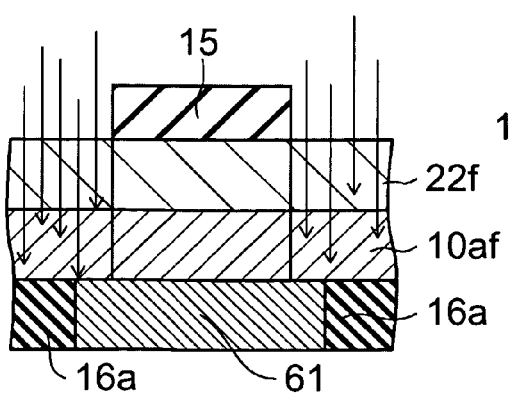

Next, as shown in FIG. 6C, for instance, by the ion milling method, the intermediate layer film 22f and the oscillation layer film 10af exposed from the resist 15 are removed. Thus, an intermediate layer 22 and an oscillation layer 10a are formed.

Next, as shown in FIG. 6D, the resist 15 is removed.

Next, as shown in FIG. 6E, a buried insulating layer 16 is buried above the main magnetic pole 61 and the insulating layer 16a and on the side surface of the oscillation layer 10a and the intermediate layer 22.

Figure 6F:
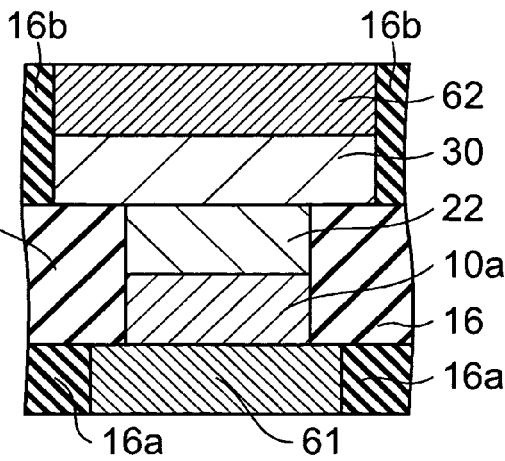

Next, as shown in FIG. 6F, on the intermediate layer 22 and the buried insulating layer 16, a spin injection layer film 30f constituting a spin injection layer 30 and a shield film 62f constituting a shield 62 are formed.

At this time, before forming the spin injection layer film 30f, CMP (chemical mechanical polishing) processing or ion milling may be performed for planarization so that the buried insulating layer 16 is made flush with the intermediate layer 22.

Subsequently, the spin injection layer film 30f and the shield film 62f are patterned as appropriate by e.g. a photolithography process. At this time, the patterning is performed so that the film surface of the spin injection layer 30 is made larger than the film surface of the oscillation layer 10a. Thus, the spin injection layer 30 and the shield 62 are formed.

Subsequently, an insulating film 16 is formed on the side surface of (and above) the spin injection layer 30 and the shield 62, and shaped for planarization by e.g. CMP as necessary.

Thus, as illustrated in FIG. 1 and FIG. 3, the magnetic recording head 51 according to this embodiment can be formed with a configuration in which the film surface of the spin injection layer 30 is larger than the oscillation layer 10a (and furthermore, with a structure in which the main magnetic pole 61 and the shield 62 double as electrodes).

As in this example, in the case where the shield 62 doubles as the electrode, the size of the spin injection layer 30 is generally matched with the size of the shield 62. This enables collective patterning of the shield 62 and the spin injection layer 30, and the number of processes can be reduced.

At this time, the side surface of the portion of the shield 62 opposing the main magnetic pole 61 (the surface non-parallel to the surface of the shield 62 opposing the main magnetic pole 61) is located flush with the side surface of the spin injection layer 30 (the surface non-parallel to the film surface).

In the above manufacturing method, as described above, at least one of the first electrode 41 and the second electrode 42 can be provided independently of the main magnetic pole 61 or the shield 62.

FIGS. 7A to 7F are schematic cross-sectional views of processes illustrating one other method for manufacturing a magnetic recording head according to the first embodiment.

In this example, the first electrode 41 and the second electrode 42 are provided independently of the main magnetic pole 61 and the shield 62.

Figure 7A:
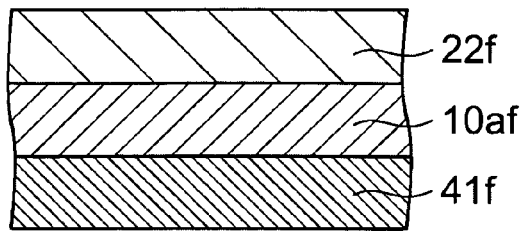
FIGS. 7A to 7F are schematic cross-sectional views of processes illustrating one other method for manufacturing the magnetic recording head according to the first embodiment.

First, as shown in FIG. 7A, for instance, on a main magnetic pole, not shown, a first electrode film 41f constituting a first electrode 41, an oscillation layer film 10af constituting an oscillation layer 10a, and an intermediate layer film 22f constituting an intermediate layer 22 are formed.

Figure 7D:
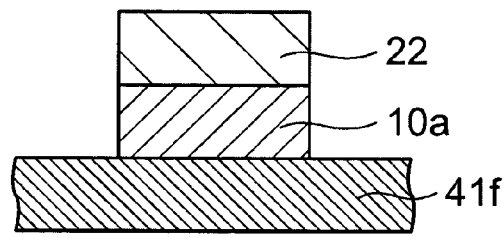
Figure 7B:
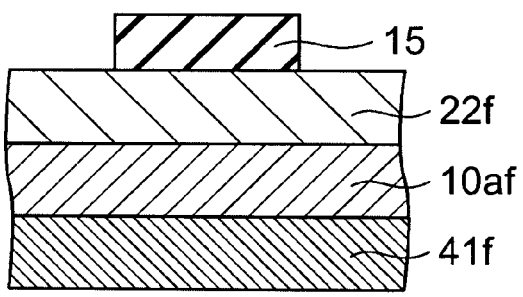

Next, as shown in FIG. 7B, a resist 15 having a prescribed shape is formed by photolithography.

Figure 7E:
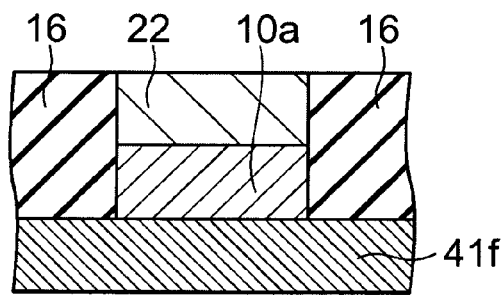
Figure 7C:
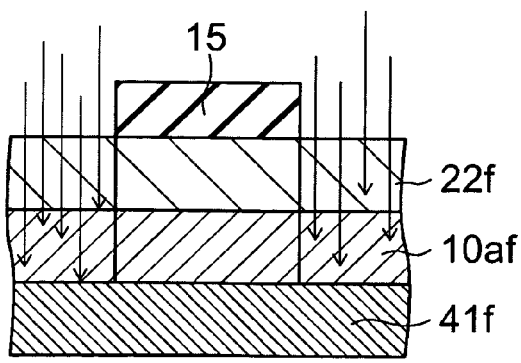

Next, as shown in FIG. 7C, for instance, by the ion milling method, the intermediate layer film 22f and the oscillation layer film 10af exposed from the resist 15 are removed. Thus, an intermediate layer 22 and an oscillation layer 10a are formed.

Next, as shown in FIG. 7D, the resist 15 is removed.

Next, as shown in FIG. 7E, a buried insulating layer 16 is buried above the first electrode film 41f and on the side surface of the oscillation layer 10a and the intermediate layer 22.

Figure 7F:
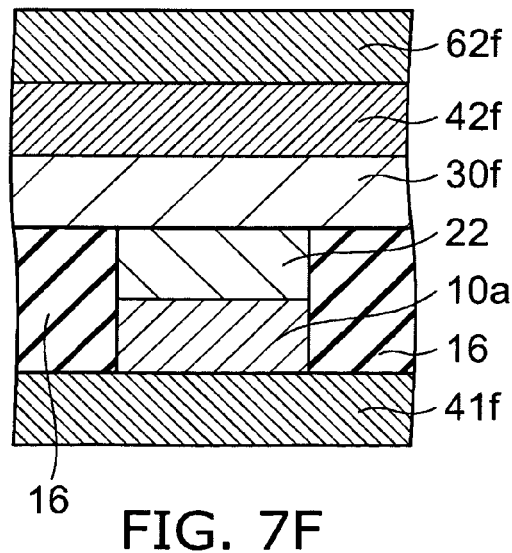

Next, as shown in FIG. 7F, on the intermediate layer 22 and the buried insulating layer 16, an intermediate layer 22 is newly formed and added (not shown). Then, a spin injection layer film 30f constituting a spin injection layer 30, a second electrode film 42f constituting a second electrode 42, and a shield film 62f constituting a shield 62 are formed. At this time, before forming the spin injection layer film 30f, CMP processing or ion milling may be performed for planarization so that the buried insulating layer 16 is made flush with the intermediate layer 22.

Subsequently, the spin injection layer film 30f, the second electrode film 42f, and the shield film 62f are patterned as appropriate by e.g. a photolithography process. Here, the patterning is performed so that the film surface of the spin injection layer 30 is made larger than the oscillation layer 10a.

Thus, the spin injection layer 30, the second electrode 42, and the shield 62 are formed. Thus, the magnetic recording head 51 according to this embodiment can be formed with a configuration in which the film surface of the spin injection layer 30 is larger than the oscillation layer 10a.

In the magnetic recording head 51 according to this embodiment, the first and second electrodes 41 and 42 can be made of a material having low electrical resistance and being resistant to oxidation, such as Ti and Cu. However, as described above, at least one of the first and second electrodes 41 and 42 may double as one or both of the main magnetic pole 61 and the shield 62.

An intermediate layer made of e.g. Pt, Ru, Pd, Rh, Ir, Cr, Ta, Nb, Zr, Hf, Ti, or Cu may be provided between the oscillation layer 10a and the main magnetic pole 61 or the shield 62 doubling as the electrode (at least one of the first electrode 41 and the second electrode 42). This intermediate layer serves to adjust the propagation of spin torque and exchange coupling. This intermediate layer also serves as a foundation of the oscillation layer 10a or the shield 62 to facilitate the crystal growth thereof.

The intermediate layer 22 can be made of a nonmagnetic material having high spin transmittance such as Cu, Au, and Ag. The film thickness of the intermediate layer 22 is preferably set in the range from one atomic layer to 3 nm. This enables reduction of the exchange coupling between the oscillation layer 10a and the spin injection layer 30.

The oscillation layer 10a can be made of a high-Bs soft magnetic material generating a magnetic field during oscillation. The layer thickness of the oscillation layer 10a is preferably set to 5 to 20 nm. By making the layer thickness of the oscillation layer 10a relatively thick, the generated magnetic field intensity can be increased.

Preferably, the spin injection layer 30 is made of a material with the magnetization oriented in the perpendicular-to-plane direction, and has a layer thickness of 2 to 60 nm.

The oscillation layer 10a can be made of a soft magnetic layer of e.g. CoFe, CoNiFe, NiFe, CoZrNb, FeN, FeSi, FeAlSi, FeCoAl, or FeCoCu having relatively high saturation magnetic flux density and having magnetic anisotropy in the in-plane direction, or a CoCr-based magnetic alloy film with the magnetization oriented in the in-plane direction.

The spin injection layer 30 can be made of an alternately stacked artificial lattice such as Co/Ni, Co/Pt, and Co/Pd, or a CoFeB/CoPt stacked layer (CoFeB serving as a foundation) or FePt, which are known to be perpendicularly oriented on the foundation of the intermediate layer 22 made of Cu. Alternatively, it is also possible to use a material layer having good perpendicular orientation with the magnetization oriented in the perpendicular-to-plane direction, such as a CoCrPt, CoCrTa, CoCrTaPt, CoCrTaNb, and other CoCr-based magnetic layers, a TbFeCo and other Re-TM amorphous alloy magnetic layers, and a SmCo-based alloy magnetic layer. Furthermore, more than one of the above materials may be stacked. Thus, the saturation magnetic flux density and anisotropic magnetic field of the spin injection layer 30 can be adjusted.

The main magnetic pole 61 and the shield 62 can be made of a soft magnetic layer of e.g. FeCo, CoFe, CoNiFe, NiFe, CoZrNb, FeN, FeSi, or FeAlSi having relatively high saturation magnetic flux density.

In the main magnetic pole 61, the portion on the medium facing surface 61s side and the remaining portion may be made of different materials. More specifically, for instance, the portion on the medium facing surface 61s side may be made of e.g. FeCo, CoNiFe, or FeN having particularly high saturation magnetic flux density to increase the magnetic field generated in the magnetic recording medium 80 and the spin torque oscillator 10. The remaining portion may be made of e.g. NiFe having particularly high permeability.

As illustrated in FIG. 1, to increase the magnetic field generated in the magnetic recording medium 80 and the spin torque oscillator 10, the shape of the main magnetic pole 61 on the medium facing surface 61s side may be made smaller than the back gap portion. Then, the magnetic flux concentrates on the portion on the medium facing surface 61s side, and a magnetic field with high intensity can be generated.

In the magnetic recording head 51 according to this embodiment, the coercivity of the oscillation layer 10a and the spin injection layer 30 is lower than the magnetic field applied from the main magnetic pole 61 to the spin torque oscillator 10. Hence, the magnetization direction of the spin injection layer 30 and the magnetization direction of the oscillation layer 10a are always kept parallel irrespective of the direction of the recording magnetic field Hr generated by the main magnetic pole 61. Thus, the oscillation condition can be made independent of the writing direction.

In a writing head consisting only of the main magnetic pole 61 and the spin torque oscillator 10, the magnetic field generated from the main magnetic pole 61 is generated primarily between the main magnetic pole 61 and the magnetic recording medium 80. Then, there are cases where the magnetic field cannot be sufficiently applied to the spin torque oscillator 10, and the magnetic field generated from the main magnetic pole 61 may be made smaller than the coercivity of the spin injection layer 30. Thus, the magnetic recording head 51 according to this embodiment includes a shield 62 for attracting the magnetic field generated from the main magnetic pole 61.

More specifically, a shield 62 is provided opposite to the main magnetic pole 61, and the spin torque oscillator 10 is provided between the main magnetic pole 61 and the shield 62. By adjusting the distance between the main magnetic pole 61 and the shield 62 and the shape of the main magnetic pole 61, the magnetic field applied to the spin torque oscillator 10 can be optimized. If the distance between the main magnetic pole 61 and the shield 62 is distant, the magnetic field from the main magnetic pole 61 is directed perpendicularly in the magnetic recording medium 80. However, by decreasing this distance, a magnetic field oblique to the perpendicular direction is generated in the magnetic recording medium 80. Advantageously, this oblique magnetic field facilitates inverting the magnetization of the magnetic recording medium 80 by a low magnetic field.

In the magnetic recording head 51 according to this embodiment, the components of the reproducing head section 70 and the components of the above writing head section 60 are separated by insulators such as alumina and $SiO_2$, not shown. Furthermore, for instance, the spin torque oscillator 10 is formed on a suitable substrate or foundation, not shown, and separated from other circuits by an insulator such as alumina and $SiO_2$, not shown.

FIGS. 8A to 8D are schematic views illustrating the configuration of part of a magnetic recording head according to the first embodiment.

Figure 8A:
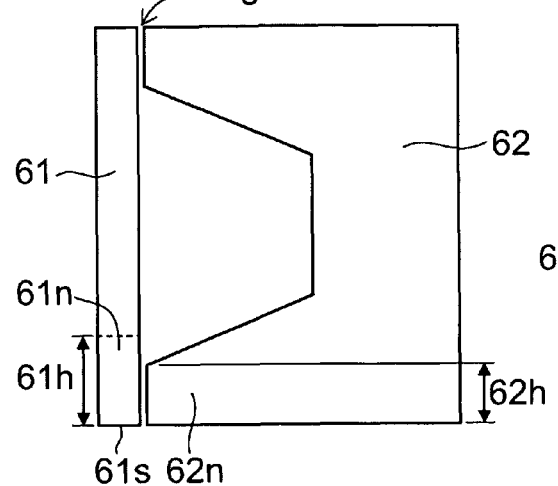
FIGS. 8A to 8D are schematic views illustrating the configuration of part of the magnetic recording head according to the first embodiment.
Figure 8B:
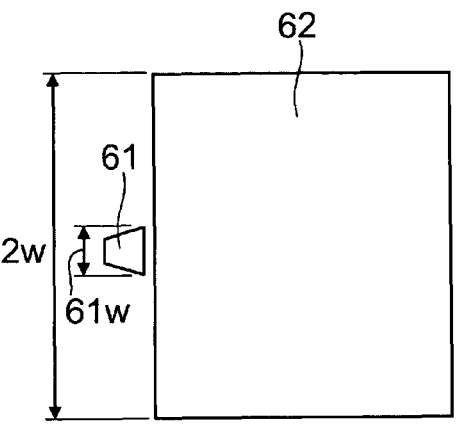
Figure 8C:
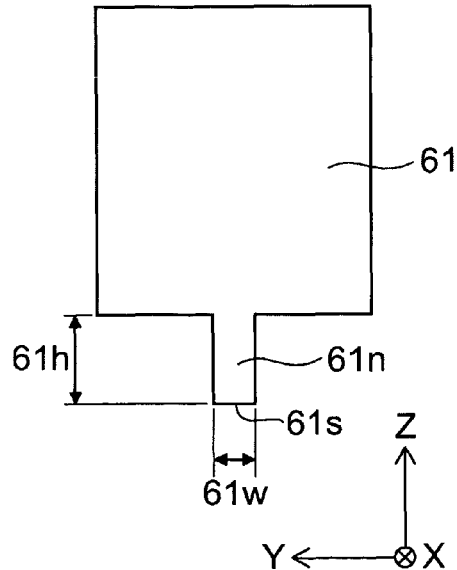
Figure 8D:
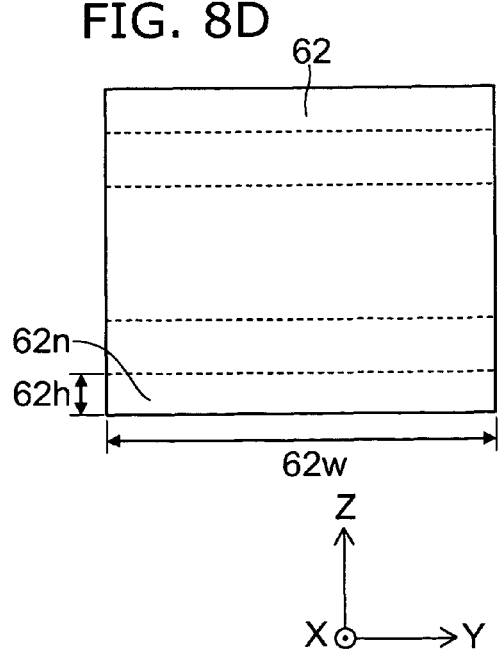

More specifically, FIGS. 8A to 8D show an example of the configuration of the main magnetic pole 61 and the shield 62. In FIGS. 8A to 8D, only the main magnetic pole 61 and the shield 62 are extracted and depicted. FIG. 8A is a plan view as viewed in the Y-axis direction from negative toward positive in FIG. 1. FIG. 8B is a plan view as viewed in the Z-axis direction from negative toward positive (i.e., in the direction toward the medium facing surface 61s). FIG. 8C is a plan view of the main magnetic pole 61 as viewed in the X-axis direction from negative toward positive. FIG. 8D is a plan view of the shield 62 as viewed in the X-axis direction from positive toward negative.

As shown in FIGS. 8A to 8D, the main magnetic pole 61 has a medium facing surface 61s. The neighborhood of the medium facing surface 61s, i.e., the medium facing surface neighboring portion 61n, has e.g. a generally rectangular shape in plan view as viewed in the X-axis direction. In the portion distant from the medium facing surface 61s, the main magnetic pole 61 can be shaped so that the width in the Y-axis direction is wider than in the medium facing surface neighboring portion 61n.

On the other hand, the shield 62 is located close to the main magnetic pole 61 near the medium facing surface 61s of the main magnetic pole 61. In the portion distant from the medium facing surface 61s of the main magnetic pole 61, the shield 62 can be shaped so that the distance between the shield 62 and the main magnetic pole 61 is increased. The shield 62 includes a medium facing surface adjacent portion 62n located close to the medium facing surface neighboring portion 61n of the main magnetic pole 61. As described below, the oscillation layer 10a and the intermediate layer 22 are provided between the medium facing surface neighboring portion 61n and the medium facing surface adjacent portion 62n.

In the portion distant from the medium facing surface 61s of the main magnetic pole 61, the main magnetic pole 61 is again located close to the shield 62. Here, a gap 61g is provided between the main magnetic pole 61 and the shield 62. To ensure insulation between the main magnetic pole 61 and the shield 62, an insulating layer having a thickness of e.g. 5 angstroms or more can be provided in the gap 61g. Furthermore, to ensure magnetic coupling between the main magnetic pole 61 and the shield 62, the thickness of this insulating layer (i.e., the distance between the main magnetic pole 61 and the shield 62 in the gap 61g) is preferably set to 1 nm to 2 nm or less.

FIGS. 9A to 9D are schematic side views illustrating the configuration of a magnetic recording head according to the first embodiment.

More specifically, FIGS. 9A to 9D are side views of the magnetic recording head as viewed in the Y-axis direction. FIGS. 9A to 9D illustrate various configurations of the magnetic recording head according to this embodiment.

Figure 9A:
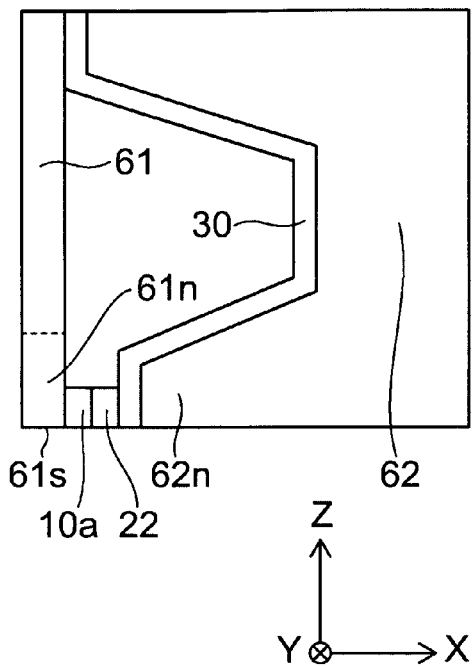
FIGS. 9A to 9D are schematic side views illustrating the configuration of the magnetic recording head according to the first embodiment.

As shown in FIG. 9A, the oscillation layer 10a and the intermediate layer 22 can be provided between the medium facing surface neighboring portion 61n of the main magnetic pole 61 and the medium facing surface adjacent portion 62n of the shield 62. On the entire region of the surface of the shield 62 opposing the main magnetic pole 61, the spin injection layer 30 can be provided on the main magnetic pole 61 side of the shield 62. That is, as viewed in the X-axis direction, the spin injection layer 30 and the shield 62 have the same shape. At this time, the shape of the spin injection layer 30 and the shield 62 can be simultaneously processed. This is advantageous for manufacturing. In this case, the film surface of the spin injection layer 30 is larger than the oscillation layer 10a and comparable in size to the shield 62.

When the film surface of the spin injection layer 30 is comparable in size to the shield 62, the film surface of the intermediate layer 22 may be made comparable in size to the shield 62.

Figure 9B:
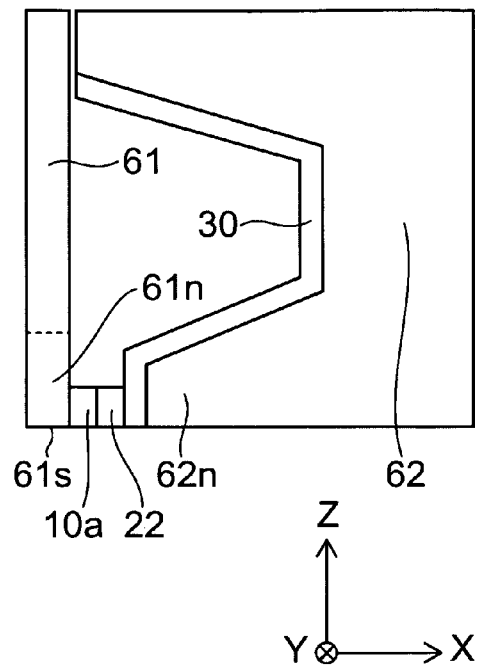

As shown in FIG. 9B, the oscillation layer 10a and the intermediate layer 22 can be provided between the medium facing surface neighboring portion 61n of the main magnetic pole 61 and the medium facing surface adjacent portion 62n of the shield 62. On part of the surface of the shield 62 opposing the main magnetic pole 61, the spin injection layer 30 can be provided on the main magnetic pole 61 side of the shield 62. Here, the film surface of the spin injection layer 30 is larger than the oscillation layer 10a and smaller than the shield 62.

Figure 9C:
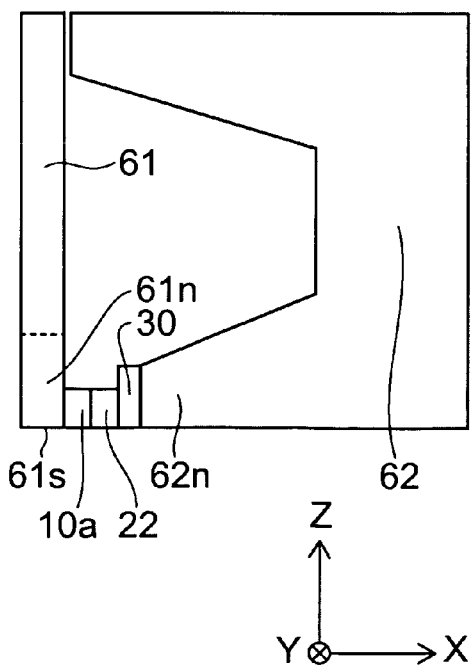

As shown in FIG. 9C, the oscillation layer 10a, the intermediate layer 22, and the spin injection layer 30 can be provided between the medium facing surface neighboring portion 61n of the main magnetic pole 61 and the medium facing surface adjacent portion 62n of the shield 62. Here, the shape of the film surface of the spin injection layer 30 is made comparable to the shape of the surface of the medium facing surface adjacent portion 62n of the shield 62 opposing the main magnetic pole 61. The oscillation layer 10a and the intermediate layer 22 are formed to be smaller than the film surface of the spin injection layer 30. Also in this case, the film surface of the spin injection layer 30 is larger than the oscillation layer 10a and smaller than the shield 62.

Figure 9D:
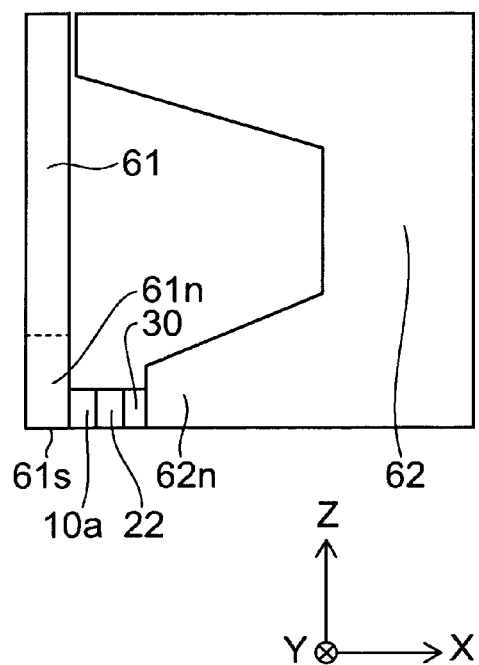

As shown in FIG. 9D, the oscillation layer 10a, the intermediate layer 22, and the spin injection layer 30 can be provided between the medium facing surface neighboring portion 61n of the main magnetic pole 61 and the medium facing surface adjacent portion 62n of the shield 62. At this time, the film surface of the spin injection layer 30 is set smaller than the surface of the medium facing surface adjacent portion 62n of the shield 62 opposing the main magnetic pole 61. The oscillation layer 10a and the intermediate layer 22 are formed to be smaller than the film surface of the spin injection layer 30. Also at this time, the film surface of the spin injection layer 30 is larger than the oscillation layer 10a and smaller than the shield 62.

Thus, the spin injection layer 30 can be variously shaped.

As illustrated in FIGS. 8A to 8D, the medium facing surface neighboring portion 61n of the main magnetic pole 61 has a height (neck height) 61h and a width 61w. On the other hand, the medium facing surface adjacent portion 62n of the shield 62 has a height 62h and a width 62w.

For instance, the width 61w of the medium facing surface neighboring portion 61n of the main magnetic pole 61 may be set smaller than the width 62w of the medium facing surface adjacent portion 62n of the shield 62. Furthermore, the height 61h of the medium facing surface neighboring portion 61n of the main magnetic pole 61 may be set higher than the height 62h of the medium facing surface adjacent portion 62n of the shield 62.

In such cases, the width (length in the Y-axis direction) of the film surface of the oscillation layer 10a can be made equal to or less than the width 61w. Furthermore, the height (length in the Z-axis direction) of the film surface of the oscillation layer 10a can be made equal to or less than the height 62h.

That is, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the oscillation layer 10a can be made smaller than or comparable to the surface defined by the narrower one of the first width and the second width and the lower one of the first height and the second height. For example, the size of the film surface of the oscillation layer 10a is not larger than the size of the surface defined by the narrower one of the first width and the second width and the lower one of the first height and the second height.

Thus, the external magnetic field $H_{ext}$ from the main magnetic pole 61 is applied relatively uniformly to the entirety of the oscillation layer 10a. Advantageously, this enables stabler oscillation.

An electrode may be provided between the spin injection layer 30 and the main magnetic pole 61 or the shield 62 to prevent the exchange coupling force from acting between the spin injection layer 30 and the main magnetic pole 61 or the shield 62. In this case, preferably, the external magnetic field $H_{ext}$ from the main magnetic pole 61 is applied relatively uniformly to the entirety of the spin injection layer 30. The reason for this is to efficiently invert the magnetization of the spin injection layer 30.

That is, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the spin injection layer 30 can also be made smaller than or comparable to the surface defined by the narrower one of the first width and the second width and the lower one of the first height and the second height. For example, the size of the film surface of the spin injection layer 30 is not larger than the size of the surface defined by the narrower one of the first width and the second width and the lower one of the first height and the second height.

However, also in this case, the film surface of the spin injection layer 30 is set larger than the oscillation layer 10a. Advantageously, this reduces the inversion time of the spin injection layer 30, enabling stabler operation.

In the examples illustrated in FIGS. 9A to 9D, the film surface of the intermediate layer 22 is comparable in shape to the oscillation layer 10a. However, as described above, the size and shape of the film surface of the intermediate layer 22 are arbitrary. For instance, the film surface of the intermediate layer 22 can be made comparable in size to the oscillation layer 10a or the spin injection layer 30. Thus, the shape of these films can be simultaneously processed. This is advantageous for manufacturing.

FIGS. 10A to 10D are schematic views illustrating the configuration of part of one other magnetic recording head according to the first embodiment.

More specifically, FIGS. 10A to 10D show another example of the configuration of the main magnetic pole 61 and the shield 62. In FIGS. 10A to 10D, only the main magnetic pole 61 and the shield 62 are extracted and depicted. FIG. 10A is a plan view as viewed in the Y-axis direction from negative toward positive in FIG. 1. FIG. 10B is a plan view as viewed in the Z-axis direction from negative toward positive (i.e., in the direction toward the medium facing surface 61s). FIG. 10C is a plan view of the main magnetic pole 61 as viewed in the X-axis direction from negative toward positive. FIG. 10D is a plan view of the shield 62 as viewed in the X-axis direction from positive toward negative.

As shown in FIGS. 10A to 10D, the main magnetic pole 61 has a medium facing surface 61s. The neighborhood of the medium facing surface 61s, i.e., the medium facing surface neighboring portion 61n, has e.g. a generally rectangular shape in plan view as viewed in the X-axis direction. In the portion distant from the medium facing surface 61s, the main magnetic pole 61 can be shaped so that the width in the Y-axis direction and the X-axis direction is made wider than in the medium facing surface neighboring portion 61n toward the positive side of the Z-axis.

On the other hand, the shield 62 is located close to the main magnetic pole 61 near the medium facing surface 61s of the main magnetic pole 61. In the portion distant from the medium facing surface 61s of the main magnetic pole 61, the shield 62 can be shaped so that the distance between the shield 62 and the main magnetic pole 61 is increased. The shield 62 includes a medium facing surface adjacent portion 62n located close to the medium facing surface neighboring portion 61n of the main magnetic pole 61.

In the portion distant from the medium facing surface 61s of the main magnetic pole 61, the main magnetic pole 61 is again located close to the shield 62. Here, a gap 61g is provided between the main magnetic pole 61 and the shield 62. Also in this case, an insulating layer having a thickness of e.g. 5 angstroms or more can be provided in the gap 61g. The thickness of this insulating layer is preferably set to 1 nm to 2 nm or less.

FIGS. 11A to 11D are schematic side views illustrating the configuration of one other magnetic recording head according to the first embodiment.

More specifically, FIGS. 11A to 11D are side views of the magnetic recording head as viewed in the Y-axis direction. FIGS. 11A to 11D illustrate various configurations of the one other magnetic recording head according to this embodiment.

Figure 11A:
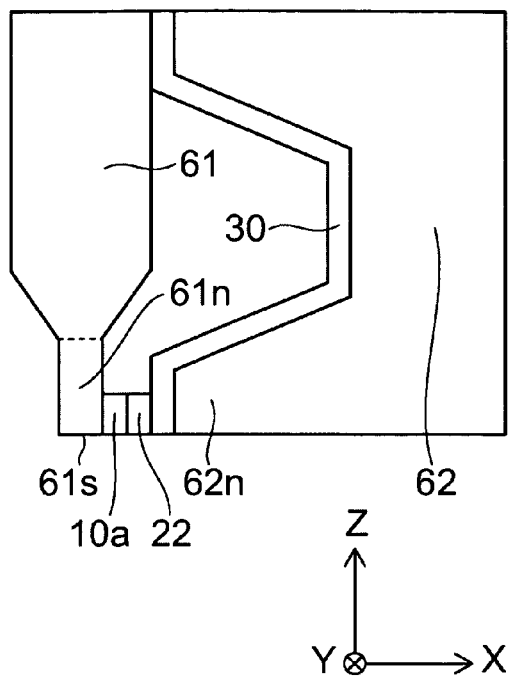
FIGS. 11A to 11D are schematic side views illustrating the configuration of one other magnetic recording head according to the first embodiment.

As shown in FIG. 11A, the oscillation layer 10a and the intermediate layer 22 can be provided between the medium facing surface neighboring portion 61n of the main magnetic pole 61 and the medium facing surface adjacent portion 62n of the shield 62. On the entire region of the surface of the shield 62 opposing the main magnetic pole 61, the spin injection layer 30 can be provided on the main magnetic pole 61 side of the shield 62. That is, as viewed in the X-axis direction, the spin injection layer 30 and the shield 62 have the same shape. At this time, the shape of the spin injection layer 30 and the shield 62 can be simultaneously processed. This is advantageous for manufacturing. In this case, the film surface of the spin injection layer 30 is larger than the oscillation layer 10a and comparable in size to the shield 62.

When the film surface of the spin injection layer 30 is comparable in size to the shield 62, the film surface of the intermediate layer 22 may also be made comparable in size to the shield 62.

Figure 11B:
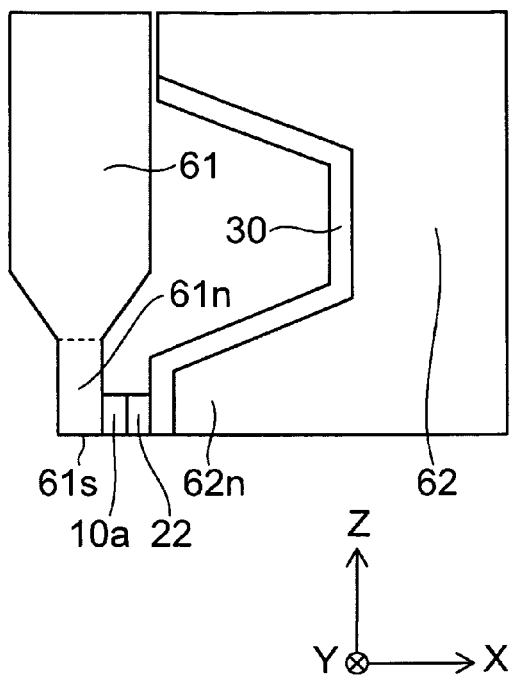

As shown in FIG. 11B, the oscillation layer 10a and the intermediate layer 22 can be provided between the medium facing surface neighboring portion 61n of the main magnetic pole 61 and the medium facing surface adjacent portion 62n of the shield 62. On part of the surface of the shield 62 opposing the main magnetic pole 61, the spin injection layer 30 can be provided on the main magnetic pole 61 side of the shield 62. Here, the film surface of the spin injection layer 30 is larger than the oscillation layer 10a and smaller than the shield 62.

Figure 11C:
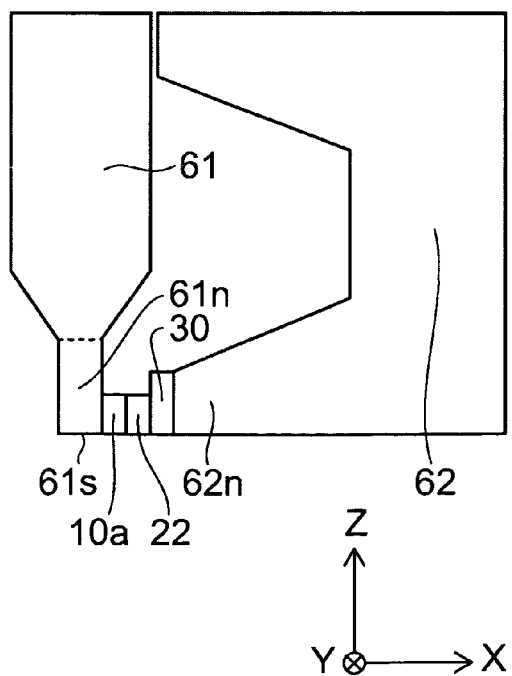

As shown in FIG. 11C, the oscillation layer 10a, the intermediate layer 22, and the spin injection layer 30 can be provided between the medium facing surface neighboring portion 61n of the main magnetic pole 61 and the medium facing surface adjacent portion 62n of the shield 62. At this time, the shape of the film surface of the spin injection layer 30 is made comparable to the shape of the surface of the medium facing surface adjacent portion 62n of the shield 62 opposing the main magnetic pole 61. The oscillation layer 10a and the intermediate layer 22 are formed to be smaller than the film surface of the spin injection layer 30. Also in this case, the film surface of the spin injection layer 30 is larger than the oscillation layer 10a and smaller than the shield 62.

Figure 11D:
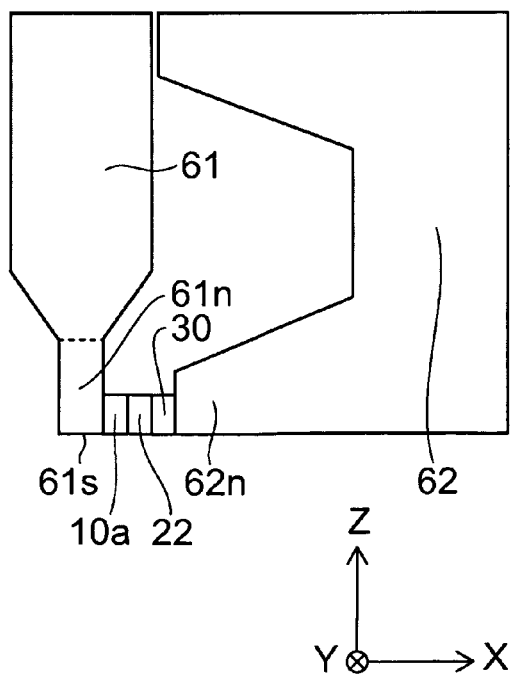

As shown in FIG. 11D, the oscillation layer 10a, the intermediate layer 22, and the spin injection layer 30 can be provided between the medium facing surface neighboring portion 61n of the main magnetic pole 61 and the medium facing surface adjacent portion 62n of the shield 62. At this time, the film surface of the spin injection layer 30 is set smaller than the surface of the medium facing surface adjacent portion 62n of the shield 62 opposing the main magnetic pole 61. The oscillation layer 10a and the intermediate layer 22 are formed to be smaller than the film surface of the spin injection layer 30. Also at this time, the film surface of the spin injection layer 30 is larger than the oscillation layer 10a and smaller than the shield 62. Thus, the spin injection layer 30 can be variously shaped.

Also in this case, as illustrated in FIGS. 10A to 10D, the medium facing surface neighboring portion 61n of the main magnetic pole 61 has a height (neck height) 61h and a width 61w. On the other hand, the medium facing surface adjacent portion 62n of the shield 62 has a height 62h and a width 62w.

For instance, the width 61w of the medium facing surface neighboring portion 61n of the main magnetic pole 61 may be set smaller than the width 62w of the medium facing surface adjacent portion 62n of the shield 62. Furthermore, the height 61h of the medium facing surface neighboring portion 61n of the main magnetic pole 61 may be set higher than the height 62h of the medium facing surface adjacent portion 62n of the shield 62.

Also in this case, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the oscillation layer 10a can be made smaller than or comparable to the surface defined by the narrower one of the first width and the second width and the lower one of the first height and the second height.

Furthermore, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the spin injection layer 30 can also be made smaller than or comparable to the surface defined by the narrower one of the first width and the second width and the lower one of the first height and the second height. However, also in this case, the film surface of the spin injection layer 30 can be set larger than the oscillation layer 10a.

Thus, the external magnetic field $H_{ext}$ from the main magnetic pole 61 is applied relatively uniformly to the entirety of the spin injection layer 30. Hence, advantageously, this enables stabler operation.

In the examples illustrated in FIGS. 11A to 11D, the film surface of the intermediate layer 22 is comparable in shape to the oscillation layer 10a. However, as described above, the shape of the film surface of the intermediate layer 22 is arbitrary. For instance, the film surface of the intermediate layer 22 can be made comparable in size to the oscillation layer 10a or the spin injection layer 30. Thus, the shape of these films can be simultaneously processed. This is advantageous for manufacturing.

The magnetic recording head 51 according to this embodiment described above can be variously modified.

Figure 12A:
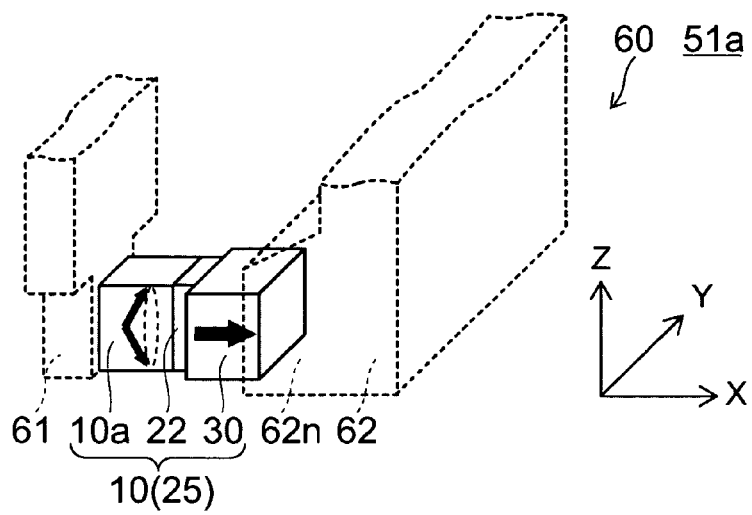
FIGS. 12A to 12C are schematic perspective views showing variations of the magnetic recording head according to the first embodiment.
Figure 12B:
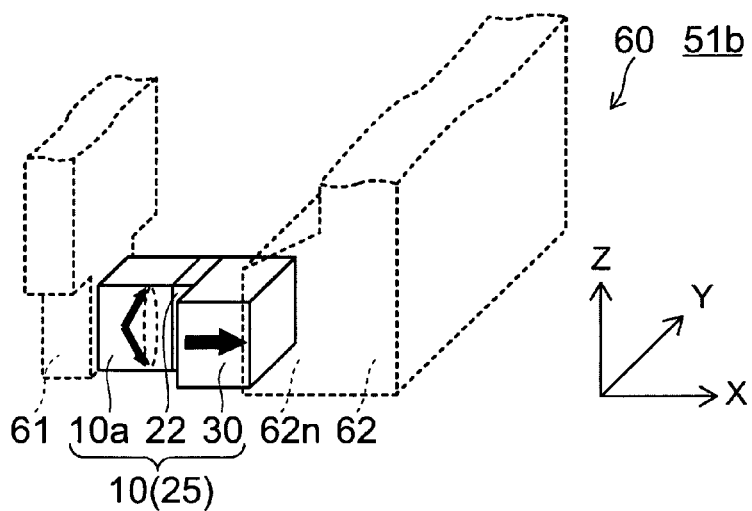
Figure 12C:
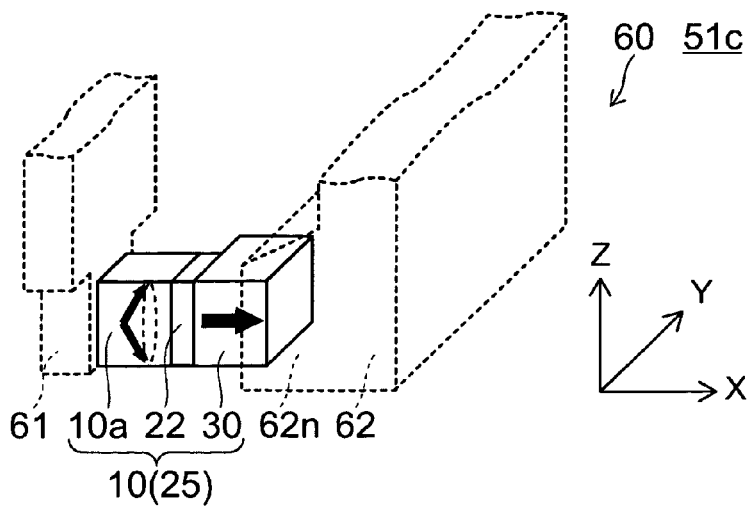

FIGS. 12A to 12C are schematic perspective views showing variations of the magnetic recording head according to the first embodiment.

Figure 13A:
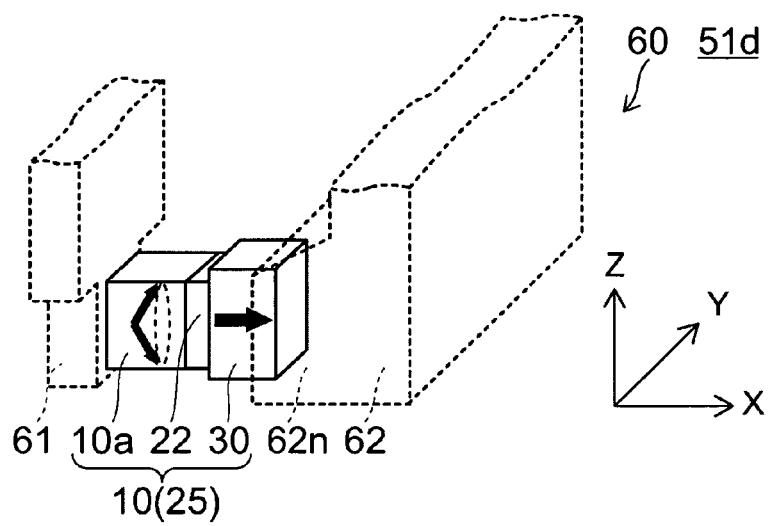
FIGS. 13A to 13C are schematic perspective views showing other variations of the magnetic recording head according to the first embodiment.
Figure 13B:
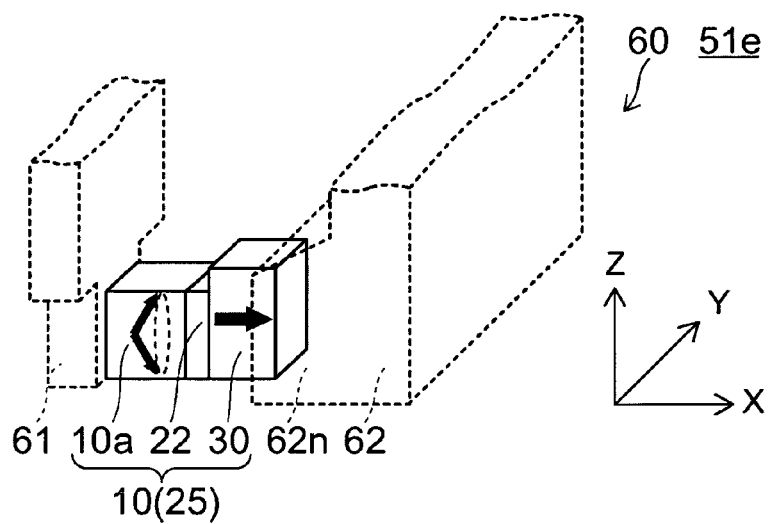
Figure 13C:
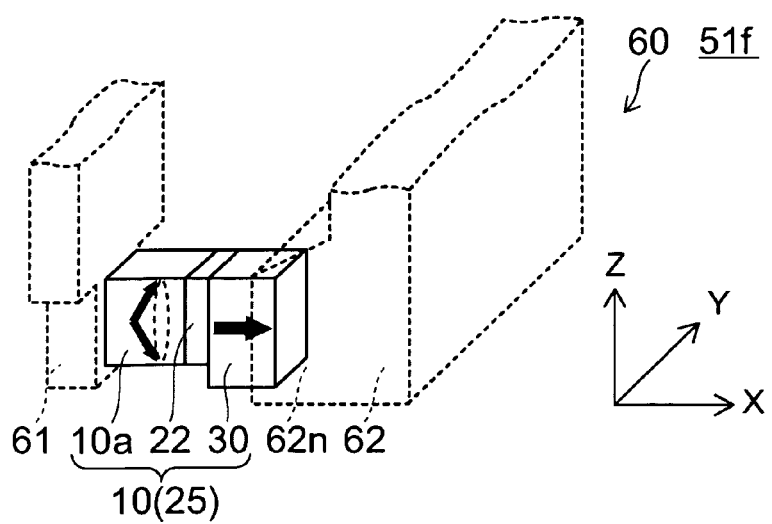

FIGS. 13A to 13C are schematic perspective views showing other variations of the magnetic recording head according to the first embodiment.

Figure 14A:
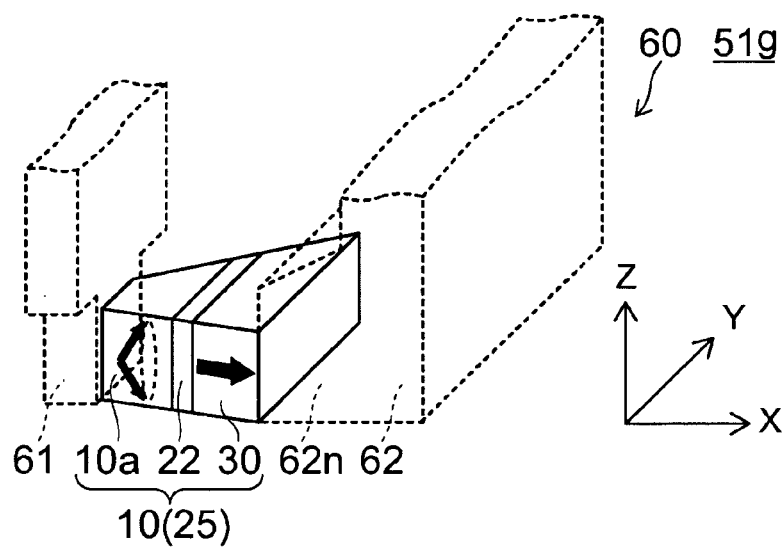
FIGS. 14A to 14C are schematic perspective views showing other variations of the magnetic recording head according to the first embodiment.
Figure 14B:
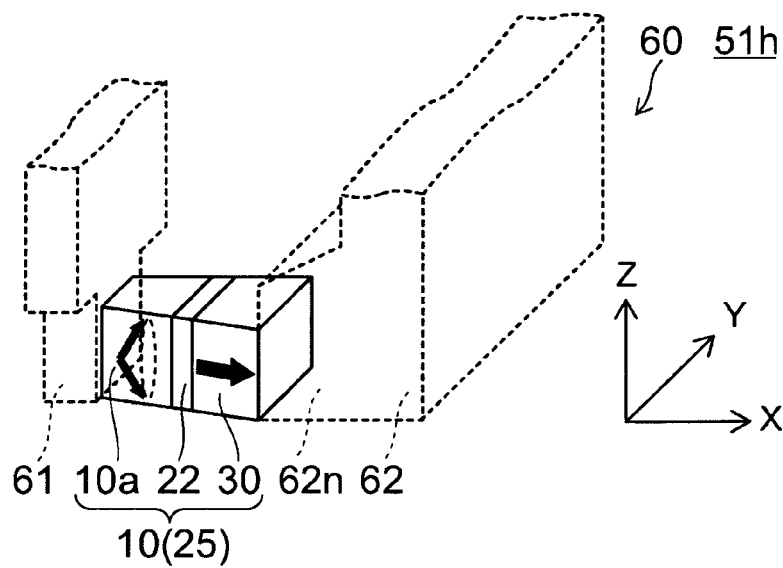
Figure 14C:
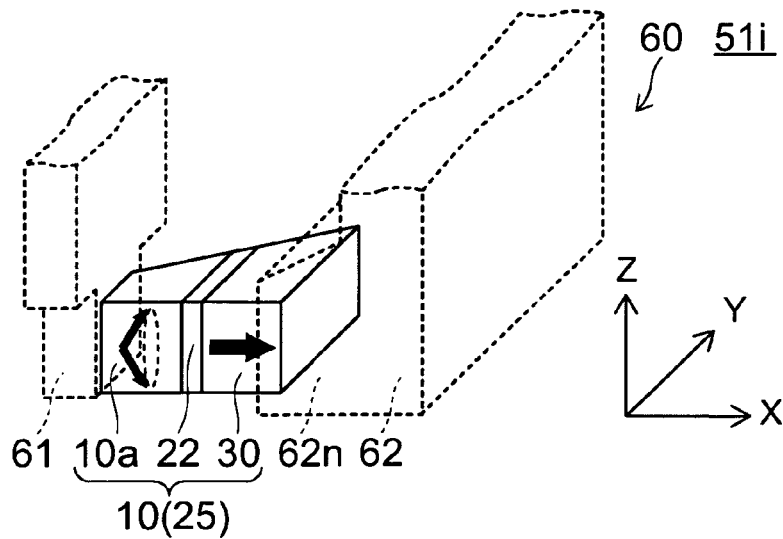

FIGS. 14A to 14C are schematic perspective views showing other variations of the magnetic recording head according to the first embodiment.

Figure 15A:
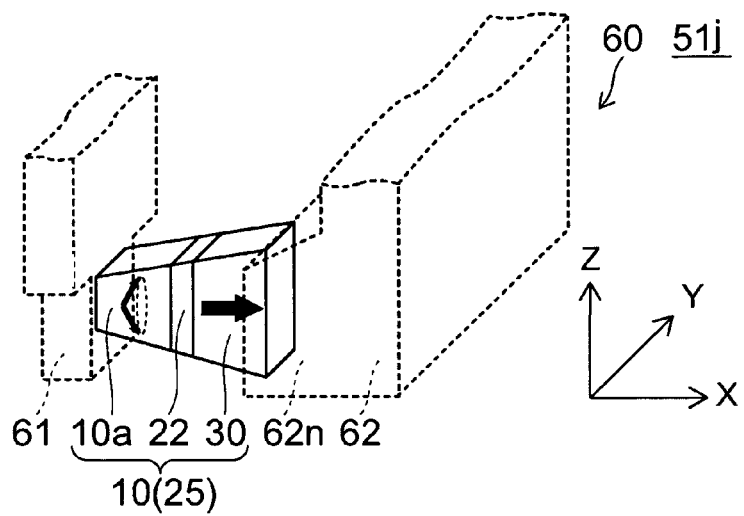
FIGS. 15A to 15C are schematic perspective views showing other variations of the magnetic recording head according to the first embodiment.
Figure 15B:
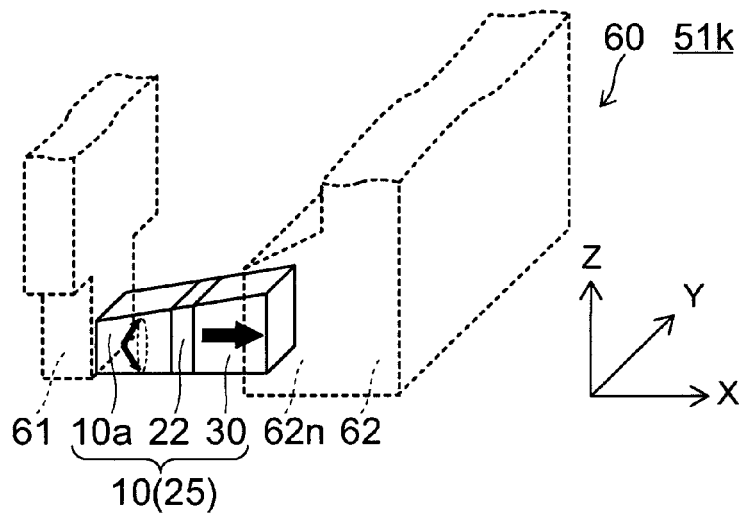
Figure 15C:
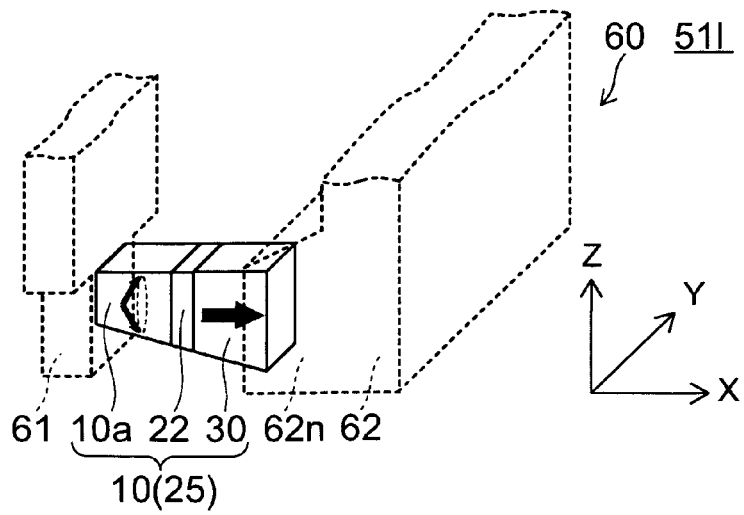

FIGS. 15A to 15C are schematic perspective views showing other variations of the magnetic recording head according to the first embodiment.

Figure 16A:
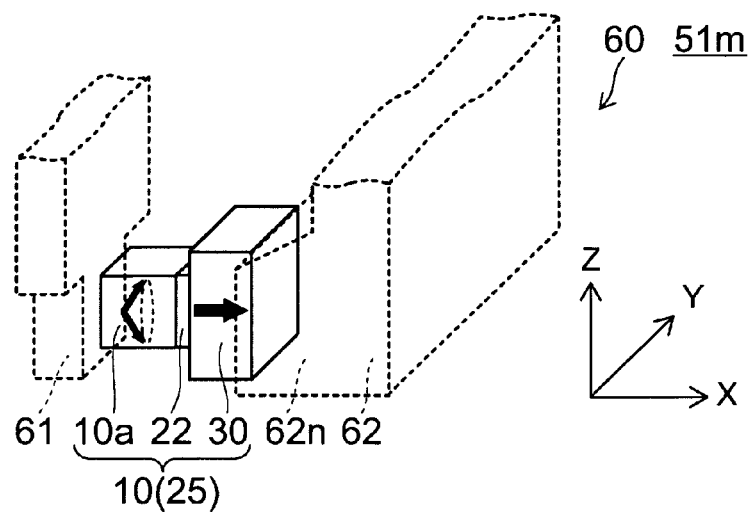
FIGS. 16A and 16B are schematic perspective views showing other variations of the magnetic recording head according to the first embodiment.
Figure 16B:
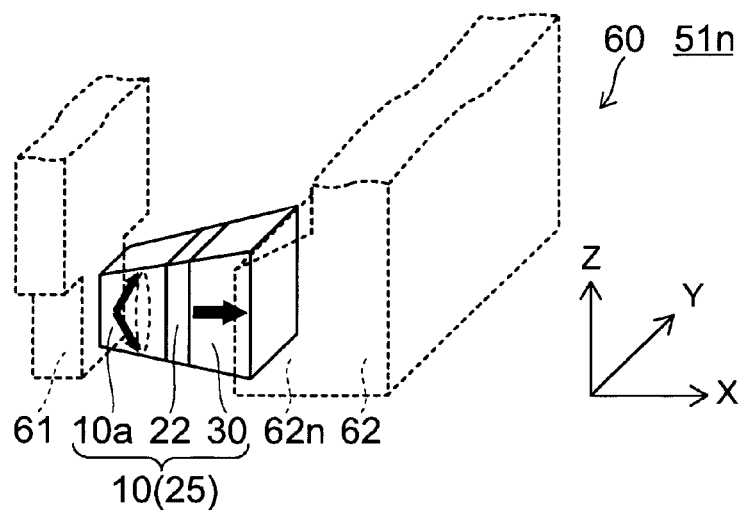

FIGS. 16A and 16B are schematic perspective views showing other variations of the magnetic recording head according to the first embodiment.

Figure 17A:
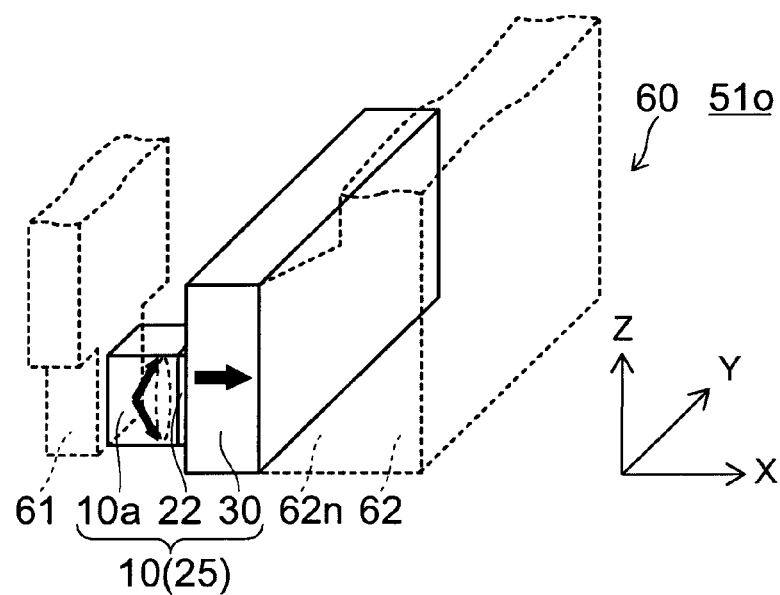
FIGS. 17A and 17B are schematic perspective views showing other variations of the magnetic recording head according to the first embodiment.
Figure 17B:
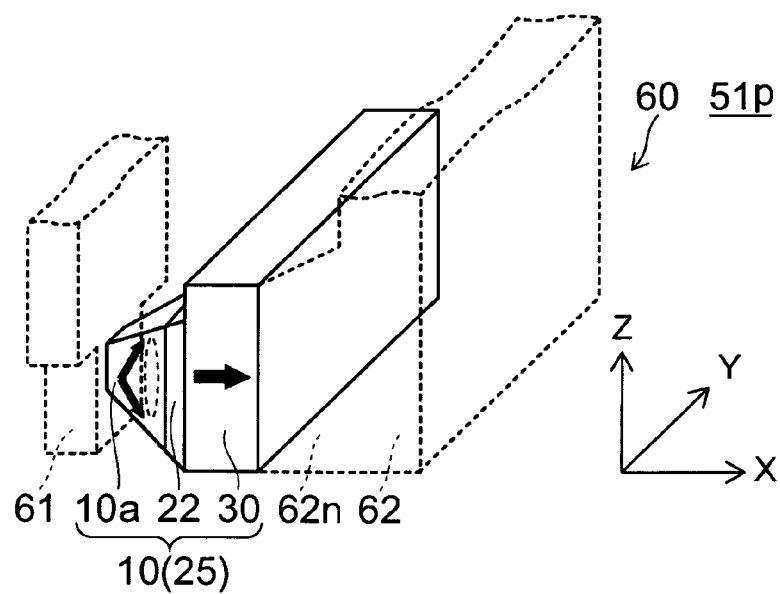

FIGS. 17A and 17B are schematic perspective views showing other variations of the magnetic recording head according to the first embodiment.

Figure 18A:
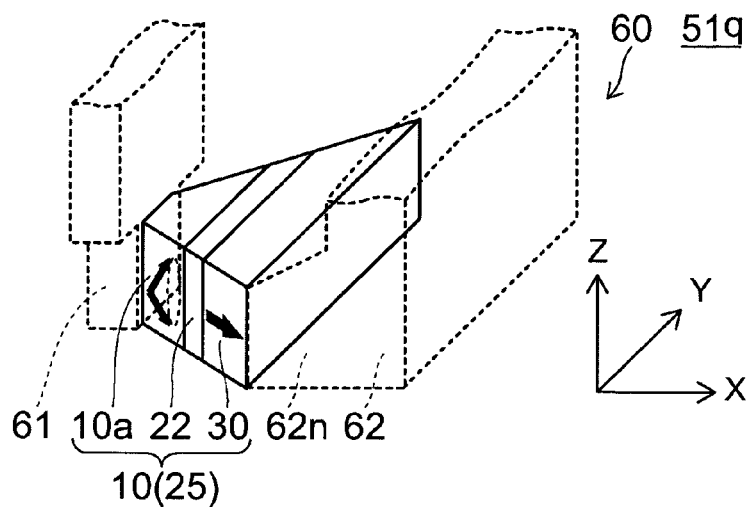
FIGS. 18A to 18C are schematic perspective views showing other variations of the magnetic recording head according to the first embodiment.
Figure 18B:
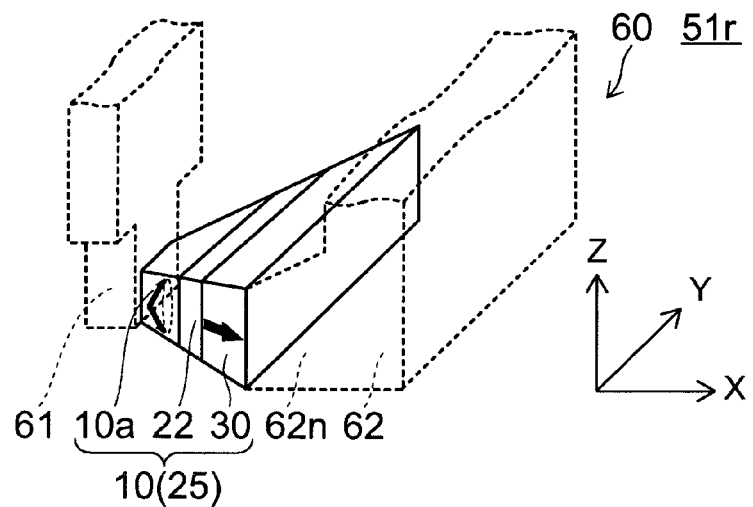
Figure 18C:
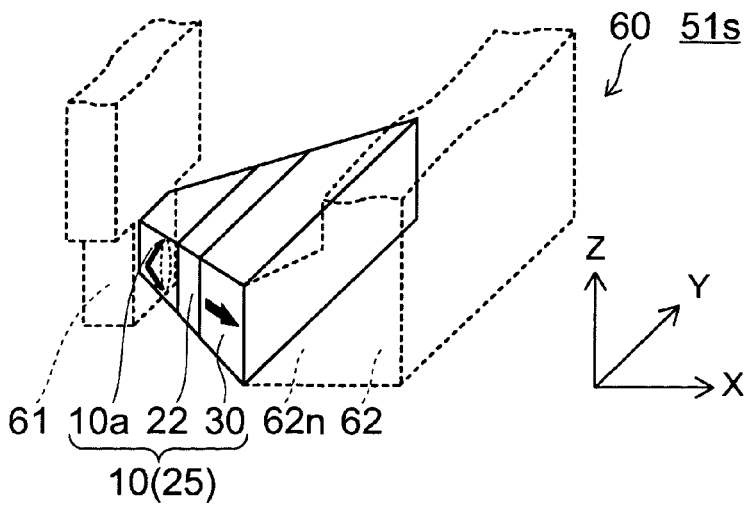

FIGS. 18A to 18C are schematic perspective views showing other variations of the magnetic recording head according to the first embodiment.

In the variations of the magnetic recording head described below, the main magnetic pole 61 is provided on the oscillation layer 10a side and the shield 62 is provided on the spin injection layer 30 side. In the following, the oscillation layer 10a and the spin injection layer 30 are particularly described. The description of the other components, i.e., the main magnetic pole 61, the shield 62, and the intermediate layer 22, is omitted as appropriate.

As shown in FIG. 12A, in the magnetic recording head 51a, the length in the Y-axis direction (width) of the spin injection layer 30 is longer than that of the oscillation layer 10a. Both the side surfaces of the spin injection layer 30 parallel to the X-axis direction are projected from the side surfaces of the oscillation layer 10a. In this example, the length in the Z-axis direction (height) is comparable to that of the oscillation layer 10a. That is, the magnetic recording head 51a has a shape similar to that of the magnetic recording head 51 described above.

As shown in FIG. 12B, in the magnetic recording head 51b, the length in the Y-axis direction (width) of the spin injection layer 30 is longer than that of the oscillation layer 10a. One of the side surfaces (the side surface on the negative Y-axis side) of the spin injection layer 30 parallel to the X-axis direction is projected from the side surface of the oscillation layer 10a. The other of the side surfaces (the side surface on the positive Y-axis side) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 12C, in the magnetic recording head 51c, the length in the Y-axis direction (width) of the spin injection layer 30 is longer than that of the oscillation layer 10a. One of the side surfaces (the side surface on the positive Y-axis side) of the spin injection layer 30 parallel to the X-axis direction is projected from the side surface of the oscillation layer 10a. The other of the side surfaces (the side surface on the negative Y-axis side) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 13A, in the magnetic recording head 51d, the length in the Z-axis direction (height) of the spin injection layer 30 is longer than that of the oscillation layer 10a. Both the side surfaces of the spin injection layer 30 parallel to the X-axis direction are projected from the side surfaces of the oscillation layer 10a. In this example, the length in the Y-axis direction (width) is comparable to that of the oscillation layer 10a.

As shown in FIG. 13B, in the magnetic recording head 51e, the length in the Z-axis direction (height) of the spin injection layer 30 is longer than that of the oscillation layer 10a. One of the side surfaces (the side surface on the positive Z-axis side) of the spin injection layer 30 parallel to the X-axis direction is projected from the side surface of the oscillation layer 10a. The other of the side surfaces (the side surface on the negative Z-axis side) of the spin injection layer 30 parallel to the X-axis direction lies in the same plane as the side surface of the oscillation layer 10a. In this example, the length in the Y-axis direction (width) is comparable to that of the oscillation layer 10a.

As shown in FIG. 13C, in the magnetic recording head 51f, the length in the Z-axis direction (height) of the spin injection layer 30 is longer than that of the oscillation layer 10a. One of the side surfaces (the side surface on the negative Z-axis side) of the spin injection layer 30 parallel to the X-axis direction is projected from the side surface of the oscillation layer 10a. The other of the side surfaces (the side surface on the positive Z-axis side) of the spin injection layer 30 parallel to the X-axis direction lies in the same plane as the side surface of the oscillation layer 10a. In this example, the length in the Y-axis direction (width) is comparable to that of the oscillation layer 10a.

In the above examples of the magnetic recording heads 51a to 51f, the oscillation layer 10a and the intermediate layer 22 are comparable in the shape of the film surface. On the other hand, the shape of the film surface of the spin injection layer 30 is varied stepwise with respect to the oscillation layer 10a. At this time, the shape of the film surface of the oscillation layer 10a and the intermediate layer 22 may be varied continuously, e.g. in a tapered shape. Furthermore, the shape of the film surface of the spin injection layer 30 may be varied e.g. in a tapered shape.

In the examples of the magnetic recording heads 51g to 51l described below, the shape of the film surface of the oscillation layer 10a, the intermediate layer 22, and the spin injection layer 30 is continuously varied.

More specifically, as shown in FIG. 14A, in the magnetic recording head 51g, the length in the Y-axis direction (width) of the spin injection layer 30 is longer than that of the oscillation layer 10a. The shape of the film surface of the oscillation layer 10a, the intermediate layer 22, and the spin injection layer 30 is continuously varied so that both the side surfaces of the spin injection layer 30 parallel to the X-axis direction are projected from the side surfaces of the oscillation layer 10a. In this example, the length in the Z-axis direction (height) is comparable to that of the oscillation layer 10a.

As shown in FIG. 14B, in the magnetic recording head 51h, the length in the Y-axis direction (width) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the negative side of the Y-axis) of the spin injection layer 30 parallel to the X-axis direction is projected from the side surface of the oscillation layer 10a. The other of the side surfaces (the side surface on the positive side of the Y-axis) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 14C, in the magnetic recording head 51i, the length in the Y-axis direction (width) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the positive side of the Y-axis) of the spin injection layer 30 parallel to the X-axis direction is projected from the side surface of the oscillation layer 10a. The other of the side surfaces (the side surface on the negative side of the Y-axis) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 15A, in the magnetic recording head 51j, the length in the Z-axis direction (height) of the spin injection layer 30 is longer than that of the oscillation layer 10a. The shape of the film surface of the oscillation layer 10a, the intermediate layer 22, and the spin injection layer 30 is continuously varied so that both the side surfaces of the spin injection layer 30 parallel to the X-axis direction are projected from the side surfaces of the oscillation layer 10a. In this example, the length in the Y-axis direction (width) is comparable to that of the oscillation layer 10a.

As shown in FIG. 15B, in the magnetic recording head 51k, the length in the Z-axis direction (height) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the positive side of the Z-axis) of the spin injection layer 30 parallel to the X-axis direction is projected from the side surface of the oscillation layer 10a. The other of the side surfaces (the side surface on the negative side of the Z-axis) of the spin injection layer 30 parallel to the X-axis direction lies in the same plane as the side surface of the oscillation layer 10a. In this example, the length in the Y-axis direction (width) is comparable to that of the oscillation layer 10a.

As shown in FIG. 15C, in the magnetic recording head 51l, the length in the Z-axis direction (height) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the negative side of the Z-axis) of the spin injection layer 30 parallel to the X-axis direction is projected from the side surface of the oscillation layer 10a. The other of the side surfaces (the side surface on the positive side of the Z-axis) of the spin injection layer 30 parallel to the X-axis direction lies in the same plane as the side surface of the oscillation layer 10a. In this example, the length in the Y-axis direction (width) is comparable to that of the oscillation layer 10a.

In these examples of the magnetic recording heads 51g to 51l, the shape of the film surface of the oscillation layer 10a, the intermediate layer 22, and the spin injection layer 30 is varied in the direction parallel to the X-axis. In this case, the average film surface of the spin injection layer 30 with respect to the X-axis is set larger than the oscillation layer 10a.

As shown in FIG. 16A, in the magnetic recording head 51m, the lengths in the Y-axis direction and the Z-axis direction (width and height) of the spin injection layer 30 are longer than those of the oscillation layer 10a. The four side surfaces of the spin injection layer 30 parallel to the X-axis direction are projected from the side surfaces of the oscillation layer 10a.

As shown in FIG. 16B, in the magnetic recording head 51n, the lengths in the Y-axis direction and the Z-axis direction (width and height) of the spin injection layer 30 are longer than those of the oscillation layer 10a. The shape of the film surface of the oscillation layer 10a, the intermediate layer 22, and the spin injection layer 30 is continuously varied so that the four side surfaces of the spin injection layer 30 parallel to the X-axis direction are projected from the side surfaces of the oscillation layer 10a. In this example, the shape of the film surface of the oscillation layer 10a, the intermediate layer 22, and the spin injection layer 30 is varied in the direction parallel to the X-axis. The average film surface of the spin injection layer 30 with respect to the X-axis is set larger than the oscillation layer 10a.

As shown in FIG. 17A, in the magnetic recording head 51o, the film surface of the spin injection layer 30 is comparable in shape to the surface of the medium facing surface adjacent portion 62n of the shield 62 opposing the main magnetic pole 61. That is, also in this case, the film surface of the spin injection layer 30 is larger than the oscillation layer 10a. In this case, the film surfaces of the oscillation layer 10a and the intermediate layer 22 are comparable in shape.

As shown in FIG. 17B, in the magnetic recording head 51p, the film surface of the spin injection layer 30 is comparable in shape to the surface of the medium facing surface adjacent portion 62n of the shield 62 opposing the main magnetic pole 61. That is, also in this case, the film surface of the spin injection layer 30 is larger than the oscillation layer 10a. In this case, the shape of the film surface of the oscillation layer 10a and the intermediate layer 22 is continuously varied. In this example, the shape is varied so that the film surface of the intermediate layer 22 is made larger than the oscillation layer 10a. Conversely, the shape may be varied so that the film surface of the intermediate layer 22 is made smaller than the oscillation layer 10a.

As shown in FIG. 18A, in the magnetic recording head 51q, the film surface of the spin injection layer 30 is comparable in shape to the surface of the medium facing surface adjacent portion 62n of the shield 62 opposing the main magnetic pole 61. The width in the Y-axis direction of the spin injection layer 30 is larger than the width in the Y-axis direction of the oscillation layer 10a. The width in the Y-axis direction of the spin injection layer 30, the intermediate layer 22, and the oscillation layer 10a is continuously varied. Also in this case, the film surface of the spin injection layer 30 is larger than the oscillation layer 10a. In this example, the width in the Z-axis direction (height) of the spin injection layer 30 is comparable to that of the oscillation layer 10a.

As shown in FIG. 18B, in the magnetic recording head 51r, the film surface of the spin injection layer 30 is comparable in shape to the surface of the medium facing surface adjacent portion 62n of the shield 62 opposing the main magnetic pole 61. The width in the Y-axis direction of the spin injection layer 30 is larger than the width in the Y-axis direction of the oscillation layer 10a. The width in the Y-axis direction of the spin injection layer 30, the intermediate layer 22, and the oscillation layer 10a is continuously varied. Furthermore, the width in the Z-axis direction of the spin injection layer 30 is larger than the width in the Z-axis direction of the oscillation layer 10a. That is, the surfaces of the spin injection layer 30 and the oscillation layer 10a on the medium facing surface side lie in the same plane, but the surface of the spin injection layer 30 on a side opposite to the medium facing surface is located at a position more positive along the Z-axis than that of the oscillation layer 10a. Furthermore, the width in the Z-axis direction of the spin injection layer 30, the intermediate layer 22, and the oscillation layer 10a is continuously varied. Also in this case, the film surface of the spin injection layer 30 is larger than the oscillation layer 10a.

As shown in FIG. 18C, in the magnetic recording head 51s, the film surface of the spin injection layer 30 is comparable in shape to the surface of the medium facing surface adjacent portion 62n of the shield 62 opposing the main magnetic pole 61. The width in the Y-axis direction of the spin injection layer 30 is larger than the width in the Y-axis direction of the oscillation layer 10a. The width in the Y-axis direction of the spin injection layer 30, the intermediate layer 22, and the oscillation layer 10a is continuously varied. Furthermore, the width in the Z-axis direction of the spin injection layer 30 is larger than the width in the Z-axis direction of the oscillation layer 10a. That is, the surfaces of the spin injection layer 30 and the oscillation layer 10a on the side opposite to the medium facing surface lie in the same plane, but the surface of the spin injection layer 30 on the medium facing surface side is located at a position more positive along the Z-axis than that of the oscillation layer 10a. Furthermore, the width in the Z-axis direction of the spin injection layer 30, the intermediate layer 22, and the oscillation layer 10a is continuously varied. Also in this case, the film surface of the spin injection layer 30 is larger than the oscillation layer 10a.

As in the above magnetic recording heads 51o to 51s, the film surface of the spin injection layer 30 can be made comparable in shape to the surface of the medium facing surface adjacent portion 62n of the shield 62 opposing the main magnetic pole 61. Then, part of the processing of the spin injection layer 30 and the shield 62 can be simultaneously performed. Advantageously, this can simplify the manufacturing process.

Figure 19:
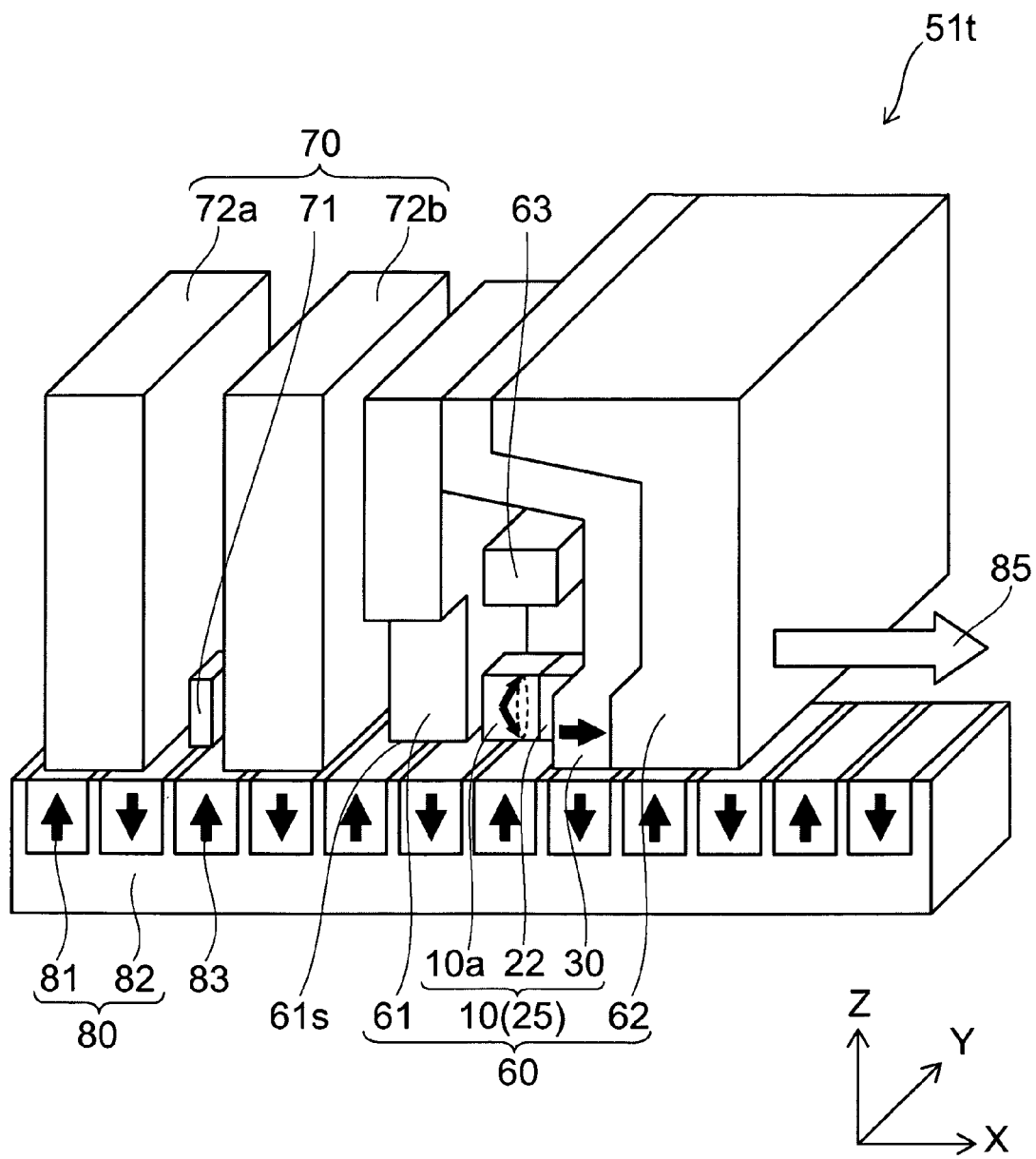
FIG. 19 is a schematic perspective view showing one other variation of the magnetic recording head according to the first embodiment.

FIG. 19 is a schematic perspective view showing one other variation of the magnetic recording head according to the first embodiment.

As shown in FIG. 19, the magnetic recording head 51t according to this embodiment has the configuration illustrated in FIG. 9A. More specifically, the oscillation layer 10a and the intermediate layer 22 are provided between the medium facing surface neighboring portion 61n of the main magnetic pole 61 and the medium facing surface adjacent portion 62n of the shield 62. On the entire region of the surface of the shield 62 opposing the main magnetic pole 61, the spin injection layer 30 is provided on the main magnetic pole 61 side of the shield 62. In this case, the shape of the spin injection layer 30 and the shield 62 can be simultaneously processed. This is advantageous for manufacturing. In this case, the film surface of the spin injection layer 30 is larger than the oscillation layer 10a and comparable in size to the shield 62.

In the magnetic recording heads 51a to 51t described above, the shape of the main magnetic pole 61 illustrated in FIGS. 8A to 8D is taken as an example. However, it is also possible to use the shape of the main magnetic pole 61 illustrated in FIGS. 10A to 10D.

Thus, in the magnetic recording heads 51a to 51t described above, the film surface of the spin injection layer 30 is larger than the oscillation layer 10a. Hence, a magnetic recording head with high efficiency can be provided, which reduces the inversion time of the spin injection layer and is operated stably. Here, in the above magnetic recording heads 51a-51t, the film surface of the spin injection layer 30 is smaller than or comparable to the surface of the shield 62 opposing the main magnetic pole 61.

Second Embodiment

Figure 20:
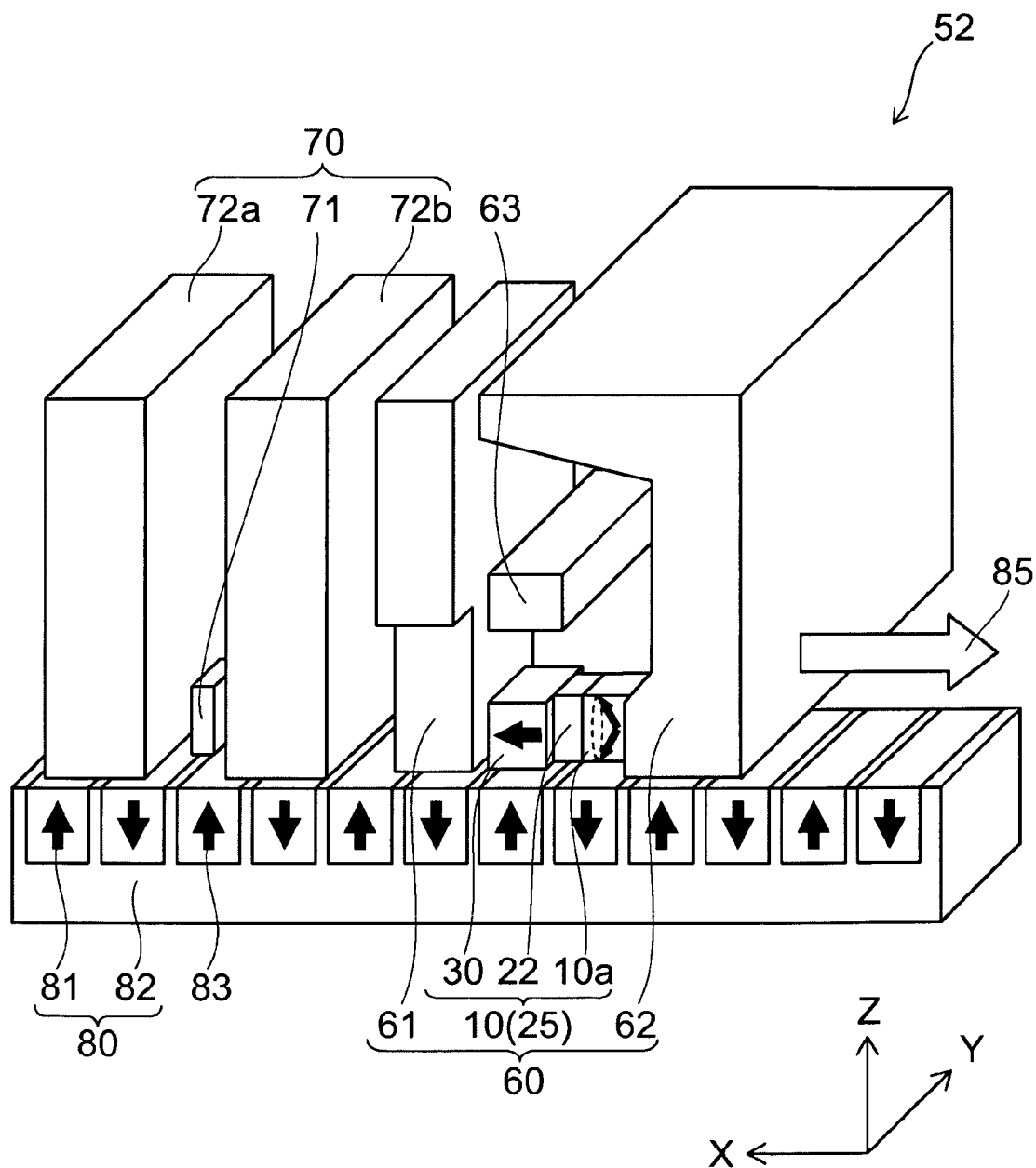
FIG. 20 is a schematic perspective view illustrating the configuration of a magnetic recording head according to a second embodiment.

FIG. 20 is a schematic perspective view illustrating the configuration of a magnetic recording head according to a second embodiment.

As shown in FIG. 20, the magnetic recording head 52 according to the second embodiment includes a main magnetic pole 61, a spin injection layer 30, an intermediate layer 22, an oscillation layer 10a, and a shield 62 arranged in this order.

More specifically, the magnetic recording head 52 according to this embodiment includes a main magnetic pole 61, a shield 62 provided to oppose the main magnetic pole, and a stacked structure body 25 provided between the main magnetic pole 61 and the shield 62. The stacked structure body 25 includes an oscillation layer (first magnetic layer) 10a having coercivity lower than the magnetic field applied from the main magnetic pole 61, an intermediate layer 22 provided between the oscillation layer (first magnetic layer) 10a and the main magnetic pole 61 and made of a nonmagnetic material, and a spin injection layer (second magnetic layer) 30 provided between the intermediate layer 22 and the main magnetic pole 61 and having a larger film surface than the oscillation layer (first magnetic layer) 10a.

The remaining configuration can be made similar to that of the magnetic recording head 51 described above, and hence the description thereof is omitted.

Also in the magnetic recording head 52 thus configured, the film surface of the spin injection layer 30 is larger than the oscillation layer 10a. Hence, a magnetic recording head with high efficiency can be provided, which reduces the inversion time of the spin injection layer and is operated stably.

Furthermore, in the magnetic recording head 52 according to this embodiment, the film surface of the spin injection layer 30 can be made comparable to the surface of the main magnetic pole 61 opposing the shield 62. Then, the shape of the spin injection layer 30 and the main magnetic pole 61 can be simultaneously processed. This is advantageous for manufacturing.

FIGS. 21A to 21D are schematic side views illustrating the configuration of the magnetic recording head according to the second embodiment.

As shown in FIGS. 21A to 21D, the main magnetic pole 61 has a medium facing surface 61s. The neighborhood of the medium facing surface 61s, i.e., the medium facing surface neighboring portion 61n, has e.g. a generally rectangular shape in plan view as viewed in the Z-axis direction. In the portion distant from the medium facing surface 61s, the main magnetic pole 61 can be shaped so that the width in the Y-axis direction is wider than in the medium facing surface neighboring portion 61n.

Also in this case, the shield 62 is located close to the main magnetic pole 61 near the medium facing surface 61s of the main magnetic pole 61. In the portion distant from the medium facing surface 61s of the main magnetic pole 61, the shield 62 can be configured so that the distance between the shield 62 and the main magnetic pole 61 is increased. The shield 62 includes a medium facing surface adjacent portion 62n located close to the medium facing surface neighboring portion 61n of the main magnetic pole 61.

In the portion distant from the medium facing surface 61s of the main magnetic pole 61, the main magnetic pole 61 is again located close to the shield 62. Here, a gap 61g is provided between the main magnetic pole 61 and the shield 62. Also in this case, an insulating layer having a thickness of e.g. 5 angstroms or more can be provided in the gap 61g. The thickness of this insulating layer is preferably set to 1 nm to 2 nm or less.

Figure 21A:
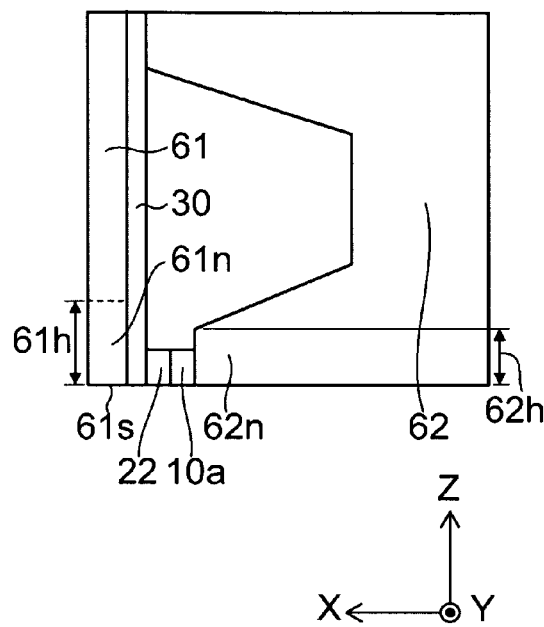
FIGS. 21A to 21D are schematic side views illustrating the configuration of the magnetic recording head according to the second embodiment.
Figure 21B:
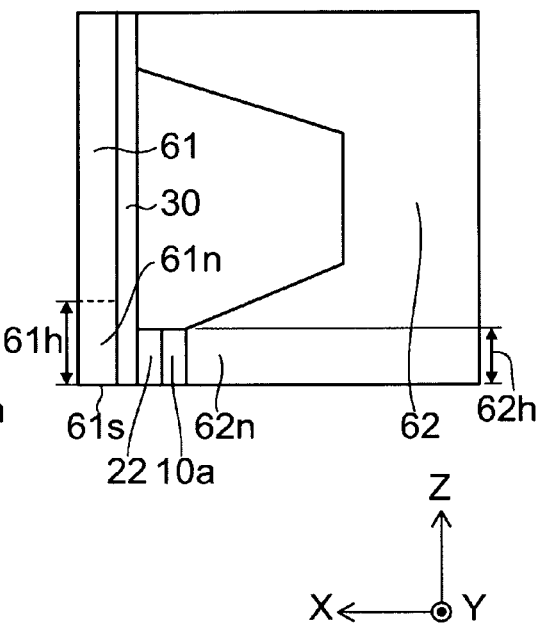

Furthermore, as shown in FIGS. 21A and 21B, the oscillation layer 10a and the intermediate layer 22 can be provided between the medium facing surface neighboring portion 61n of the main magnetic pole 61 and the medium facing surface adjacent portion 62n of the shield 62. On the entire region of the surface of the main magnetic pole 61 opposing the shield 62, the spin injection layer 30 can be provided on the shield 62 side of the main magnetic pole 61. That is, as viewed in the X-axis direction, the spin injection layer 30 and the main magnetic pole 61 have the same shape. At this time, the shape of the spin injection layer 30 and the main magnetic pole 61 can be simultaneously processed. This is advantageous for manufacturing. In this case, the film surface of the spin injection layer 30 is larger than the oscillation layer 10a and comparable in size to the main magnetic pole 61.

When the film surface of the spin injection layer 30 is comparable in size to the main magnetic pole 61, the film surface of the intermediate layer 22 may also be made comparable in size to the main magnetic pole 61.

Figure 21C:
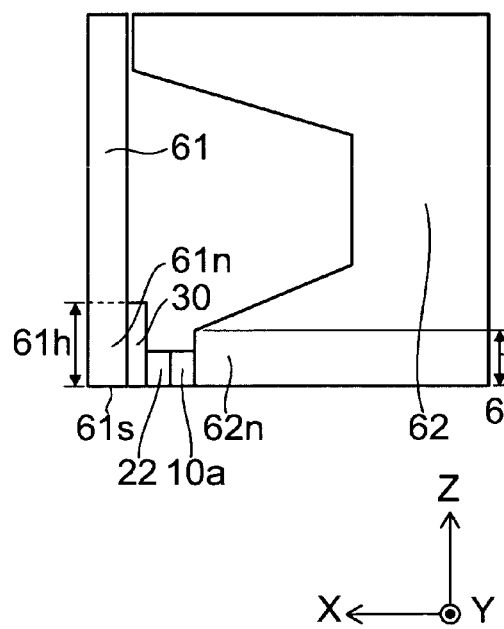
Figure 21D:
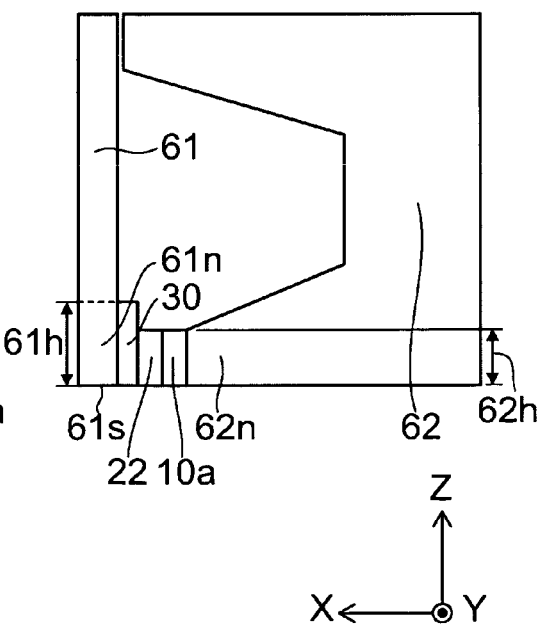

As shown in FIGS. 21C and 21D, the oscillation layer 10a and the intermediate layer 22 can be provided between the medium facing surface neighboring portion 61n of the main magnetic pole 61 and the medium facing surface adjacent portion 62n of the shield 62. On part of the surface of the main magnetic pole 61 opposing the shield 62, the spin injection layer 30 can be provided on the shield 62 side of the main magnetic pole 61. At this time, the film surface of the spin injection layer 30 is larger than the oscillation layer 10a and smaller than the main magnetic pole 61.

Furthermore, although not shown, the film surface of the spin injection layer 30 may be larger than the main magnetic pole 61.

As shown in FIGS. 21A and 21C, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the oscillation layer 10a (and the intermediate layer 22) can be set smaller than the surface defined by the narrower one of the first width and the second width and the lower one of the first height and the second height.

On the other hand, as shown in FIGS. 21B and 21D, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the oscillation layer 10a (and the intermediate layer 22) can be set comparable to the surface defined by the narrower one of the first width and the second width and the lower one of the first height and the second height. In this case, the film surface of the spin injection layer 30 is set larger than the oscillation layer 10a.

In the examples illustrated in FIGS. 21A to 21D, the film surface of the intermediate layer 22 is comparable in shape to the oscillation layer 10a. However, as described above, the shape of the film surface of the intermediate layer 22 is arbitrary. For instance, the film surface of the intermediate layer 22 can be made comparable in size to the oscillation layer 10a or the spin injection layer 30. Thus, the shape of these films can be simultaneously processed. This is advantageous for manufacturing.

FIGS. 22A to 22D are schematic side views illustrating the configuration of one other magnetic recording head according to the second embodiment.

As shown in FIGS. 22A to 22D, the main magnetic pole 61 has a medium facing surface 61s. The neighborhood of the medium facing surface 61s, i.e., the medium facing surface neighboring portion 61n, has e.g. a generally rectangular shape in plan view as viewed in the X-axis direction. In the portion distant from the medium facing surface 61s, the main magnetic pole 61 can be shaped so that the width in the Y-axis direction and the X-axis direction is made wider than in the medium facing surface neighboring portion 61n toward the positive side of the Z-axis.

Also in this case, the shield 62 is located close to the main magnetic pole 61 near the medium facing surface 61s of the main magnetic pole 61. In the portion distant from the medium facing surface 61s of the main magnetic pole 61, the shield 62 can be shaped so that the distance between the shield 62 and the main magnetic pole 61 is increased. The shield 62 includes a medium facing surface adjacent portion 62n located close to the medium facing surface neighboring portion 61n of the main magnetic pole 61.

In the portion distant from the medium facing surface 61s of the main magnetic pole 61, the main magnetic pole 61 is again located close to the shield 62. Here, a gap 61g is provided between the main magnetic pole 61 and the shield 62. An insulating layer having a thickness of e.g. 5 angstroms or more can be provided in the gap 61g. The thickness of this insulating layer is preferably set to 1 nm to 2 nm or less.

Figure 22A:
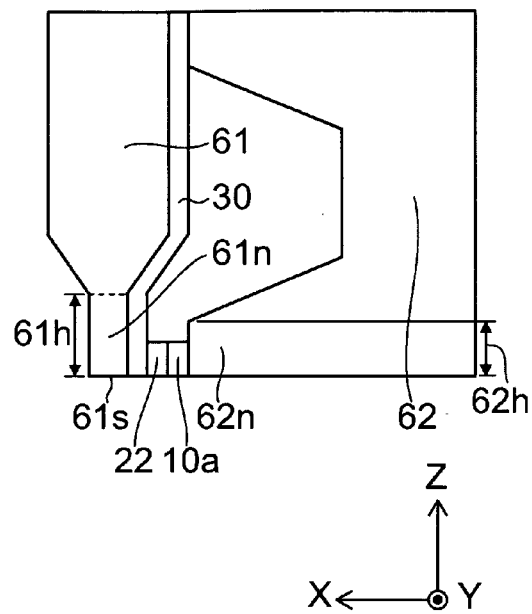
FIGS. 22A to 22D are schematic side views illustrating the configuration of one other magnetic recording head according to the second embodiment.
Figure 22B:
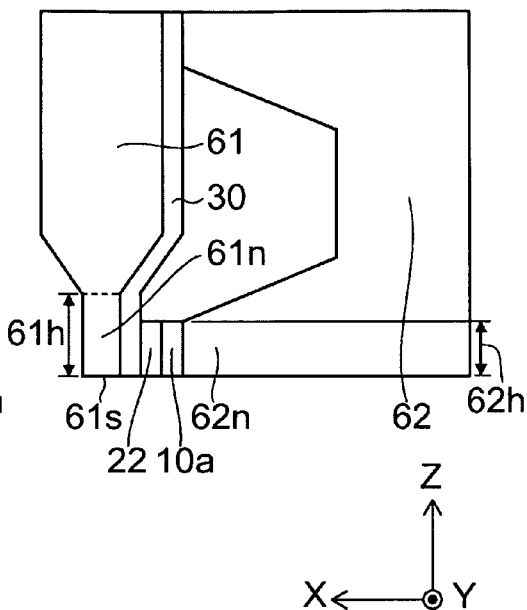

Furthermore, as shown in FIGS. 22A and 22B, the oscillation layer 10a and the intermediate layer 22 can be provided between the medium facing surface neighboring portion 61n of the main magnetic pole 61 and the medium facing surface adjacent portion 62n of the shield 62. On the entire region of the surface of the main magnetic pole 61 opposing the shield 62, the spin injection layer 30 can be provided on the shield 62 side of the main magnetic pole 61. That is, as viewed in the X-axis direction, the spin injection layer 30 and the main magnetic pole 61 have the same shape. At this time, the shape of the spin injection layer 30 and the main magnetic pole 61 can be simultaneously processed. This is advantageous for manufacturing. In this case, the film surface of the spin injection layer 30 is larger than the oscillation layer 10a and comparable in size to the main magnetic pole 61.

When the film surface of the spin injection layer 30 is comparable in size to the main magnetic pole 61, the film surface of the intermediate layer 22 may be made comparable in size to the main magnetic pole 61. Then, the shape of these films can be simultaneously processed. This is advantageous for manufacturing.

Figure 22C:
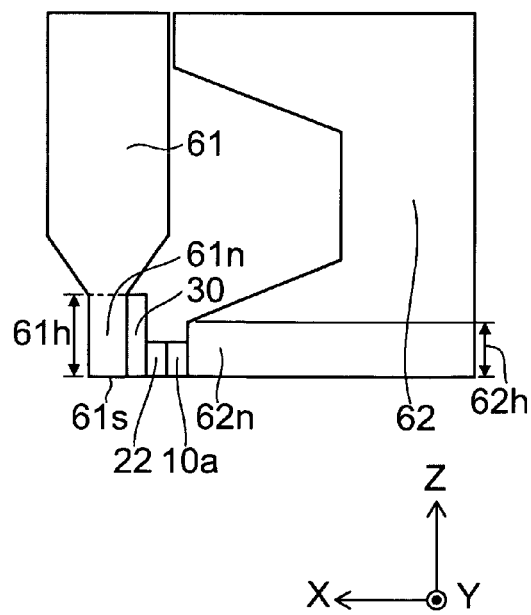
Figure 22D:
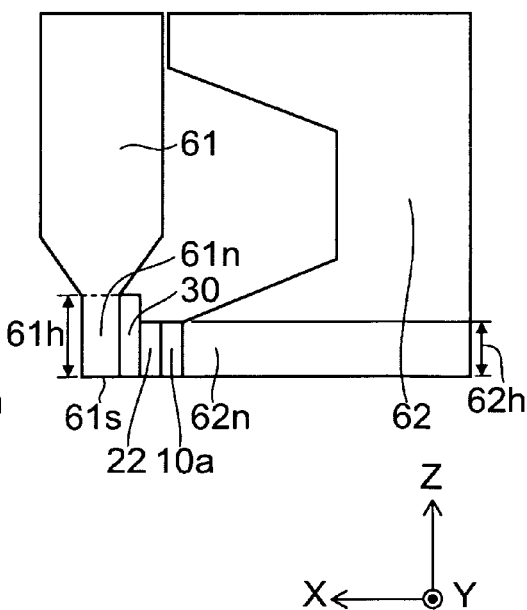

As shown in FIGS. 22C and 22D, the oscillation layer 10a and the intermediate layer 22 can be provided between the medium facing surface neighboring portion 61n of the main magnetic pole 61 and the medium facing surface adjacent portion 62n of the shield 62. On part of the surface of the main magnetic pole 61 opposing the shield 62, the spin injection layer 30 can be provided on the shield 62 side of the main magnetic pole 61. At this time, the film surface of the spin injection layer 30 is larger than the oscillation layer 10a and smaller than the main magnetic pole 61.

As shown in FIGS. 22A and 22C, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the oscillation layer 10a (and the intermediate layer 22) can be set smaller than the surface defined by the narrower one of the first width and the second width and the lower one of the first height and the second height.

On the other hand, as shown in FIGS. 22B and 22D, the surface of the main magnetic pole 61 opposing the shield 62 has a first width (width 61w in the Y-axis direction) and a first height (width 61h in the Z-axis direction). The surface of the shield 62 opposing the main magnetic pole 61 has a second width (width 62w in the Y-axis direction) and a second height (height 62h in the Z-axis direction). Then, the film surface of the oscillation layer 10a (and the intermediate layer 22) can be set comparable to the surface defined by the narrower one of the first width and the second width and the lower one of the first height and the second height. In this case, the film surface of the spin injection layer 30 is set larger than the oscillation layer 10a.

In the examples illustrated in FIGS. 22A to 22D, the film surface of the intermediate layer 22 is comparable in shape to the oscillation layer 10a. However, as described above, the shape of the film surface of the intermediate layer 22 is arbitrary.

The magnetic recording head 52 according to this embodiment can also be variously modified.

Figure 23A:
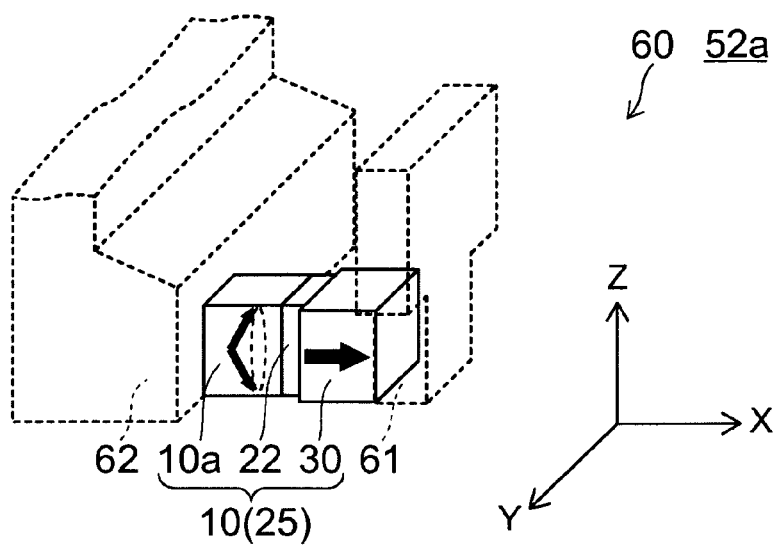
FIGS. 23A to 23C are schematic perspective views showing variations of the magnetic recording head according to the second embodiment.
Figure 23B:
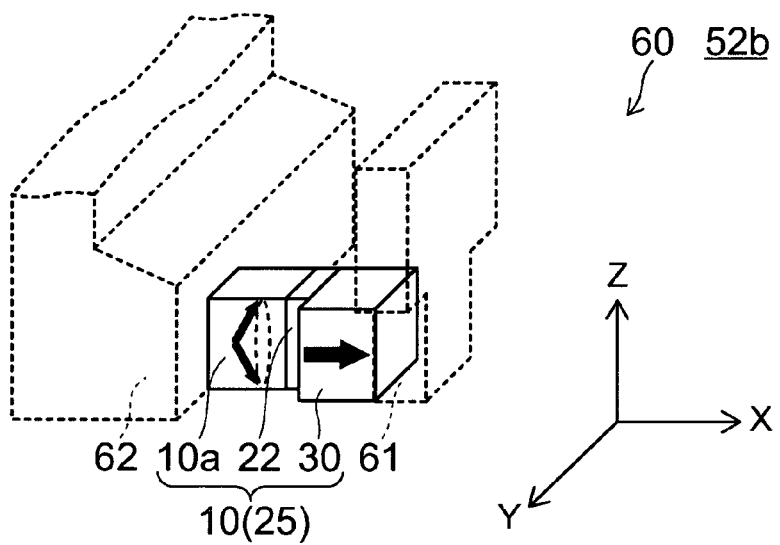
Figure 23C:
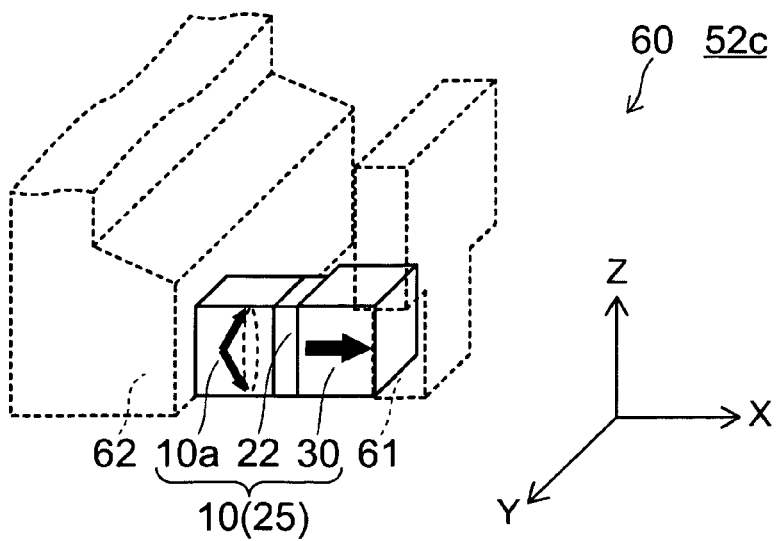

FIGS. 23A to 23C are schematic perspective views showing variations of the magnetic recording head according to the second embodiment.

Figure 24A:
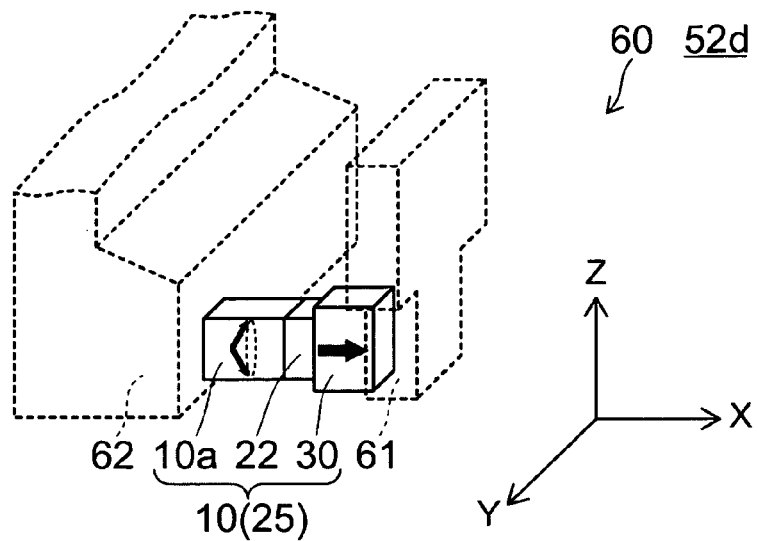
FIGS. 24A to 24C are schematic perspective views showing other variations of the magnetic recording head according to the second embodiment.
Figure 24B:
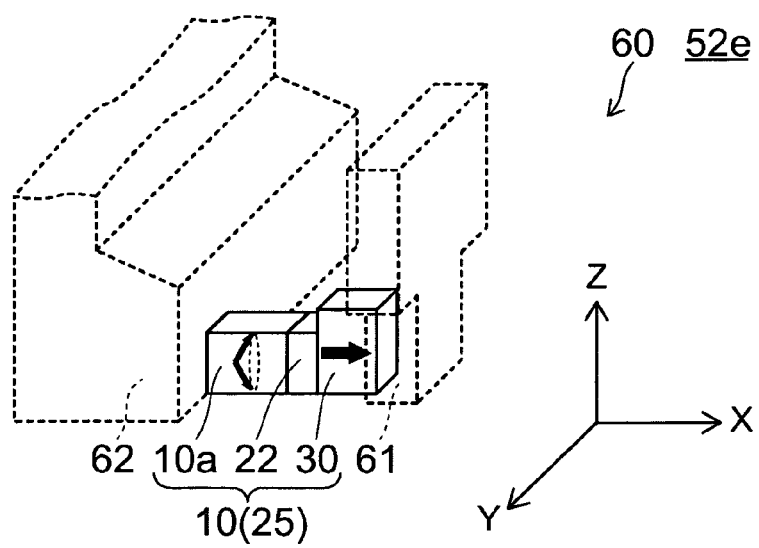
Figure 24C:
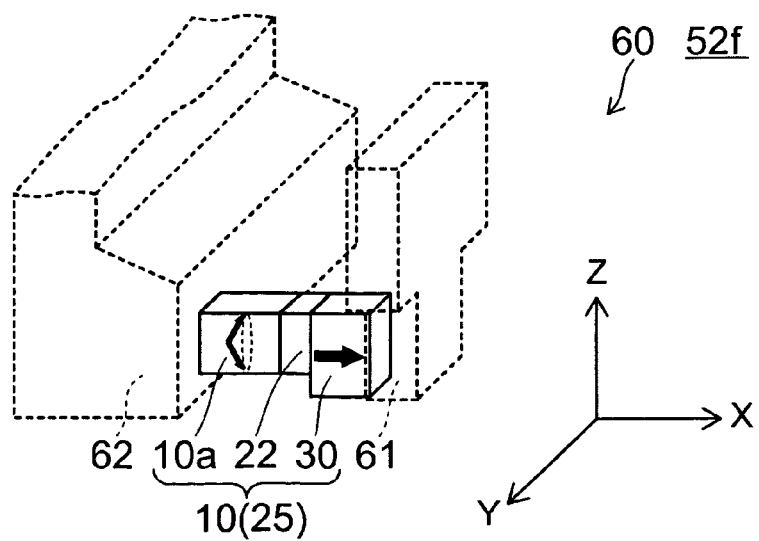

FIGS. 24A to 24C are schematic perspective views showing other variations of the magnetic recording head according to the second embodiment.

Figure 25A:
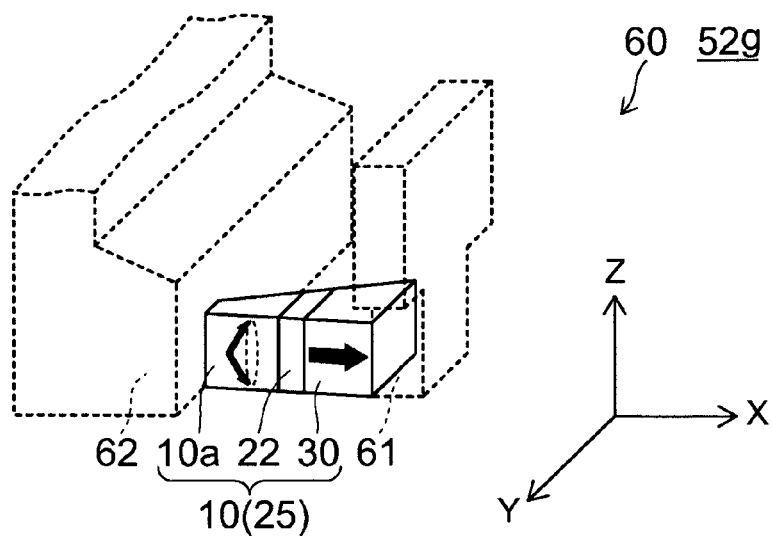
FIGS. 25A to 25C are schematic perspective views showing other variations of the magnetic recording head according to the second embodiment.
Figure 25B:
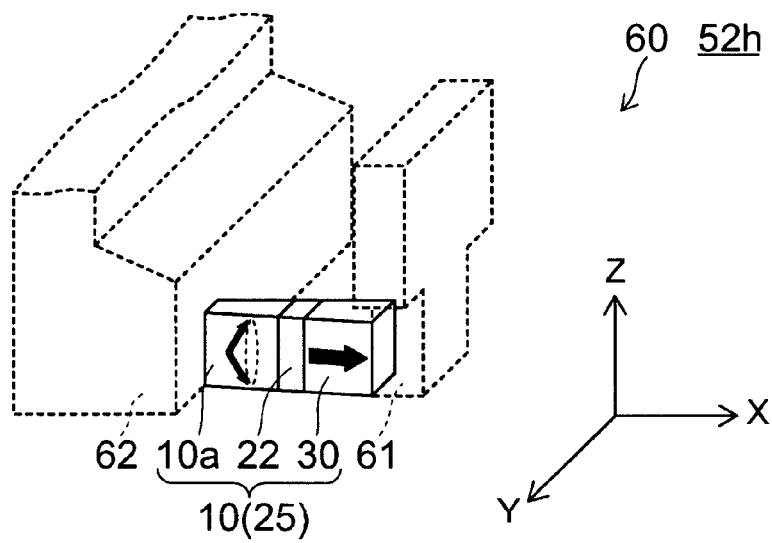
Figure 25C:
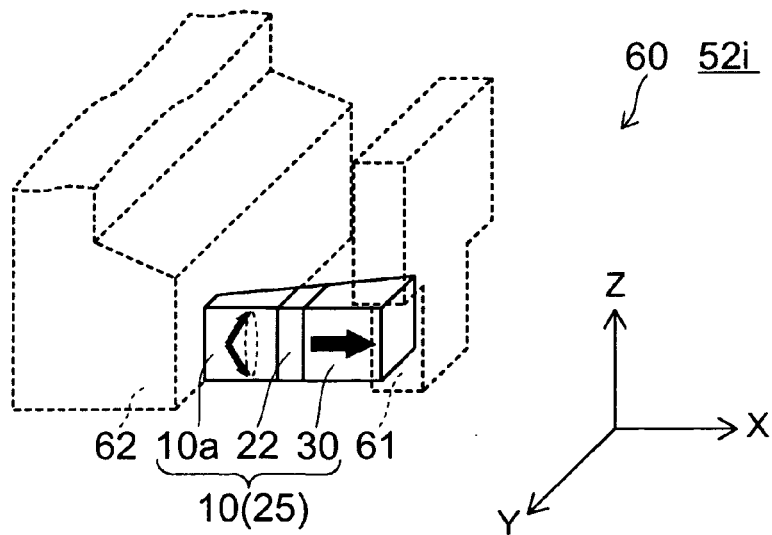

FIGS. 25A to 25C are schematic perspective views showing other variations of the magnetic recording head according to the second embodiment.

Figure 26A:
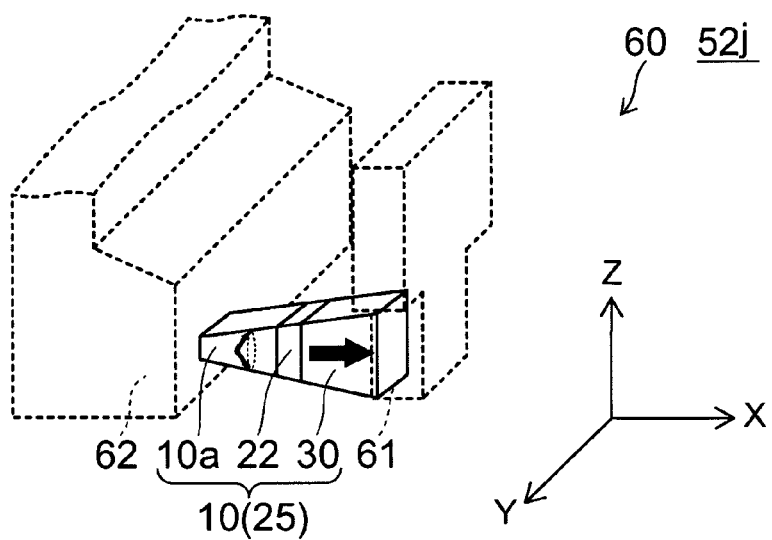
FIGS. 26A to 26C are schematic perspective views showing other variations of the magnetic recording head according to the second embodiment.
Figure 26B:
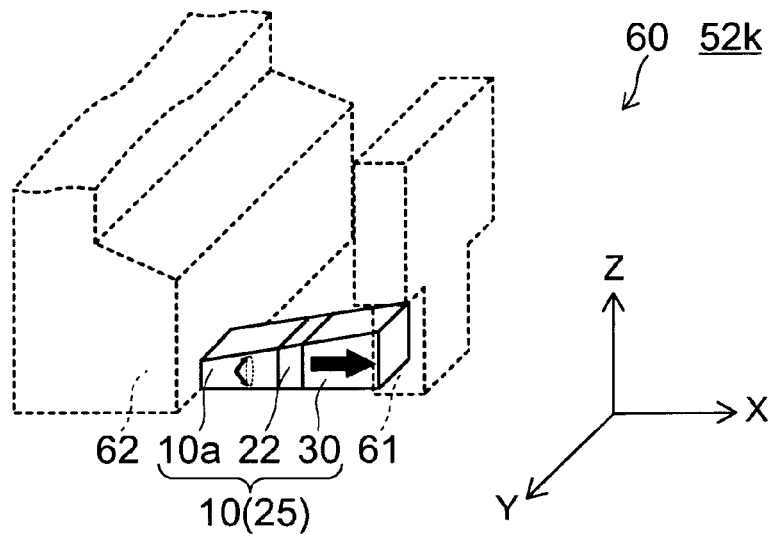
Figure 26C:
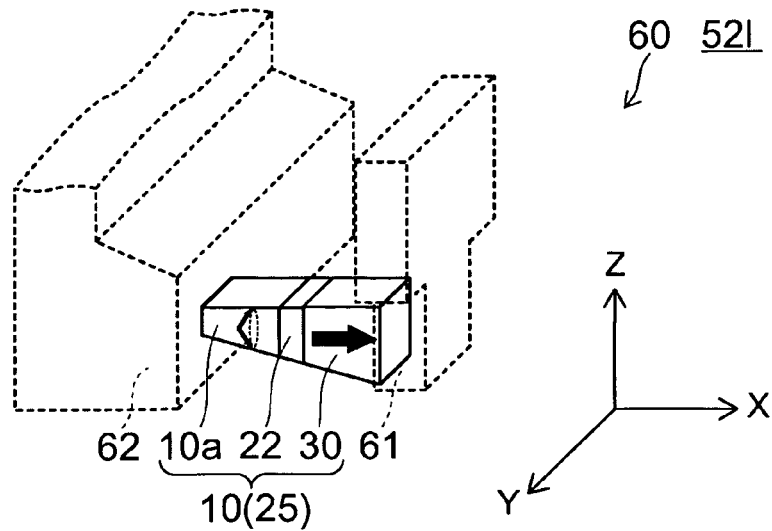

FIGS. 26A to 26C are schematic perspective views showing other variations of the magnetic recording head according to the second embodiment.

Figure 27A:
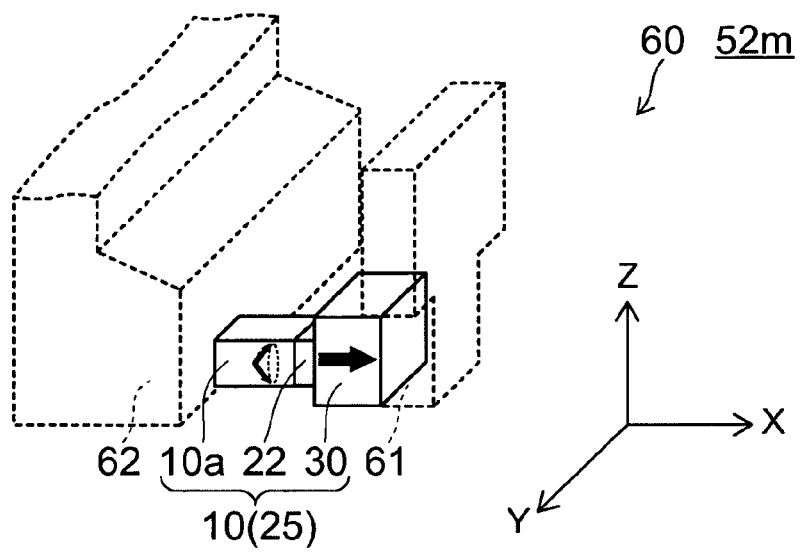
FIGS. 27A and 27B are schematic perspective views showing other variations of the magnetic recording head according to the second embodiment.
Figure 27B:
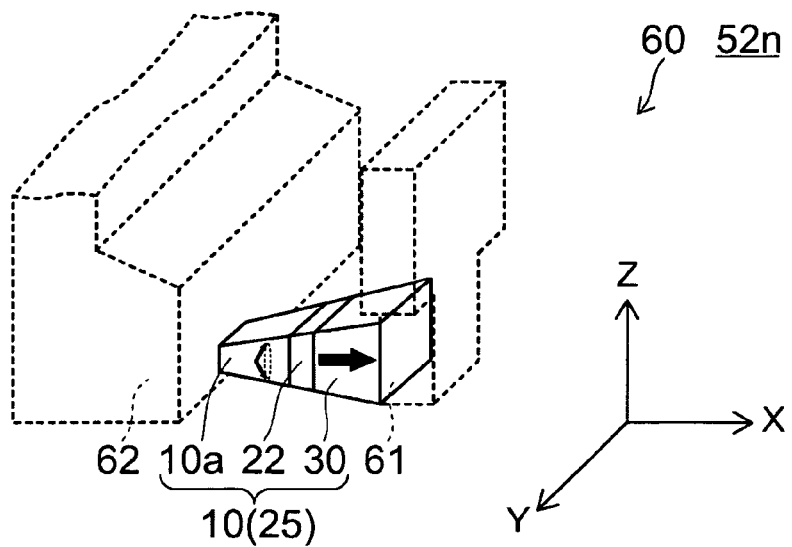

FIGS. 27A and 27B are schematic perspective views showing other variations of the magnetic recording head according to the second embodiment.

Figure 28A:
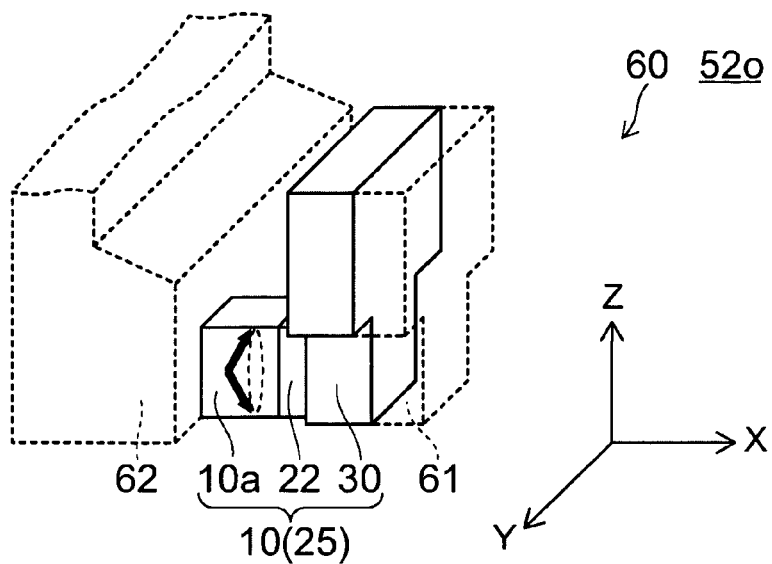
FIGS. 28A and 28B are schematic perspective views showing other variations of the magnetic recording head according to the second embodiment.
Figure 28B:
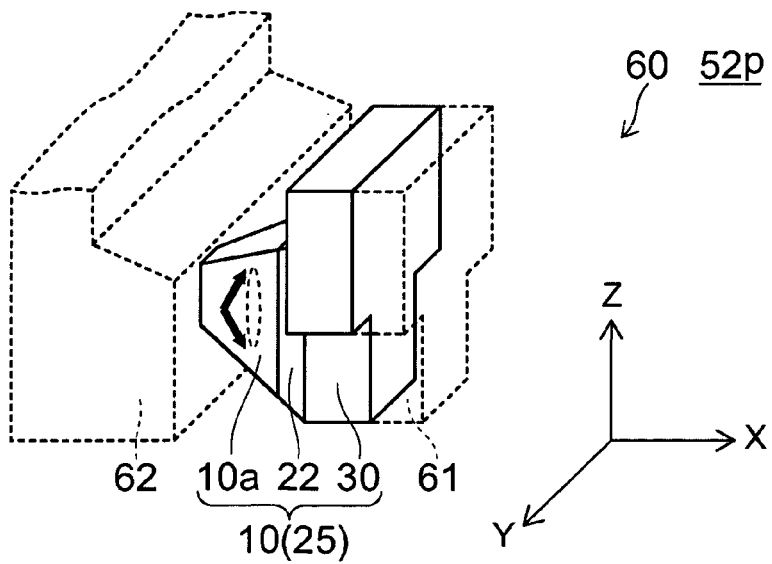

FIGS. 28A and 28B are schematic perspective views showing other variations of the magnetic recording head according to the second embodiment.

FIG. 23A to FIG. 28B recited above are schematic perspective views of the writing head section 60 of the magnetic head according to this embodiment as viewed in a direction from positive to negative of the Y-axis.

In the variations of the magnetic recording head described below, the shield 62 is provided on the oscillation layer 10a side and the main magnetic pole 61 is provided on the spin injection layer 30 side. In the following, the oscillation layer 10a and the spin injection layer 30 are particularly described. The description of the other components, i.e., the main magnetic pole 61, the shield 62, and the intermediate layer 22, is omitted as appropriate.

As shown in FIG. 23A, in the magnetic recording head 52a, the length in the Y-axis direction (width) of the spin injection layer 30 is longer than that of the oscillation layer 10a. Both the side surfaces of the spin injection layer 30 parallel to the X-axis direction are projected from the side surfaces of the oscillation layer 10a. In this example, the length in the Z-axis direction (width) is comparable to that of the oscillation layer 10a. That is, the magnetic recording head 52a has a shape similar to that of the magnetic recording head 52 described above.

As shown in FIG. 23B, in the magnetic recording head 52b, the length in the Y-axis direction (width) of the spin injection layer 30 is longer than that of the oscillation layer 10a. One of the side surfaces (the side surface on the negative side of the Y-axis) of the spin injection layer 30 parallel to the X-axis direction is projected from the side surface of the oscillation layer 10a. The other of the side surfaces (the side surface on the positive side of the Y-axis) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 23C, in the magnetic recording head 52c, the length in the Y-axis direction (width) of the spin injection layer 30 is longer than that of the oscillation layer 10a. One of the side surfaces (the side surface on the positive side of the Y-axis) of the spin injection layer 30 parallel to the X-axis direction is projected from the side surface of the oscillation layer 10a. The other of the side surfaces (the side surface on the negative side of the Y-axis) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 24A, in the magnetic recording head 52d, the length in the Z-axis direction (height) of the spin injection layer 30 is longer than that of the oscillation layer 10a. Both the side surfaces of the spin injection layer 30 parallel to the X-axis direction are projected from the side surfaces of the oscillation layer 10a. In this example, the length in the Y-axis direction (width) is comparable to that of the oscillation layer 10a.

As shown in FIG. 24B, in the magnetic recording head 52e, the length in the Z-axis direction (height) of the spin injection layer 30 is longer than that of the oscillation layer 10a. One of the side surfaces (the side surface on the positive side of the Z-axis) of the spin injection layer 30 parallel to the X-axis direction is projected from the side surface of the oscillation layer 10a. The other of the side surfaces (the side surface on the negative side of the Z-axis) of the spin injection layer 30 parallel to the X-axis direction lies in the same plane as the side surface of the oscillation layer 10a. In this example, the length in the Y-axis direction (width) is comparable to that of the oscillation layer 10a.

As shown in FIG. 24C, in the magnetic recording head 52f, the length in the Z-axis direction (height) of the spin injection layer 30 is longer than that of the oscillation layer 10a. One of the side surfaces (the side surface on the negative side of the Z-axis) of the spin injection layer 30 parallel to the X-axis direction is projected from the side surface of the oscillation layer 10a. The other of the side surfaces (the side surface on the positive side of the Z-axis) of the spin injection layer 30 parallel to the X-axis direction lies in the same plane as the side surface of the oscillation layer 10a. In this example, the length in the Y-axis direction (width) is comparable to that of the oscillation layer 10a.

In the above examples of the magnetic recording heads 52a-f, the oscillation layer 10a and the intermediate layer 22 are comparable in the shape of the film surface. On the other hand, the shape of the film surface of the spin injection layer 30 is varied stepwise with respect to the oscillation layer 10a. At this time, the shape of the film surface of the oscillation layer 10a and the intermediate layer 22 may be varied continuously, e.g. in a tapered shape. Furthermore, the shape of the film surface of the spin injection layer 30 may be varied e.g. in a tapered shape.

In the examples of the magnetic recording heads 52g to 52l described below, the shape of the film surface of the oscillation layer 10a, the intermediate layer 22, and the spin injection layer 30 is continuously varied.

More specifically, as shown in FIG. 25A, in the magnetic recording head 52g, the length in the Y-axis direction (width) of the spin injection layer 30 is longer than that of the oscillation layer 10a. The shape of the film surface of the oscillation layer 10a, the intermediate layer 22, and the spin injection layer 30 is continuously varied so that both the side surfaces of the spin injection layer 30 parallel to the X-axis direction are projected from the side surfaces of the oscillation layer 10a. In this example, the length in the Z-axis direction (width) is comparable to that of the oscillation layer 10a.

As shown in FIG. 25B, in the magnetic recording head 52h, the length in the Y-axis direction (width) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the negative side of the Y-axis) of the spin injection layer 30 parallel to the X-axis direction is projected from the side surface of the oscillation layer 10a. The other of the side surfaces (the side surface on the positive side of the Y-axis) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 25C, in the magnetic recording head 52i, the length in the Y-axis direction (width) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the positive side of the Y-axis) of the spin injection layer 30 parallel to the X-axis direction is projected from the side surface of the oscillation layer 10a. The other of the side surfaces (the side surface on the negative side of the Y-axis) of the spin injection layer 30 parallel to the X-axis direction lies in the same plane as the side surface of the oscillation layer 10a. In this example, the length in the Z-axis direction (height) is comparable to that of the oscillation layer 10a.

As shown in FIG. 26A, in the magnetic recording head 52j, the length in the Z-axis direction (height) of the spin injection layer 30 is longer than that of the oscillation layer 10a. The shape of the film surface of the oscillation layer 10a, the intermediate layer 22, and the spin injection layer 30 is continuously varied so that both the side surfaces of the spin injection layer 30 parallel to the X-axis direction are projected from the side surfaces of the oscillation layer 10a. In this example, the length in the Y-axis direction (width) is comparable to that of the oscillation layer 10a.

As shown in FIG. 26B, in the magnetic recording head 52k, the length in the Z-axis direction (height) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the positive side of the Z-axis) of the spin injection layer 30 parallel to the X-axis direction is projected from the side surface of the oscillation layer 10a. The other of the side surfaces (the side surface on the negative side of the Z-axis) of the spin injection layer 30 parallel to the X-axis direction lies in the same plane as the side surface of the oscillation layer 10a. In this example, the length in the Y-axis direction (width) is comparable to that of the oscillation layer 10a.

As shown in FIG. 26C, in the magnetic recording head 52l, the length in the Z-axis direction (height) of the spin injection layer 30 is longer than that of the oscillation layer 10a. The shape of the film surface of the oscillation layer 10a, the intermediate layer 22, and the spin injection layer 30 is continuously varied so that one of the side surfaces (the side surface on the negative side of the Z-axis) of the spin injection layer 30 parallel to the X-axis direction is projected from the side surface of the oscillation layer 10a. The other of the side surfaces (the side surface on the positive side of the Z-axis) of the spin injection layer 30 parallel to the X-axis direction lies in the same plane as the side surface of the oscillation layer 10a. In this example, the length in the Y-axis direction (width) is comparable to that of the oscillation layer 10a.

In these examples of the magnetic recording heads 52g to 52l, the shape of the film surface of the oscillation layer 10a, the intermediate layer 22, and the spin injection layer 30 is varied in the direction parallel to the X-axis. In this case, the average film surface of the spin injection layer 30 with respect to the X-axis is set larger than the oscillation layer 10a.

As shown in FIG. 27A, in the magnetic recording head 52m, the lengths in the Y-axis and Z-axis direction (width and height) of the spin injection layer 30 are longer than those of the oscillation layer 10a. The four side surfaces of the spin injection layer 30 parallel to the X-axis direction are projected from the side surfaces of the oscillation layer 10a.

As shown in FIG. 27B, in the magnetic recording head 52n, the lengths in the Y-axis and Z-axis direction (width and height) of the spin injection layer 30 are longer than those of the oscillation layer 10a. The shape of the film surface of the oscillation layer 10a, the intermediate layer 22, and the spin injection layer 30 is continuously varied so that the four side surfaces of the spin injection layer 30 parallel to the X-axis direction are projected from the side surfaces of the oscillation layer 10a. In this example, the shape of the film surface of the oscillation layer 10a, the intermediate layer 22, and the spin injection layer 30 is varied in the direction parallel to the X-axis. The average film surface of the spin injection layer 30 with respect to the X-axis is set larger than the oscillation layer 10a.

As shown in FIG. 28A, in the magnetic recording head 52o, the film surface of the spin injection layer 30 is comparable in shape to the surface of the main magnetic pole 61 opposing the shield 62. That is, also in this case, the film surface of the spin injection layer 30 is larger than the oscillation layer 10a. In this case, the film surfaces of the oscillation layer 10a and the intermediate layer 22 are comparable in shape.

As shown in FIG. 28B, in the magnetic recording head 52p, the film surface of the spin injection layer 30 is comparable in shape to the surface of the main magnetic pole 61 opposing the shield 62. That is, also in this case, the film surface of the spin injection layer 30 is larger than the oscillation layer 10a. In this case, the shape of the film surface of the oscillation layer 10a and the intermediate layer 22 is continuously varied. In this example, the shape is varied so that the film surface of the intermediate layer 22 is made larger than that of the oscillation layer 10a. Conversely, the shape may be varied so that the film surface of the intermediate layer 22 is made smaller than the oscillation layer 10a.

As in the above magnetic recording heads 52o and 52p, the film surface of the spin injection layer 30 can be made comparable in shape to the surface of the main magnetic pole 61 opposing the shield 62. Then, the processing of the spin injection layer 30 and the main magnetic pole 61 can be simultaneously performed. Advantageously, this can simplify the manufacturing process.

In the magnetic recording heads 52a to 52p described above, the shape of the main magnetic pole 61 illustrated in FIGS. 21A to 21D is taken as an example. However, it is also possible to use the shape of the main magnetic pole 61 illustrated in FIGS. 22A to 22D.

Also in the magnetic recording heads 52a to 52p described above, the film surface of the spin injection layer 30 is larger than the oscillation layer 10a. Hence, a magnetic recording head with high efficiency can be provided, which reduces the inversion time of the spin injection layer and is operated stably. Here, in the above magnetic recording heads 52a to 52p, the film surface of the spin injection layer 30 is smaller than or comparable to the surface of the main magnetic pole 61 opposing the shield 62.

Third Embodiment

Figure 29:
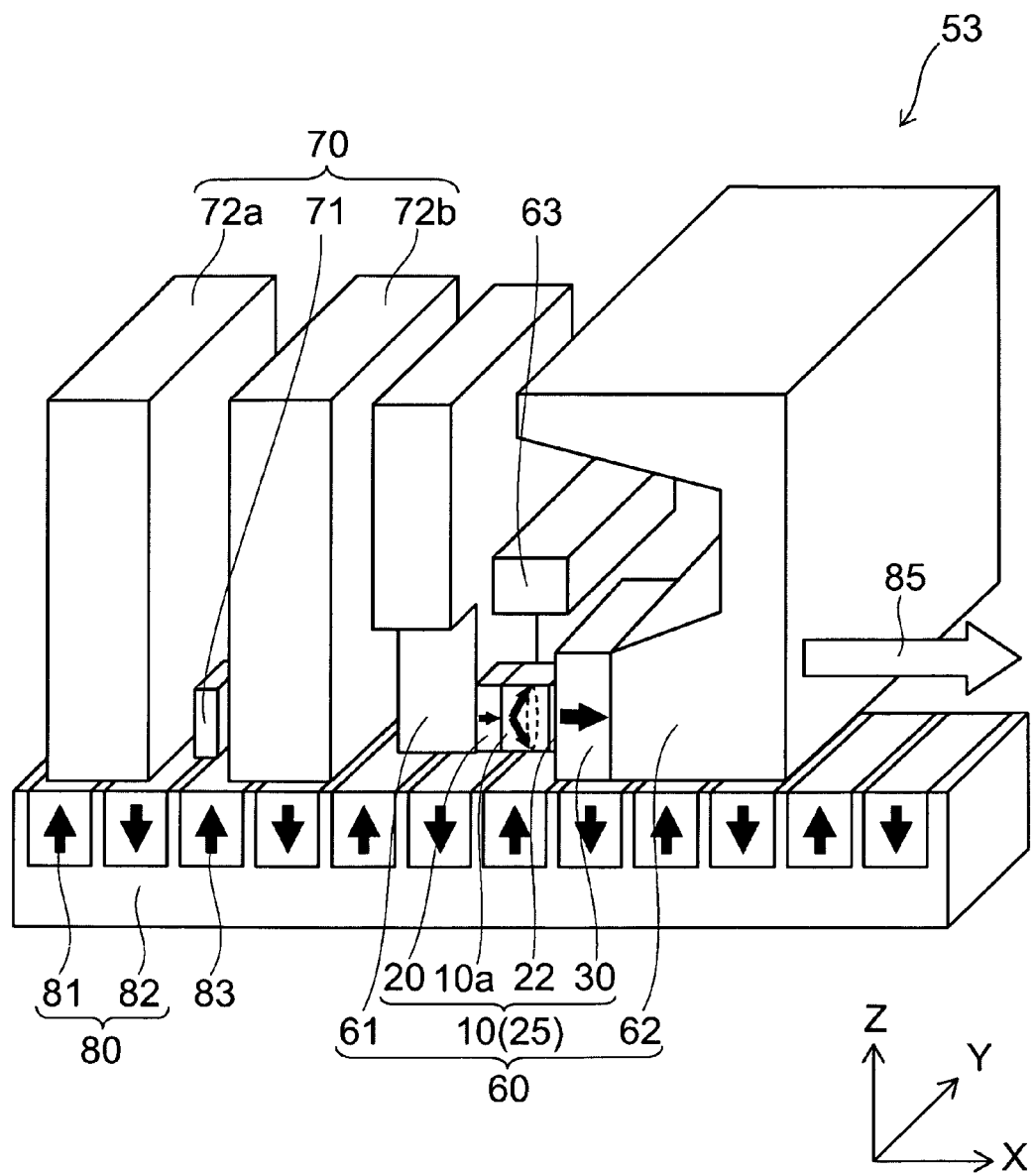
FIG. 29 is a schematic perspective view illustrating the configuration of a magnetic recording head according to a third embodiment.

FIG. 29 is a schematic perspective view illustrating the configuration of a magnetic recording head according to a third embodiment.

As shown in FIG. 29, in the magnetic recording head 53 according to the third embodiment, a bias layer (third magnetic layer) 20 having coercivity lower than the magnetic field applied from the main magnetic pole 61 is further provided on the opposite side of the oscillation layer 10a from the intermediate layer 22.

The spin injection layer 30 is located closer to the shield 62 than to the oscillation layer 10a.

That is, in the configuration like the magnetic recording head 51 illustrated in FIG. 1 in which the main magnetic pole 61, the oscillation layer 10a, the intermediate layer 22, the spin injection layer 30, and the shield 62 are arranged in this order, the bias layer 20 is provided between the main magnetic pole 61 and the oscillation layer 10a.

More specifically, in the magnetic recording head 53 according to this embodiment, the shield 62 is placed on the leading side of the main magnetic pole 61. The stacked structure body 25 of the spin torque oscillator 10 is placed between the main magnetic pole 61 and the shield 62. The surfaces of the main magnetic pole 61 and the shield 62 opposing the stacked structure body 25 are perpendicular to the stacking direction of the stacked structure body 25. The spin injection layer 30 and the oscillation layer 10a are magnetized in the direction parallel to the stacking direction from the main magnetic pole 61 to the shield 62, or in the opposite direction.

The bias layer 20 is provided between the main magnetic pole 61 and the oscillation layer 10a.

The oscillation layer 10a includes a high-Bs soft magnetic material (FeCo/NiFe stacked film) generating a magnetic field during oscillation.

The bias layer 20 applies a bias to this high-Bs soft magnetic material layer by the exchange coupling force. The coercivity of the bias layer 20 is lower than the magnetic field applied from the main magnetic pole 61.

That is, in the magnetic recording head 53 according to this embodiment, the stacked structure body 25 further includes a bias layer (third magnetic layer) 20 having coercivity lower than the magnetic field applied from the main magnetic pole 61. The bias layer 20 is provided on a side of the oscillation layer (first magnetic layer) 10a opposite to the intermediate layer 22.

The film thickness of the high-Bs soft magnetic material constituting the oscillation layer 10a is preferably set to 5 nm to 20 nm. The film thickness of the bias layer 20 is preferably set to 10 nm to 60 nm.

On the other hand, the spin injection layer 30 is made of an alloy with the magnetization oriented in the perpendicular-to-plane direction.

The film thickness of the high-Bs soft magnetic material constituting the oscillation layer 10a, the layer thickness of the bias layer 20, and the layer thickness of the spin injection layer 30 are suitably adjusted so as to achieve a desired oscillation state.

The electrodes (first electrode 41 and second electrode 42) for injecting a driving electron flow Ie to drive the spin torque oscillator 10 double as the main magnetic pole 61 and the shield 62, respectively. The back gap portions of the main magnetic pole 61 and the shield 62 are electrically insulated from each other.

The driving current density is preferably set in the range from $5 \times 10^7$ A/cm$^2$ to $1 \times 10^9$ A/cm$^2$, and suitably adjusted so as to achieve a desired oscillation state. In the magnetic recording head 53 according to this embodiment, the main magnetic pole 61 and the shield 62 are directly adjacent to the stacked structure body 25. However, to adjust the distance from the main magnetic pole 61 and the shield 62 to the stacked structure body 25, a metal body may be suitably inserted between the main magnetic pole 61 and the stacked structure body 25 and between the shield 62 and the stacked structure body 25 and used as an electrode (first electrode 41 and second electrode 42).

Also in the magnetic recording head 53 according to this embodiment, the film surface of the spin injection layer 30 is set larger than the oscillation layer 10a.

For instance, as illustrated in FIG. 29, the dimension in the direction perpendicular to the medium facing surface (Z-axis direction) of the spin injection layer 30 is larger than the dimension in the direction perpendicular to the medium facing surface (Z-axis direction) of the oscillation layer 10a and is equal to or less than the dimension in the direction perpendicular to the medium facing surface (Z-axis direction) of the surface of the shield 62 opposing the stacked structure body 25.

Here, for instance, the dimension in the track width direction (Y-axis direction) of the spin injection layer 30 may be larger than the dimension in the track width direction (Y-axis direction) of the oscillation layer 10a and may be equal to or less than the dimension in the direction perpendicular to the medium facing surface (Z-axis direction) of the surface of the shield 62 opposing the stacked structure body 25.

At this time, furthermore, the dimension in the track width direction (Y-axis direction) of the spin injection layer 30 may be larger than the dimension in the track width direction (Y-axis direction) of the oscillation layer 10a and may be less than the dimension in the track width direction (Y-axis direction) of the surface of the main magnetic pole 61 opposing the stacked structure body 25.

Thus, the area of the film surface of the spin injection layer 30 is increased. Hence, by the same action as described in the first embodiment, when the direction of the magnetic field applied from the main magnetic pole 61 to the spin torque oscillator 10 is inverted, the inversion time of the magnetization of the spin injection layer 30 can be reduced.

In the following, the operation of the bias layer 20 is described.

Figure 30:
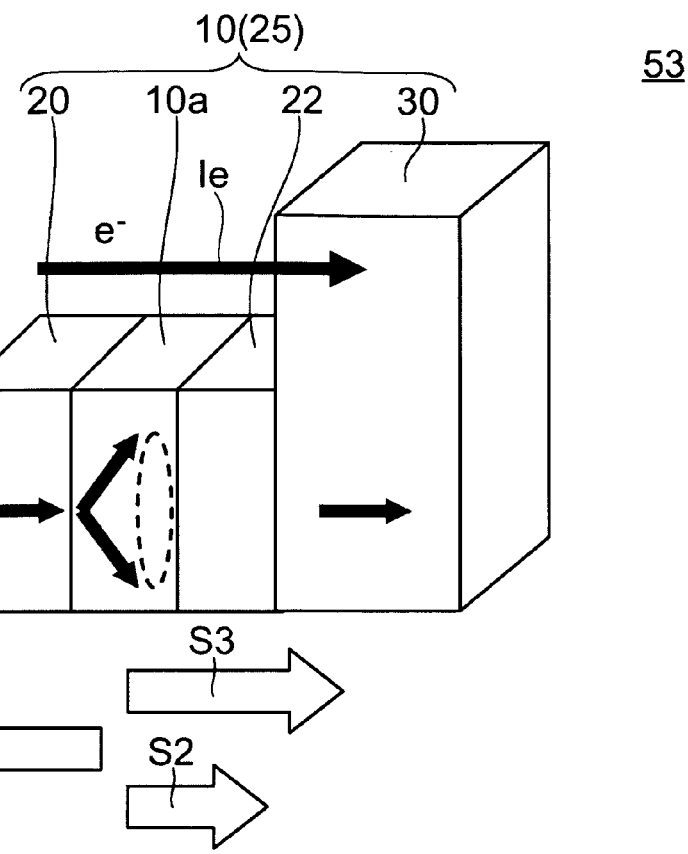
FIG. 30 is a schematic perspective view illustrating the configuration and operation of a spin torque oscillator used in the magnetic recording head according to the third embodiment.

FIG. 30 is a schematic perspective view illustrating the configuration and operation of the spin torque oscillator used in the magnetic recording head according to the third embodiment.

As shown in FIG. 30, by the magnetic field from the main magnetic pole 61, the spin injection layer 30 and the bias layer 20 are magnetized in the positive direction. The magnetic field applied to the oscillation layer 10a includes the sum S3 of the magnetic field from the main magnetic pole 61 and the demagnetizing field of the spin injection layer 30 and the exchange coupling magnetic field S2 from the bias layer 20. The total of these magnetic fields is balanced with the spin torque S1 from the spin injection layer, and thereby the oscillation layer 10a oscillates.

Of the electrons passed through the oscillation layer 10a from the main magnetic pole 61 side, the electron having a spin in the same direction as the spin injection layer 30 passes through the spin injection layer 30. However, the electron having a spin opposite to that of the spin injection layer 30 is reflected at the interface between the intermediate layer 22 and the spin injection layer 30. Thus, a spin torque from the spin injection layer 30 acts on the oscillation layer 10a, causing precession. Hence, the magnetization oscillates.

Furthermore, also in this embodiment, the spin injection layer 30 and the bias layer 20 are magnetized for each write operation by the magnetic field from the main magnetic pole 61. Consequently, the demagnetization effect of the oscillation layer 10a due to deterioration over time is significantly suppressed, enabling production of a spin torque oscillator 10 oscillating stably.

The oscillation frequency of the magnetization of the oscillation layer 10a is proportional to the magnetic field intensity applied to the oscillation layer 10a. Hence, by combining the bias layer 20 with the oscillation layer 10a, the oscillation layer 10a can be operated at a higher frequency.

To realize ultrahigh density recording, it is important to prevent thermal fluctuations in the magnetic recording medium. To this end, it is necessary to increase the coercivity of the magnetic recording medium. This simultaneously results in increasing the resonance frequency of the magnetic recording medium and increasing the oscillation frequency required for the spin torque oscillator 10.

In this context, in the magnetic recording head 53 according to this embodiment, the bias layer 20 provided therein enables writing even to a high-Hc medium capable of ultrahigh density recording.

Thus, in the magnetic recording head 53 according to this embodiment, a magnetic recording head with high efficiency can be provided, which reduces the inversion time of the spin injection layer and is operated more stably.

To optimize the oscillation frequency, a nonmagnetic layer may be inserted between the bias layer 20 and the oscillation layer 10a. The material of this nonmagnetic layer preferably includes a noble metal such as Cu, Pt, Au, Ag, Pd, and Ru and can include a nonmagnetic transition metal such as Cr, Ru, Mo, and W.

The spin injection layer 30 and the oscillation layer 10a can be made of the materials and the stacked film thereof described with reference to the first embodiment.

The above bias layer 20 can be provided in at least one of the magnetic recording heads 51, and 51a to 51t according to the first embodiment. Furthermore, the bias layer 20 can be provided in at least one of the magnetic recording heads 52, and 52a to 52p according to the second embodiment.

Fourth Embodiment

Figure 31:
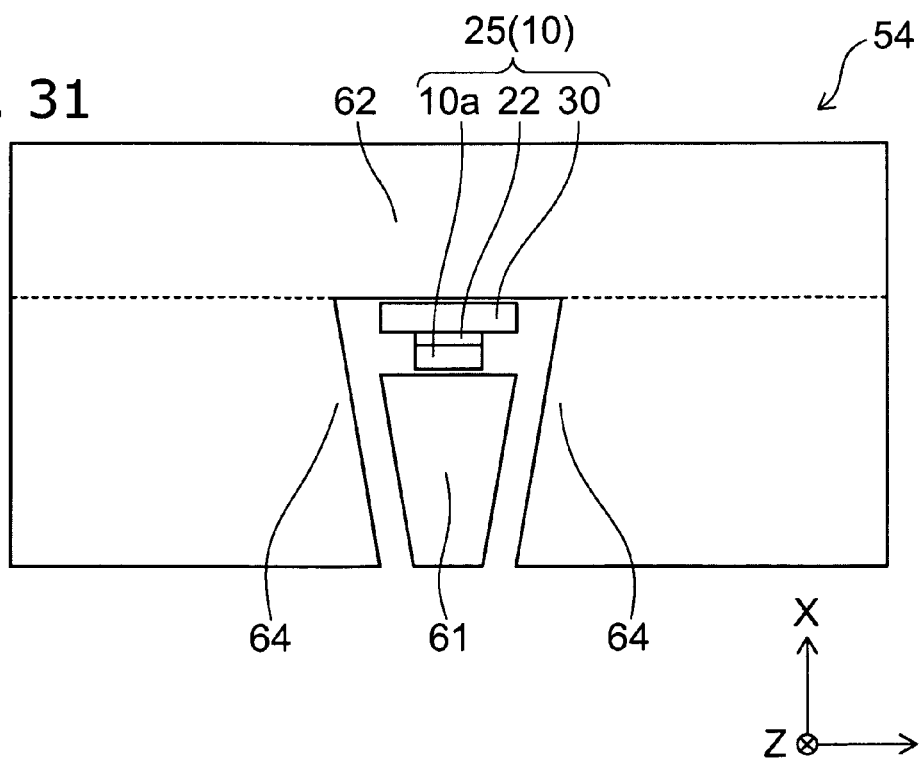
FIG. 31 is a schematic plan view illustrating the configuration of a magnetic recording head according to a fourth embodiment.

FIG. 31 is a schematic plan view illustrating the configuration of a magnetic recording head according to a fourth embodiment.

More specifically, FIG. 31 is a plan view of the magnetic recording head 54 as viewed from the medium facing surface 61s side.

As shown in FIG. 31, the magnetic recording head 54 according to the fourth embodiment further includes a side shield 64 provided to oppose the side surface of the stacked structure body 25. The remaining configuration can be made similar to that of the magnetic recording head described above with reference to the first to third embodiments. That is, the side shield 64 can be provided in at least one of the magnetic recording heads 51, 51a to 51t, 52, 52a to 52p, and 53 described in the above embodiments. In the following description, it is assumed that the side shield 64 is provided in the magnetic recording head 51 according to the first embodiment.

In this example, the side shield 64 has a shape integrated with the shield 62. However, the side shield 64 may be provided independently of the shield 62.

The distance between the main magnetic pole 61 and the side shield 64 is shorter than the distance between the main magnetic pole 61 and the shield 62.

Thus, by providing the side shield 64, the external magnetic field $H_{ext}$ applied from the main magnetic pole 61 to the spin torque oscillator 10 can be optimized.

More specifically, in the case of a magnetic recording head including a shield 62, when the spin torque oscillator 10 is brought close to the main magnetic pole 61, a high magnetic field of several kOe to 20 kOe is applied from the main magnetic pole 61 to the spin torque oscillator 10 at the write time. Thus, the oscillation frequency of the spin torque oscillator 10 is excessively increased. Conversely, a side shield 64 can be provided on at least one side surface of the stacked structure body 25 and at least one spacing between the side shield 64 and the main magnetic pole 61 can be made narrower than the spacing between the main magnetic pole 61 and the shield 62. Then, more of the magnetic field generated in the main magnetic pole 61 is applied to the side shield 64 side. Hence, the bias magnetic field (external magnetic field $H_{ext}$) applied to the spin torque oscillator 10 can be adjusted to an appropriate level.

The magnetic recording head 54 according to this embodiment can provide a magnetic recording head which can optimize the external magnetic field $H_{ext}$ applied from the main magnetic pole 61 to the spin torque oscillator 10. Furthermore, in this magnetic recording head, the efficiency in generating the radio frequency magnetic field is increased, and the inversion time of the spin injection layer is reduced.

As in the above example, in the case where the side shield 64 is integrated with the shield 62, the spin injection layer 30 may be provided on the entire region of the surface of the shield 62 opposing the main magnetic pole 61 or on a smaller region.

In the example shown in FIG. 31, the intermediate layer 22 is comparable in size to the oscillation layer 10a. However, the intermediate layer 22 may be comparable in size to the surface of the shield 62 opposing the main magnetic pole 61 or may be smaller than this surface.

However, the size of the film surface of the oscillation layer 10a is set comparable to or smaller than the size of the surface of the main magnetic pole 61 opposing the shield 62. Then, the external magnetic field $H_{ext}$ from the main magnetic pole 61 is uniformly applied to the oscillation layer 10a, and stable oscillation can be achieved.

Fifth Embodiment

In the following, a magnetic recording apparatus and a magnetic head assembly according to a fifth embodiment are described.

The magnetic recording head according to the embodiments described above can be incorporated in, e.g., an integrated recording/reproducing magnetic head assembly, which can be installed on a magnetic recording apparatus. Here, the magnetic recording apparatus according to this embodiment can have only the recording function or both the recording and reproducing function.

Figure 32:
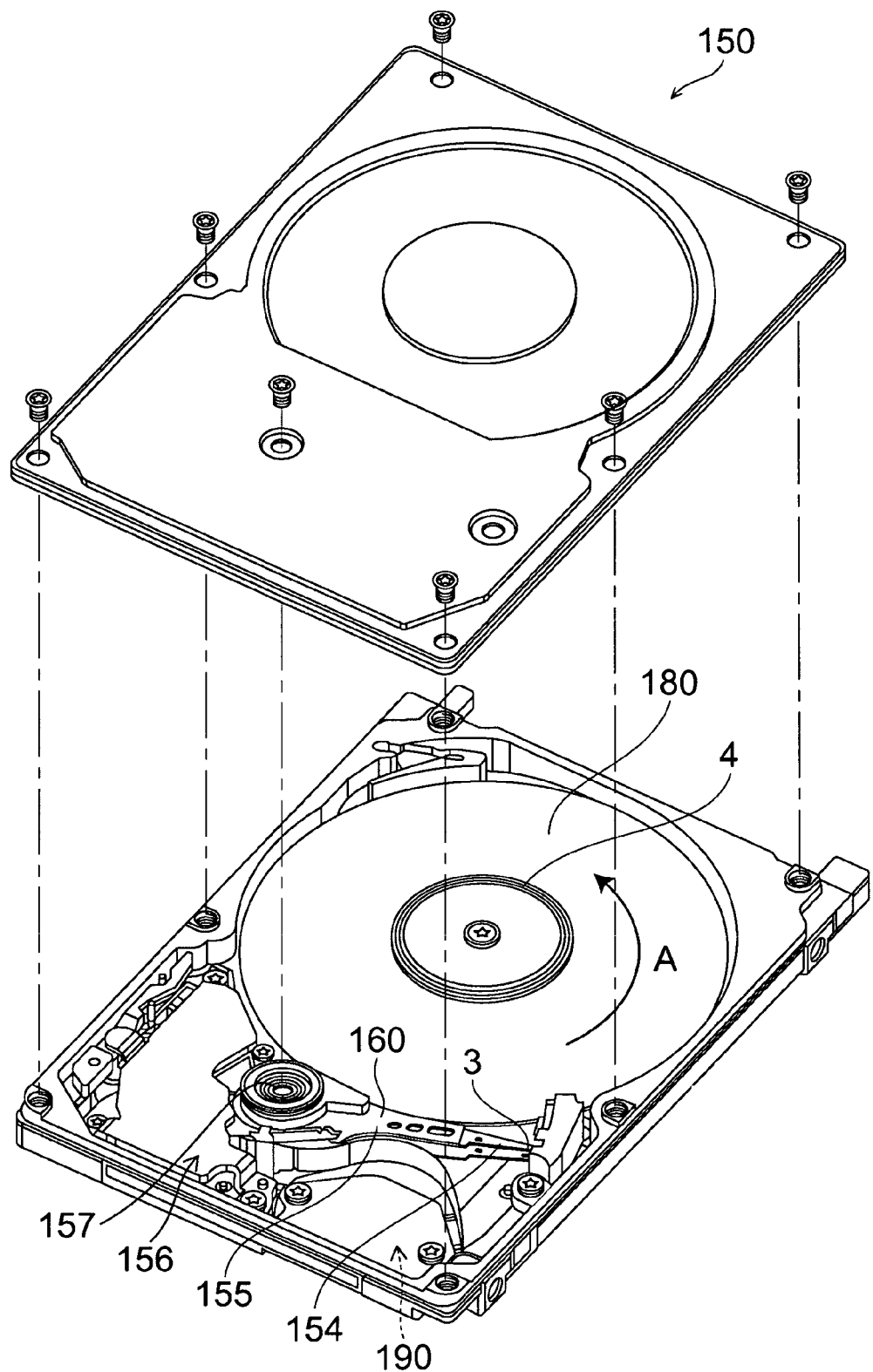
FIG. 32 is a schematic perspective view illustrating the configuration of a magnetic recording apparatus according to a fifth embodiment.

FIG. 32 is a schematic perspective view illustrating the configuration of the magnetic recording apparatus according to the fifth embodiment.

Figure 33A:
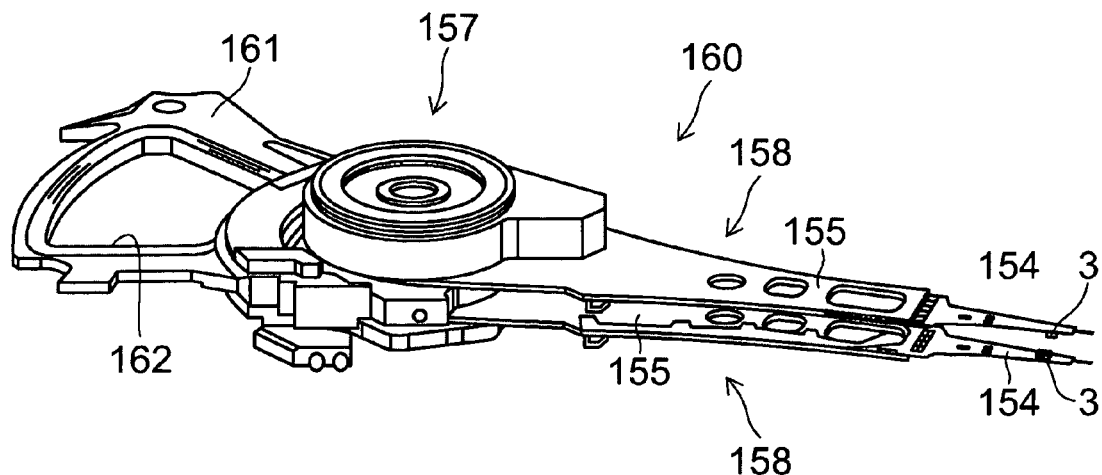
FIGS. 33A and 33B are schematic perspective views illustrating the configuration of part of the magnetic recording apparatus according to the fifth embodiment.
Figure 33B:
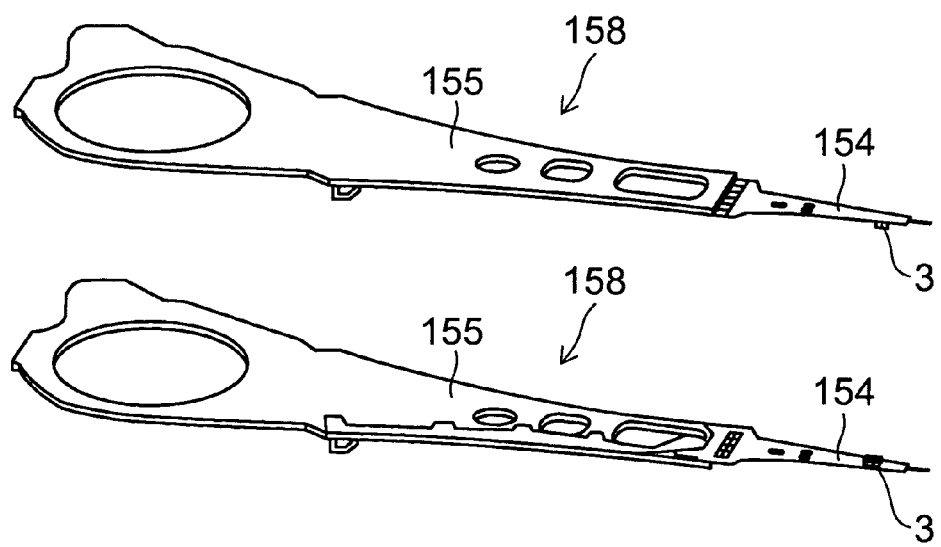

FIGS. 33A and 33B are schematic perspective views illustrating the configuration of part of the magnetic recording apparatus according to the fifth embodiment.

As shown in FIG. 32, the magnetic recording apparatus 150 according to the fifth embodiment is an apparatus based on a rotary actuator. In FIG. 32, a recording medium disk 180 is mounted on a spindle motor 4 and rotated in the direction of arrow A by a motor, not shown, in response to a control signal from a drive controller, not shown. The magnetic recording apparatus 150 according to this embodiment may include a plurality of recording medium disks 180.

The head slider 3 for recording/reproducing information stored on the recording medium disk 180 has a configuration as described above and is attached to the tip of a thin-film suspension 154. Here, on the head slider 3, for instance, one of the magnetic recording heads according to the above embodiments is installed near the tip of the head slider 3.

When the recording medium disk 180 is rotated, the pressing pressure by the suspension 154 is balanced with the pressure generated at the medium facing surface (air bearing surface, ABS) of the head slider 3. Thus, the medium facing surface of the head slider 3 is held at a prescribed floating amount from the surface of the recording medium disk 180. Here, the head slider 3 may be of the so-called "contact-traveling type", in which the head slider 3 is in contact with the recording medium disk 180.

The suspension 154 is connected to one end of an actuator arm 155 including a bobbin for holding a driving coil, not shown. A voice coil motor 156, which is a kind of linear motor, is provided on the other end of the actuator arm 155. The voice coil motor 156 can be composed of the driving coil, not shown, wound up around the bobbin of the actuator arm 155, and a magnetic circuit composed of a permanent magnet and an opposed yoke opposed across this coil.

The actuator arm 155 is held by ball bearings, not shown, provided at two positions, top and bottom, of a bearing portion 157, so that the actuator arm 155 can be slidably rotated by the voice coil motor 156. Consequently, the magnetic recording head can be moved to an arbitrary position on the recording medium disk 180.

FIG. 33A illustrates the configuration of part of the magnetic recording apparatus according to this embodiment, and is an enlarged perspective view of a head stack assembly 160. FIG. 33B is a perspective view illustrating a magnetic head assembly (head gimbal assembly) 158, which constitutes part of the head stack assembly 160.

As shown in FIG. 33A, the head stack assembly 160 includes a bearing portion 157, a head gimbal assembly 158 extending from this bearing portion 157, and a support frame 161 extending from the bearing portion 157 to the direction opposite from the head gimbal assembly 158 and supporting the coil 162 of the voice coil motor.

As shown in FIG. 33B, the head gimbal assembly 158 includes an actuator arm 155 extending from the bearing portion 157, and a suspension 154 extending from the actuator arm 155.

A head slider 3 including the magnetic recording head according to the embodiments described above is attached to the tip of the suspension 154. As described above, on the head slider 3, one of the magnetic recording heads according to the embodiments is installed.

Thus, the magnetic head assembly (head gimbal assembly) 158 according to this embodiment includes the magnetic recording head according to the embodiments, a head slider 3 with the magnetic recording head installed thereon, a suspension 154 with the head slider 3 installed on one end, and an actuator arm 155 connected to the other end of the suspension 154.

The suspension 154 includes lead wires (not shown) for writing and reading signals, for a heater for adjusting the floating amount, and for the spin torque oscillator. These lead wires are electrically connected to respective electrodes of the magnetic recording head incorporated in the head slider 3. Furthermore, electrode pads, not shown, are provided on the head gimbal assembly 158. In this example, eight electrode pads are provided. More specifically, two electrode pads are used for the coil of the main magnetic pole 61, two electrode pads are used for the magnetic reproducing device 71, two electrode pads are used for DFH (dynamic flying height), and two electrode pads are used for the spin torque oscillator 10.

Furthermore, a signal processing unit 190 is provided to write and read signals on the magnetic recording medium using the magnetic recording head. For instance, the signal processing unit 190 is provided on the rear surface side, as viewed in FIG. 32, of the magnetic recording apparatus 150 illustrated in FIG. 32. The input/output lines of the signal processing unit 190 are connected to the electrode pads of the head gimbal assembly 158 and electrically coupled to the magnetic recording head.

Thus, the magnetic recording apparatus 150 according to this embodiment includes a magnetic recording medium, the magnetic recording head according to the above embodiments, a movable unit capable of relatively moving the magnetic recording medium and the magnetic recording head opposing each other in a spaced or contact state, a position control unit for positioning the magnetic recording head at a prescribed recording position on the magnetic recording medium, and a signal processing unit for writing and reading signals on the magnetic recording medium using the magnetic recording head.

Specifically, the above magnetic recording medium can be a recording medium disk 180.

The above movable unit can include a head slider 3.

The above signal processing unit can include a head gimbal assembly 158.

In other words, the magnetic recording apparatus 150 according to this embodiment includes a magnetic recording medium, the magnetic head assembly according to the embodiment, and a signal processing unit for writing and reading signals on the magnetic recording medium using the magnetic recording head installed on the magnetic head assembly.

Thus, the magnetic recording apparatus 150 according to this embodiment is based on the spin torque oscillator of the above embodiments and the magnetic recording head according to the above embodiments. In this magnetic recording apparatus, the inversion time of the spin injection layer is reduced, a radio frequency magnetic field is obtained with stable operation and high efficiency, and high density magnetic recording can be achieved.

In the magnetic recording apparatus according to the embodiment, the spin torque oscillator 10 can be provided on the trailing side of the main magnetic pole 61. In this case, the magnetic recording layer 81 of the magnetic recording medium 80 first opposes the spin torque oscillator 10 and subsequently opposes to the main magnetic pole 61.

Alternatively, in the magnetic recording apparatus according to the embodiment, the spin torque oscillator 10 can be provided on the leading side of the main magnetic pole 61. In this case, the magnetic recording layer 81 of the magnetic recording medium 80 first opposes to the main magnetic pole 61 and subsequently opposes to the spin torque oscillator 10.

In the following, a magnetic recording medium that can be used in the magnetic recording apparatus of the above embodiment is described.

Figure 34A:
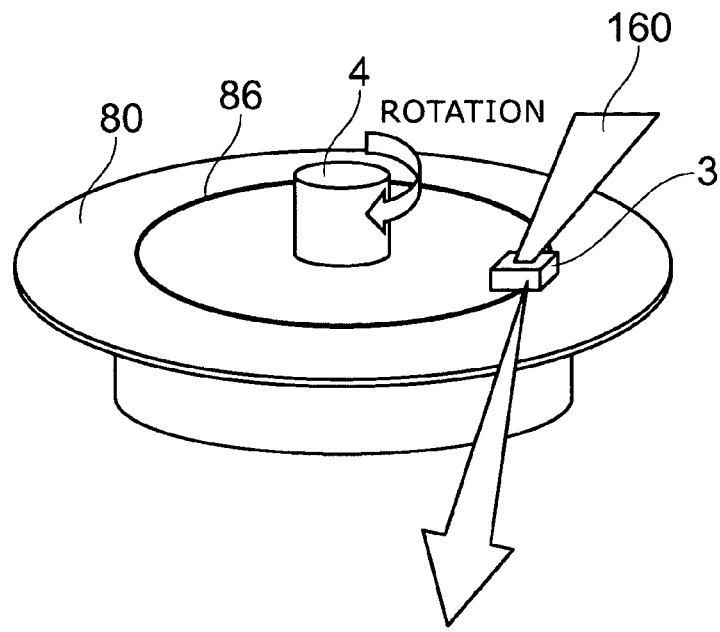
FIGS. 34A and 34B are schematic perspective views illustrating the configuration of a magnetic recording medium of a magnetic recording apparatus according to an embodiment.
Figure 34B:
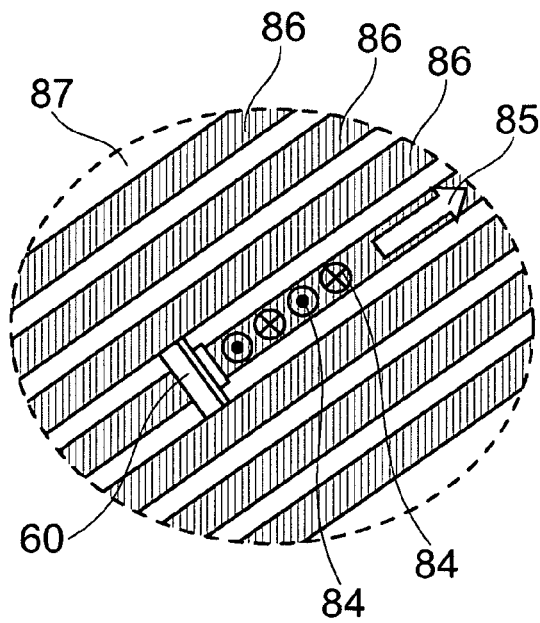

FIGS. 34A and 34B are schematic perspective views illustrating the configuration of a magnetic recording medium of the magnetic recording apparatus according to the embodiment.

As shown in FIGS. 34A and 34B, the magnetic recording medium 80 used in the magnetic recording apparatus according to the embodiment includes perpendicularly oriented, multiparticle magnetic discrete tracks (recording tracks) 86 separated from each other by a nonmagnetic material (or air) 87. When this magnetic recording medium 80 is rotated by a spindle motor 4 and moved toward the medium travel direction 85, a recording magnetization 84 can be produced by one of the magnetic recording heads according to the above embodiments.

Thus, in the magnetic recording apparatus according to the embodiment, the magnetic recording medium 80 can be a discrete track medium in which adjacent recording tracks are formed via a nonmagnetic member.

By setting the width (TS) of the spin torque oscillator 10 in the width direction of the recording track to not less than the width (TW) of the recording track 86 and not more than the recording track pitch (TP), it is possible to significantly suppress the decrease of coercivity in adjacent recording tracks due to leakage radio frequency magnetic field generated from the spin torque oscillator 10. Hence, in the magnetic recording medium 80 of this example, only the target recording track 86 can be effectively subjected to radio frequency magnetic field assisted recording.

According to this example, a radio frequency assisted recording apparatus with narrow tracks, i.e., high track density, is realized more easily than in the case of using a multiparticle perpendicular medium made of a so-called "blanket film". Furthermore, by using radio frequency magnetic field assisted recording in conjunction with a magnetic medium material having high magnetic anisotropy energy (Ku) such as FePt and SmCo, which does not allow writing by conventional magnetic recording heads, magnetic medium particles can be further downscaled to the size of nanometers. Thus, it is possible to realize a magnetic recording apparatus having far higher linear recording density than conventional also in the recording track direction (bit direction).

In the magnetic recording apparatus according to this embodiment, recording can be reliably performed also on the magnetic recording layer having high coercivity in a discrete-type magnetic recording medium 80, enabling magnetic recording with high density and high speed.

Figure 35A:
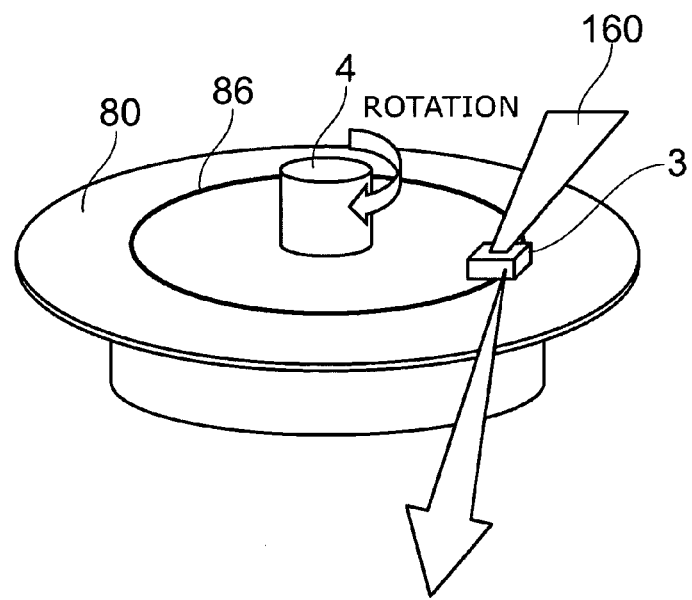
FIGS. 35A and 35B are schematic perspective views illustrating the configuration of one other magnetic recording medium of the magnetic recording apparatus according to the embodiment.
Figure 35B:
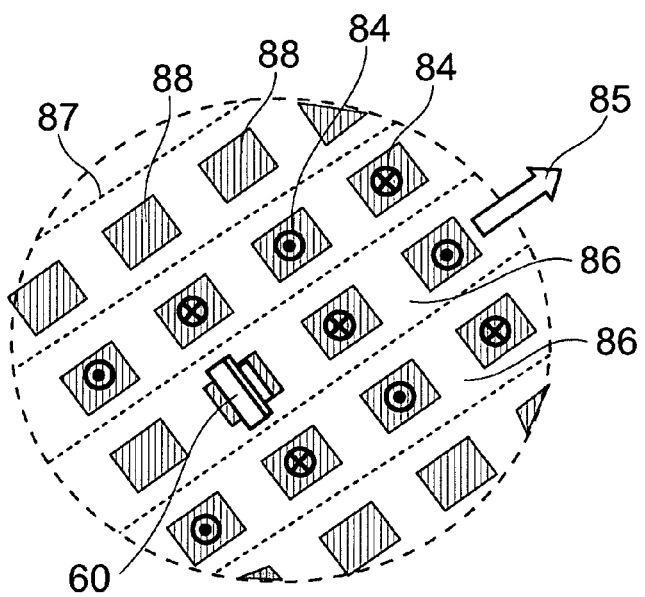

FIGS. 35A and 35B are schematic perspective views illustrating the configuration of one other magnetic recording medium of the magnetic recording apparatus according to the embodiment.

As shown in FIGS. 35A and 35B, the one other magnetic recording medium 80 that can be used in the magnetic recording apparatus of the embodiment includes magnetic discrete bits 88 separated from each other by a nonmagnetic material 87. When this magnetic recording medium 80 is rotated by a spindle motor 4 and moved toward the medium travel direction 85, a recording magnetization 84 can be produced by one of the magnetic recording heads according to the embodiments.

Thus, in the magnetic recording apparatus according to the embodiment, the magnetic recording medium 80 can be a discrete bit medium in which isolated recording magnetic dots are regularly arranged via a nonmagnetic member.

In the magnetic recording apparatus according to this embodiment, recording can be reliably performed also on the magnetic recording layer having high coercivity in a discrete-type magnetic recording medium 80, enabling magnetic recording with high density and high speed.

Also in this example, by setting the width (TS) of the spin torque oscillator 10 in the width direction of the recording track to not less than the width (TW) of the recording track 86 and not more than the recording track pitch (TP), it is possible to significantly suppress the decrease of coercivity in adjacent recording tracks due to leakage radio frequency magnetic field generated from the spin torque oscillator 10. Hence, only the target recording track 86 can be effectively subjected to radio frequency magnetic field assisted recording. According to this example, by downscaling the magnetic discrete bit 88 and increasing its magnetic anisotropy energy (Ku), there is a possibility of realizing a radio frequency magnetic field assisted recording apparatus having a recording density of 10 Tbits/inch$^2$ or more as long as thermal fluctuation resistance under the operating environment can be maintained.

The embodiments of the invention have been described with reference to examples. However, the invention is not limited to these examples. For instance, any specific configuration of each component constituting the magnetic recording head, the magnetic head assembly, and the magnetic recording apparatus is encompassed within the scope of the invention as long as those skilled in the art can similarly practice the invention and achieve similar effects by suitably selecting such configuration from conventionally known ones.

Furthermore, any two or more components of the examples can be combined with each other as long as technically feasible. Such combinations are also encompassed within the scope of the invention as long as they fall within the spirit of the invention.

Furthermore, those skilled in the art can suitably modify and implement the magnetic recording head, the magnetic head assembly, and the magnetic recording apparatus described above in the embodiments of the invention. All the magnetic recording heads, magnetic head assemblies, and magnetic recording apparatuses thus modified are also encompassed within the scope of the invention as long as they fall within the spirit of the invention.

Furthermore, those skilled in the art can conceive various modifications and variations within the spirit of the invention. It is understood that such modifications and variations are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A magnetic recording head, comprising:
a main magnetic pole;
a shield provided to oppose the main magnetic pole;
a stacked structure body provided between the main magnetic pole and the shield, the stacked structure body including:
a first magnetic layer having a coercivity lower than a magnetic field applied from the main magnetic pole;
a second magnetic layer stacked with the first magnetic layer in a stacking direction, a size of a film surface of the second magnetic layer in a direction perpendicular to the stacking direction being larger than a size of a film surface of the first magnetic layer in the direction perpendicular to the stacking direction; and
an intermediate layer provided between the first magnetic layer and the second magnetic layer and made of a nonmagnetic material,
a current being configured to pass between the first magnetic layer and the second magnetic layer.

2. The head according to claim 1, wherein the second magnetic layer is provided between the first magnetic layer and the shield, and the size of the film surface of the second magnetic layer is not larger than a size of a surface of the shield opposing the main magnetic pole.

3. The head according to claim 2, wherein the second magnetic layer and the shield are exchange-coupled.

4. The head according to claim 1, wherein the second magnetic layer is provided between the first magnetic layer and the shield, and a shape of the second magnetic layer as viewed in a direction from the main magnetic pole toward the shield is comparable to a shape of the shield.

5. The head according to claim 1, wherein
the second magnetic layer is provided between the first magnetic layer and the shield, and
the size of the film surface of the first magnetic layer is not larger than a size of a surface defined by a narrower one of a first width and a second width and a lower one of a first height and a second height, a surface of the main magnetic pole opposing the shield having the first width and the first height, a surface of the shield opposing the main magnetic pole having the second width and the second height.

6. The head according to claim 1, wherein the second magnetic layer is provided between the first magnetic layer and the main magnetic pole, and the size of the film surface of the second magnetic layer is not larger than a size of a surface of the main magnetic pole opposing the shield.

7. The head according to claim 6, wherein the second magnetic layer and the main magnetic pole are exchange-coupled.

8. The head according to claim 1, wherein the second magnetic layer is provided between the first magnetic layer and the main magnetic pole, and a shape of the second magnetic layer as viewed in a direction from the main magnetic pole toward the shield is comparable to a shape of the main magnetic pole.

9. The head according to claim 1, wherein
the second magnetic layer is provided between the first magnetic layer and the main magnetic pole, and
the size of the film surface of the first magnetic layer is smaller than a size of a surface defined by a narrower one of a first width and a second width and a lower one of a first height and a second height, a surface of the main magnetic pole opposing the shield having the first width and the first height, a surface of the shield opposing the main magnetic pole having the second width and the second height.

10. The head according to claim 1, wherein a surface of the main magnetic pole opposing the stacked structure body and a surface of the shield opposing the stacked structure body are perpendicular to the stacking direction.

11. The head according to claim 1, wherein the second magnetic layer has magnetic anisotropy in a direction perpendicular to the film surface of the second magnetic layer.

12. The head according to claim 1, wherein the current is supplied to the stacked structure body through at least one of the shield and the main magnetic pole.

13. The head according to claim 1, wherein the current passes from the second magnetic layer to the first magnetic layer.

14. The head according to claim 1, further comprising:
a side shield provided to oppose a side surface of the stacked structure body,
a distance between the main magnetic pole and the side shield is shorter than a distance between the main magnetic pole and the shield.

15. A magnetic head assembly, comprising:
a head slider, a magnetic recording head disposed on the head slider, the magnetic recording head including:
a main magnetic pole;
a shield provided to oppose the main magnetic pole;
a stacked structure body provided between the main magnetic pole and the shield, the stacked structure body including:
a first magnetic layer having a coercivity lower than a magnetic field applied from the main magnetic pole;
a second magnetic layer stacked with the first magnetic layer in a stacking direction, a size of a film surface of the second magnetic layer in a direction perpendicular to the stacking direction being larger than a size of a film surface of the first magnetic layer in the direction perpendicular to the stacking direction; and an intermediate layer provided between the first magnetic layer and the second magnetic layer and made of a nonmagnetic material, a current being configured to pass between the first magnetic layer and the second magnetic layer;

a suspension, the head slider being disposed on one end of the suspension; and an actuator arm connected to another end of the suspension.

16. A magnetic recording apparatus, comprising:

a magnetic recording medium;

a magnetic head assembly including:

a head slider, a magnetic recording head disposed on the head slider, the magnetic recording head including:

a main magnetic pole;

a shield provided to oppose the main magnetic pole;

a stacked structure body provided between the main magnetic pole and the shield, the stacked structure body including:

a first magnetic layer having a coercivity lower than a magnetic field applied from the main magnetic pole;

a second magnetic layer stacked with the first magnetic layer in a stacking direction, a size of a film surface of the second magnetic layer in a direction perpendicular to the stacking direction being larger than a size of a film surface of the first magnetic layer in the direction perpendicular to the stacking direction; and an intermediate layer provided between the first magnetic layer and the second magnetic layer and made of a nonmagnetic material, a current being configured to pass between the first magnetic layer and the second magnetic layer;

a suspension, the head slider disposed on one end of the suspension; and an actuator arm connected to another end of the suspension; and a signal processing unit configured to write and read a signal on the magnetic recording medium using the magnetic recording head disposed on the magnetic head assembly.

17. The apparatus according to claim 16, wherein the stacked structure body is provided on a trailing side of the main magnetic pole.

18. The apparatus according to claim 16, wherein the stacked structure body is provided on a leading side of the main magnetic pole.

19. The apparatus according to claim 16, wherein the magnetic recording medium is a discrete track medium, adjacent recording tracks being formed via a nonmagnetic portion in the discrete track medium.

20. The apparatus according to claim 16, wherein the magnetic recording medium is a discrete bit medium, isolated recording magnetic dots being regularly arranged via a nonmagnetic portion in the discrete bit medium.

* * * * *